United States Patent
Takeuchi et al.

(10) Patent No.: US 6,761,028 B2
(45) Date of Patent: Jul. 13, 2004

(54) DRIVE DEVICE

(75) Inventors: Yukihisa Takeuchi, Nishikamo-Gun (JP); Nobuo Takahashi, Kasugai (JP); Yuki Bessho, Nishikasugai-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 36 days.

(21) Appl. No.: 10/270,041

(22) Filed: Oct. 11, 2002

(65) Prior Publication Data

US 2003/0131595 A1 Jul. 17, 2003

Related U.S. Application Data

(60) Provisional application No. 60/329,742, filed on Oct. 16, 2001.

(30) Foreign Application Priority Data

Oct. 15, 2001 (JP) ........................................ 2001-317277
Sep. 13, 2002 (JP) ........................................ 2002-268205

(51) Int. Cl.⁷ .............................................. F01B 11/00
(52) U.S. Cl. ............................ 60/413; 60/486; 310/328
(58) Field of Search ........................ 60/413, 533, 486, 60/473, 475, 415, 543; 310/328, 339

(56) References Cited

U.S. PATENT DOCUMENTS

| | | | |
|---|---|---|---|
| 3,779,401 A | | 12/1973 | Carroll |
| 4,651,045 A | * | 3/1987 | Wagner ........................ 310/328 |
| 5,997,671 A | * | 12/1999 | Takeuchi et al. ............. 310/324 |
| 6,591,607 B1 | * | 7/2003 | Baumgarten .................. 60/475 |

FOREIGN PATENT DOCUMENTS

| | | |
|---|---|---|
| JP | 5-267742 | 10/1993 |
| JP | 5-346105 | 12/1993 |
| JP | 7-202284 | 8/1995 |
| JP | 7-214779 | 8/1995 |
| JP | 2609998 | 2/1997 |
| JP | 9-229013 | 9/1997 |
| JP | 10-78549 | 3/1998 |
| JP | 2000-87862 | 3/2000 |
| JP | 2606641 | 10/2000 |
| JP | 2000-320504 | 11/2000 |

OTHER PUBLICATIONS

"Nikkei Microdevices," Jul. 2000, pp. 164–164.

* cited by examiner

Primary Examiner—Thomas E. Lazo
(74) Attorney, Agent, or Firm—Burr & Brown

(57) ABSTRACT

A drive device includes ceramic pumps which alternately pressurize and depressurize fluid within a fluid chamber on opposite sides of a movable body, to thereby move the movable body within the flow chamber. The flow chamber is connected via micro flow passages to an internal-pressure buffering chamber, which accommodates a compressible gas. When the pressure of the fluid is increased and decreased at high speed by the ceramic pumps, the micro flow passages exhibit a high passage resistance, so that the pressure within the channel does not escape to the internal-pressure buffering chamber, and the movable body moves freely. When the pressure of the fluid increases slowly due to the expansion of the fluid, the micro flow passages exhibit a low passage resistance, so that the fluid is led to the internal-pressure buffering chamber, and the pressure increase of the fluid is suppressed.

4 Claims, 36 Drawing Sheets

DRIVE DEVICE

BACKGROUND OF THE INVENTION

1. Field of the Invention

The present invention relates to a device applicable to micro machines such as micro motors, micro sensors, and micro relays, or micro electromechanical components collectively called Micro Electro Mechanical Systems (MEMS), and more particularly to a drive device for moving a movable body through utilization of operation fluid.

2. Prior Art

In recent years, there have been developed micro motors, micro sensors, micro switches, etc. which have sizes of several millimeters to several tens of microns and which are fabricated through utilization of a technique for micro-machining of materials, such as a semiconductor fabrication technique, or by making use of piezoelectric material or a like material which can effect mutual conversion between electrical energy and mechanical energy. These elementary devices can be widely applied to, for example, ink-jet printer heads, micro valves, flow sensors, pressure sensors, recording heads, actuators for tracking servos, on-chip biochemical analyzers, micro reactors, high-frequency components, micro magnetic devices, micro relays, acceleration sensors, gyroscopes, drive devices, displays, and optical scanners (Nikkei Micro Device, July 2000, pp. 164–165)

In these micro machines, electrostatic force is often used as drive force. Further, various types of drive sources have been studied, such as a type which utilizes distortion deformation of a piezoelectric material caused through application of voltage thereto, a type which utilizes changes in shape of a shape memory alloy, and a type which utilizes changes in volume of liquid caused by phase change thereof induced by heating. However, in micro mechanisms, force generated by a drive source and drive stroke become extremely small, and therefore, in some applications a mechanical amplification mechanism such as a lever must be combined with a drive source.

However, when the size of such a mechanical amplification mechanism is reduced to that of a micro machine, wear or sticking, which does not raise any problem in the case of a machine of ordinary size, raises a big problem. Further, since a micro machine having an amplification mechanism (drive function) such as a lever inevitably requires formation of a three-dimensional structure having a depth (height), micro machining of such a micro machine requires a longer time, and assembly of micro components requires a greater number of steps. For this reasons, some micro machines involve the problem that they are not suitable for mass production.

SUMMARY OF THE INVENTION

In view of the foregoing, an object of the present invention is to provide a drive device which uses operation fluid, which maintains the features of micro machines such as small size and low power consumption, which does not include a mechanical amplification mechanism having intrinsic problems of wear and sticking, which facilitates mass production, and which hardly causes leakage of operation fluid under variation in atmospheric temperature.

In order to achieve the above-described object, the present invention provides a drive device, comprising: a channel (flow-passage) forming portion for forming a channel (a flow passage), the channel accommodating an incompressible operation fluid and a movable body made of a substance different from that of the operation fluid, and being substantially divided into two operation chambers by means of the movable body; a pair of pumps each including a pump chamber communicating with the corresponding operation chamber and being filled with the operation fluid, an actuator provided for the pump chamber, and a diaphragm deformed by the actuator, the operation fluid within the pump chamber being pressurized or depressurized through deformation of the diaphragm; an internal-pressure-buffering-chamber-forming portion for forming an internal-pressure buffering chamber which accommodates the operation fluid and a compressible fluid for pressure buffering; and a micro flow passage (a micro channel) for connecting the channel of the channel forming portion and the internal-pressure buffering chamber of the internal-pressure-buffering-chamber-forming portion, the micro flow passage exhibiting a high passage resistance against abrupt pressure change of the operation fluid within the channel, to thereby substantially prohibit passage of the operation fluid through the micro flow passage and exhibiting a low passage resistance against slow pressure change of the operation fluid within the channel, to thereby substantially permit passage of the operation fluid through the micro flow passage. The micro flow passage may connect the channel of the channel-forming portion and the internal-pressure buffering chamber of the internal-pressure-buffering-chamber-forming portion directly, or via another portion (e.g., a connection passage for connecting the channel and the pump chamber, or a pump chamber). Further, three or more pumps may be provided.

By virtue of the above-described configuration, when the diaphragm is deformed by the actuator, the operation fluid within the channel is pressurized or depressurized. At this time, when the pressure of the operation fluid changes abruptly, the micro flow passage exhibits a high passage resistance in order to substantially prohibit passage of the operation fluid through the micro flow passage. Therefore, the pressure change of the operation fluid is transmitted to the movable body within the channel, so that the movable body moves. In contrast, when the pressure of the operation fluid changes slowly due to thermal expansion of the operation fluid caused by variation in the ambient temperature or due to slow operation of the actuator, the micro flow passage exhibits a low passage resistance in order to substantially permit passage of the operation fluid through the micro flow passage. Therefore, the operation fluid moves via the micro flow passage to the internal-pressure buffering chamber, which accommodates a compressible fluid for pressure buffering. As a result, pressure increase of the operation fluid within the channel is suppressed, and it becomes possible to avoid breakage of the device due to excessive pressure of the operation fluid and to prevent leakage of the operation fluid due to breakage of the device.

Preferably, the actuator includes a film-type piezoelectric element consisting of a piezoelectric/electrostrictive film or an antiferroelectric film and electrodes; and the diaphragm is formed of ceramic.

In this case, micro machining can be performed more easily, and drive devices which are well suited for mass production and which have excellent durability can be provided.

Moreover, with the drive device it is preferred that each of the diaphragms of the pump should form part of the wall of each of the pump chambers and should be disposed such that it has the membrane surface on the same plane, that the channel of the channel forming portion should be configured such that it constitutes a space having its longitudinal direction within a plane parallel to the membrane surface of the diaphragm, that the micro flow passage of the micro flow passage portion should be extended in a direction parallel to the membrane surface of the diaphragm and that the internal pressure buffering chamber of the internal-pressure-buffering-chamber-forming portion should be configured such that it constitutes a space having its longitudinal direction within a plane parallel to the membrane surface of the diaphragm and should be disposed such that it communicates with the channel of the channel forming portion via the micro flow passage of the micro flow passage portion.

When each of the pump chambers is configured, for example, such that a diaphragm, made of a single plate such as deformable ceramic sheet, forms part of the wall of the pump chamber, the actuation of each of the actuators allows the volume of each pump chamber to be directly changed, thus allowing efficient pressurization or depressurization of the operation fluid. Therefore, it is appropriate that each of the diaphragms of the pump should be disposed such that it forms part of the wall of each of the pump chambers and has the membrane surface within the same plane.

On the other hand, while the cross-section of the micro flow passage needs to be small in order to provide a flow passage resistance (a channel resistance) having the characteristics, an excessively small cross-section requires machining accuracy, resulting in higher device manufacturing costs. In connection with this, it is possible for the micro flow passage to provide a flow passage resistance having the characteristics by securing the length of the channel (lengthening the channel). However, if the micro flow passage is extended only in a direction in which the path interests with the diaphragm's membrane surface (for example, a direction to allow intersection with the diaphragm's membrane surface at a right angle), the drive device needs to be thick.

Therefore, if the micro flow passage of the micro flow passage portion is configured as described in the configuration such that the channel is extended in a direction parallel to the diaphragm's membrane surface and such that the channel of the channel forming portion and the internal pressure buffering chamber of the internal-pressure-buffering-chamber-forming portion, each of which is a space having its longitudinal direction within a plane parallel to the membrane surface of the diaphragm, are disposed and configured to allow communication with each other via the micro flow passage, it is possible to dispose the channel, the internal pressure buffering chamber and the micro flow passage within the thickness of each of them. Thus, very thin (slim) drive devices can be provided. Moreover, since it is possible to increase the surface area of such a slim drive device relative to the overall volume of the device, heat generated by operation can be readily radiated externally, thus ensuring stable operation.

EMBODIMENTS OF THE INVENTION

Embodiments of the drive device according to the present invention will now be described with reference to the drawings. However, the present invention is not limited to these embodiments, and on the basis of knowledge of persons with ordinary skill in the art, various changes, modifications, and improvements can be made without departing from the scope of the present invention.

Figure 1:
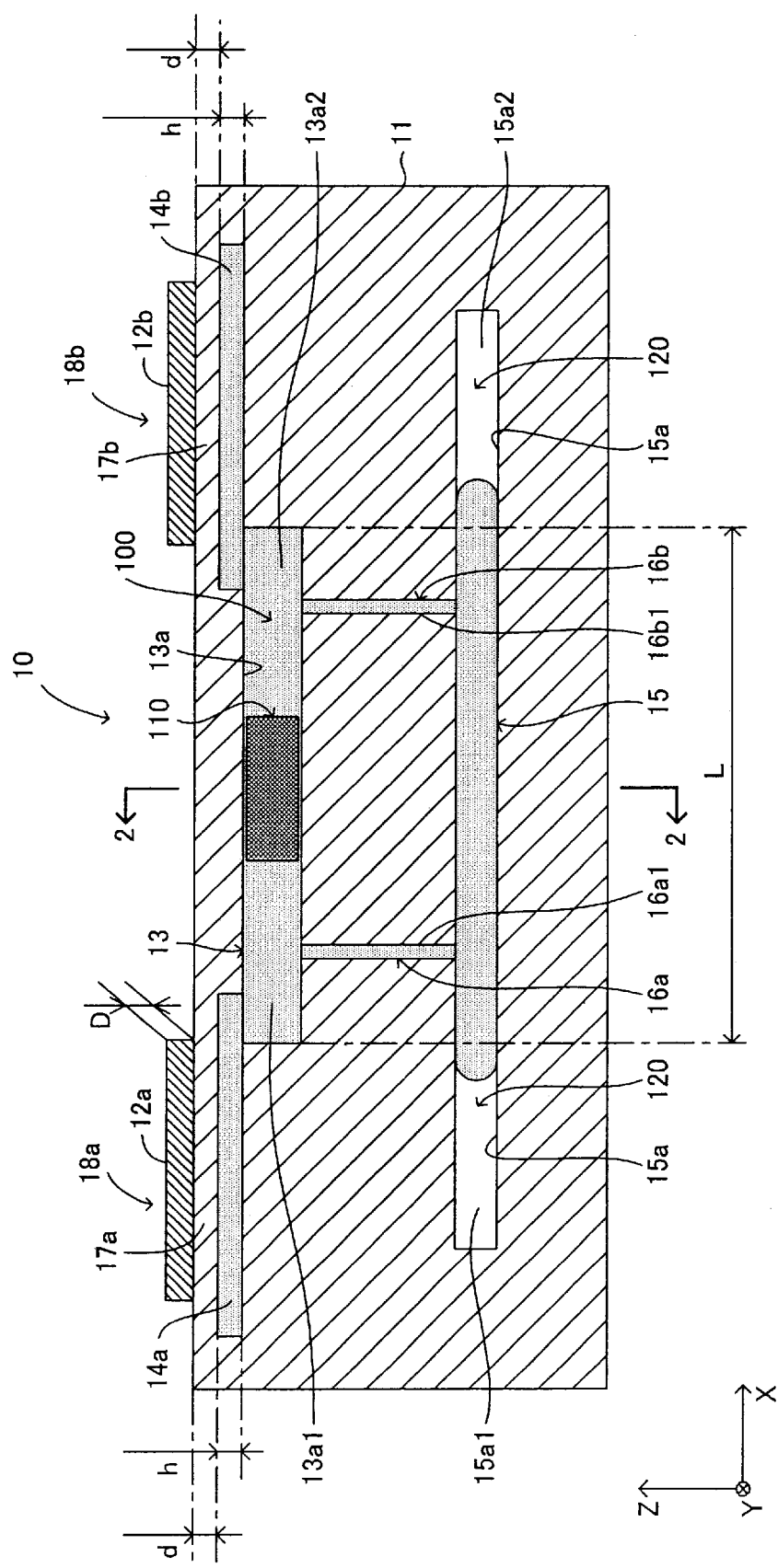
FIG. 1 is a sectional view of a drive device according to a first embodiment of the present invention.
Figure 2:
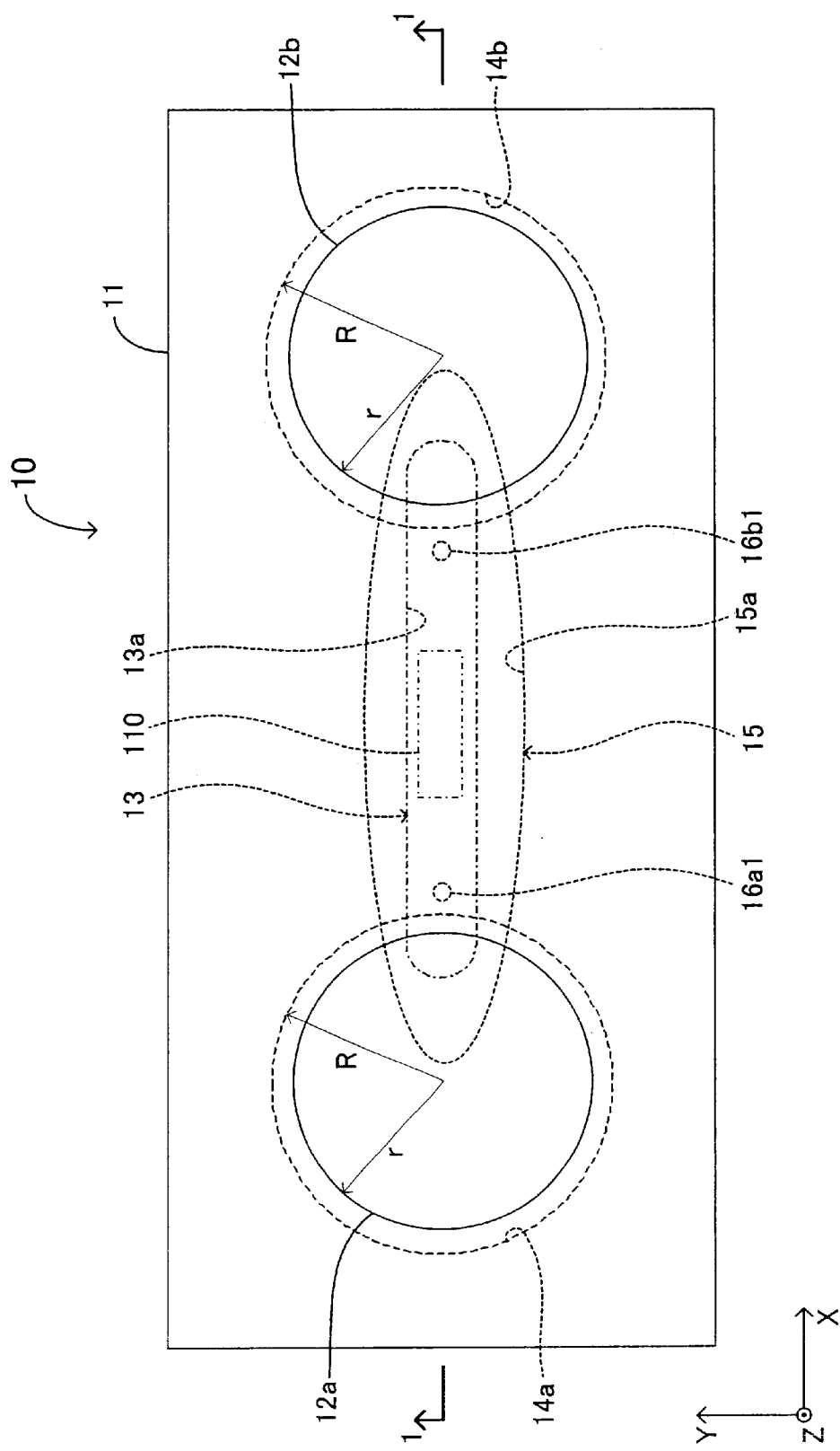
FIG. 2 is a plan view of the drive device shown in FIG. 1.

FIG. 1 is a vertical sectional view of a drive device 10 according to a first embodiment of the present invention, and FIG. 2 is a plan view of the drive device 10. Notably, FIG. 1 is a sectional view of the drive device 10 taken along line 1—1 in FIG. 2.

The drive device 10 comprises a base body 11 formed of a ceramic of substantially rectangular parallelepiped shape having sides which respectively extend along the X-axis, Y-axis, and Z-axis directions, which are mutually perpendicular; and a pair of piezoelectric films (piezoelectric/electrostictive elements) 12a and 12b. The base body 11 includes a channel forming portion 13 (a channel forming portion may be called a flow passage forming portion), a pair of pump chambers 14a and 14b, an internal-pressure-buffering-chamber-forming portion 15, and a pair of micro flow passage portions 16a and 16b (a micro flow passage portion may be called a micro channel portion).

Figure 3:
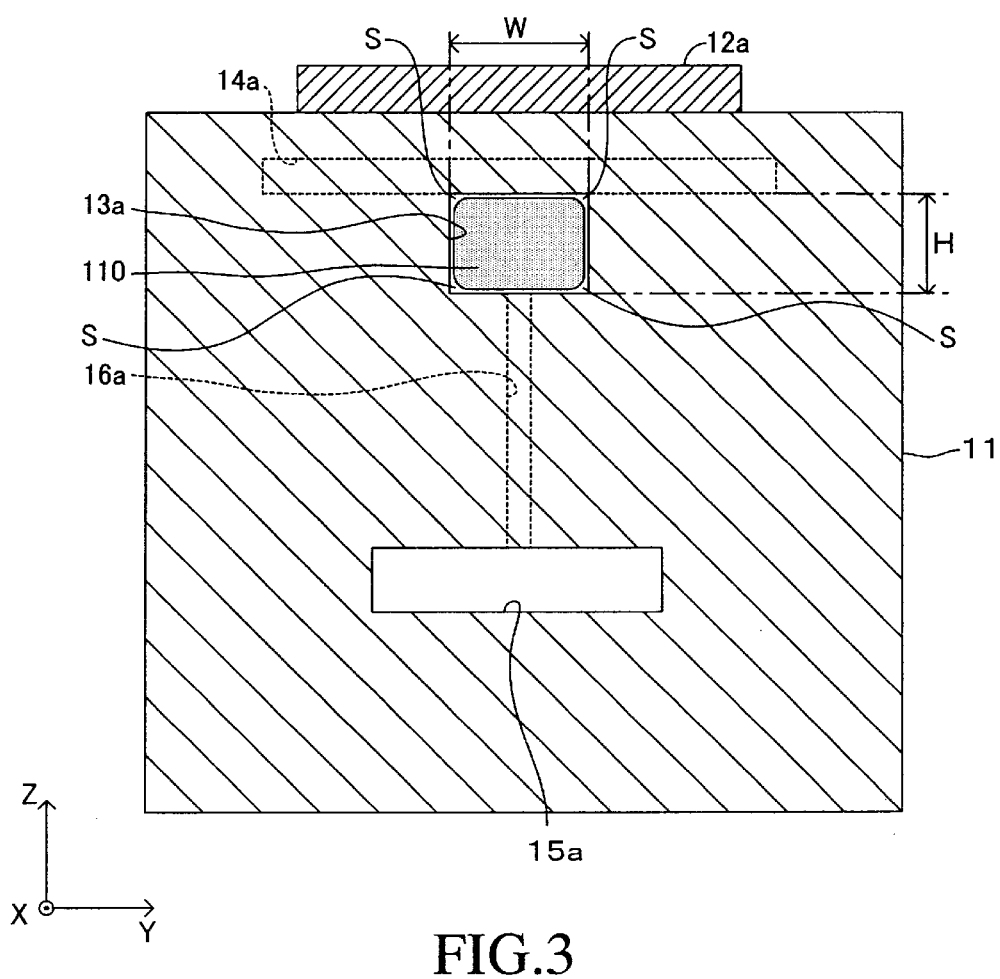
FIG. 3 is a sectional view of the drive device taken along line 2—2 in FIG. 1.

The channel forming portion 13 has a long axis along the X-axis direction. As shown in FIG. 3, which is a sectional view of the base body 11 taken along line 2—2 in FIG. 1 (along a plane parallel to the Y-Z plane), the channel forming portion 13 forms a channel 13a having a substantially rectangular cross section a channel may be called a flow passage). For example, the channel 13a has dimensions such that the width (along the Y-axis direction) W of the substantially rectangular cross section is 100 $\mu$m, the depth (along the Z-axis direction; i.e., height) H is 50 $\mu$m, and the longitudinal length (in the X-axis direction) L is 1 mm. Incompressible operation fluid (e.g., liquid such as water or oil) 100 and a movable body 110 which is formed from a material different from the operation fluid 100, such as magnetic material, liquid metal (e.g., gallium alloy), water, oil, or inert gas, are accommodated within the channel 13a. The channel 13a is divided substantially into two operation chambers 13a1 and 13a2 by means of the movable body 110. Within the channel 13a, the movable body 110 is present in the form of a single mass (liquid mass (vacuole), bubble, or micro solid) and, as shown in FIG. 3, forms very small clearances S at the four corners of the rectangular cross section of the channel 13a in order to permit passage of the operation fluid 100 therethrough.

The pump chamber 14a is a space in the form of a cylinder which has a center axis extending along the Z-axis direction and is filled with the operation fluid 100, the space being formed above the channel 13a in such a manner that a lower portion of the space communicates with one end portion of the passage 13a, located at the negative side in the direction of the X-axis. For example, the pump chamber 14a has dimensions such that the bottom and top surfaces of the cylinder have a radius R of 0.5 mm, and the depth (height) h is 10 $\mu$m. A ceramic diaphragm (diaphragm portion) 17a having a thickness (height) d of 10 $\mu$m is formed above the pump chamber 14a.

The pump chamber 14b has the same shape as the pump chamber 14a and is formed above the channel 13a in such a manner that a lower portion of the space communicates with the other end portion of the passage 13a, located at the positive side in the direction of the X-axis. The pump chamber 14b is filled with the operation fluid 100. A ceramic diaphragm 17b having the same shape as that of the diaphragm 17a is formed above the pump chamber 14b.

The piezoelectric film 12a constitutes a ceramic pump 18a together with the pump chamber 14a and the diaphragm 17a. The piezoelectric film 12a has a thickness D of 20 microns and assumes the shape of a circular thin plate which has a radius r slightly smaller than the radius R of the pump chambers as viewed from above. The piezoelectric film 12a is fixed to the upper surface of the diaphragm 17a in such a manner that the piezoelectric film 12a is located above the pump chamber 14a and that the center of the circular bottom surface of the piezoelectric film 12a coincides with the center of the pump chamber 14a. When a voltage is applied to unillustrated paired electrodes formed to sandwich the piezoelectric film 12a, the piezoelectric film 12a increases and decreases the volume of the pump chamber 14a by deforming the diaphragm 17a, to thereby pressurize or depressurize the operation fluid 100 within the pump chamber 14a. Notably, the piezoelectric film 12a is polarized in the positive direction of the Z-axis.

The piezoelectric film 12b has the same shape as the piezoelectric film 12a. The piezoelectric film 12b constitutes a ceramic pump 18b together with the pump chamber 14b and the diaphragm 17b. That is, the piezoelectric film 12b is fixed to the upper surface of the diaphragm 17b in such a manner that the piezoelectric film 12b is located above the pump chamber 14b. When a voltage is applied to unillustrated paired electrodes, the piezoelectric film 12b increases and decreases the volume of the pump chamber 14b by deforming the diaphragm 17b, to thereby pressurize or depressurize the operation fluid 100 within the pump chamber 14b. Notably, the piezoelectric film 12b is also polarized in the positive direction of the Z-axis.

The internal-pressure-buffering-chamber-forming portion 15 forms an internal-pressure buffering chamber 15a which assumes a substantially elliptical shape having a major axis along the X-axis direction as viewed from above. The internal-pressure buffering chamber 15a has a length along the X-axis greater than the length L of the channel 13a, a length along the Y-axis (minor axis) direction greater than the width W of the channel 13a, and has a substantially rectangular cross section, as shown in FIG. 3. The internal-pressure buffering chamber 15a is formed within the base body 11 to be located below the channel 13a (on the Z-axis negative direction side of the channel 13a) in such a manner that the major axis of the chamber 15a coincides with the center axis of the channel 13a as viewed from above. The above-described operation fluid 100 fills a substantially central portion of the chamber 15a with respect to the X-axis direction. A compressible fluid for pressure buffering (hereinafter may be referred to as a "compressible fluid") 120 (having a compressibility considerably lower than that of the operation fluid 100) fills the peripheral portions of the chamber 15a. In the present embodiment, the compressible fluid 120 is vapor of the operation fluid 100. However, a predetermined amount of an inert gas may be mixed into the vapor, or the vapor may be replaced with a gas not containing the vapor.

The micro flow passage portion 16a forms a micro flow passage 16a1 which extends along the Z-axis direction and assumes the shape of a hollow cylinder (a micro flow passage may be called a micro flow channel or a micro channel). The micro flow passage 16a1 connects the left-hand operation chamber 13a1 of the channel 13a with the internal-pressure buffering chamber 15a. The micro flow passage 16a1 is also filled with the operation fluid 100. For example, the micro flow passage 16a1 has dimensions such that the cylinder has a radius of 15 $\mu$m, and the length along the Z-axis direction (height of the cylinder) is 100 $\mu$m. The shape of the micro flow passage 16a1 is selected to produce (exhibit) a fluid resistance greater than that produced by the channel 13a. Specifically, the micro flow passage 16a1 has a throttle function which produces a high (large) passage resistance against abrupt pressure change of the operation fluid 100 within the channel 13a, to thereby substantially prohibit passage (movement) of the operation fluid 100 toward the internal-pressure buffering chamber 15a, and which does not produce passage resistance against slow pressure change of the operation fluid 100 within the channel 13a, to thereby substantially permit passage (movement) of the operation fluid 100 toward the internal-pressure buffering chamber 15a.

The micro flow passage portion 16b forms a micro flow passage 16b1, which has the same shape as the micro flow passage 16a1. The micro flow passage 16b1 connects the right-hand operation chamber 13a2 of the channel 13a with the internal-pressure buffering chamber 15a. The micro flow passage 16b1 is also filled with the operation fluid 100. The micro flow passage 16b1 also has a throttle function similar to that of the micro flow passage 16a1.

As described above, the operation fluid 100 continuously fills the channel 13a, the pair of pump chambers 14a and 14b, the pair of micro flow passages 16a1 and 16b1, and portions of the internal-pressure buffering chamber 15a which communicate with the channel 13a via the pair of micro flow passages 16a1 and 16b1. Further, the vapor 120 of the operation fluid 100 fills the spaces of the internal-pressure buffering chamber 15a that are not filled with the operation fluid 100.

Figure 4:
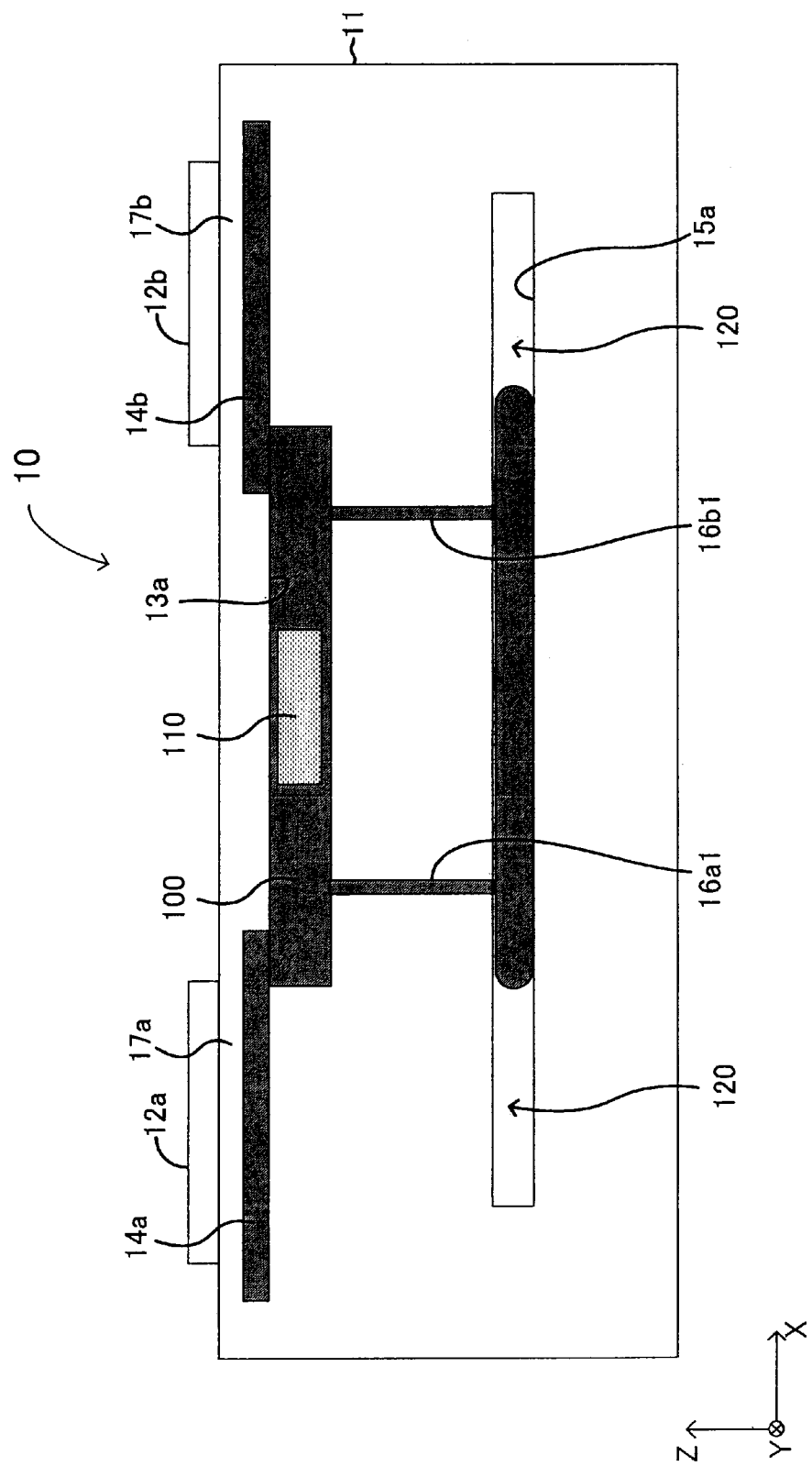
FIG. 4 is a sectional view of the drive device shown in FIG. 1, showing an initial state thereof.

Next, operation of the drive device 10 configured as described above will be described with reference to FIGS. 4 to 7, which show different operation states. FIG. 4 shows an initial state of the drive device 10 in which drive voltage is applied to none of the electrodes of the piezoelectric films 12a and 12b. In this case, since both the pump chambers 14a and 14b maintain their initial volumes, the operation fluid 100 charged into the pump chambers 14a and 14b and the channel 13a is neither pressurized or depressurized. Consequently, the movable body 110 accommodated within the channel 13a remains at the initial position (at the substantially central portion of the channel 13a with respect to the X-axis direction).

Figure 5:
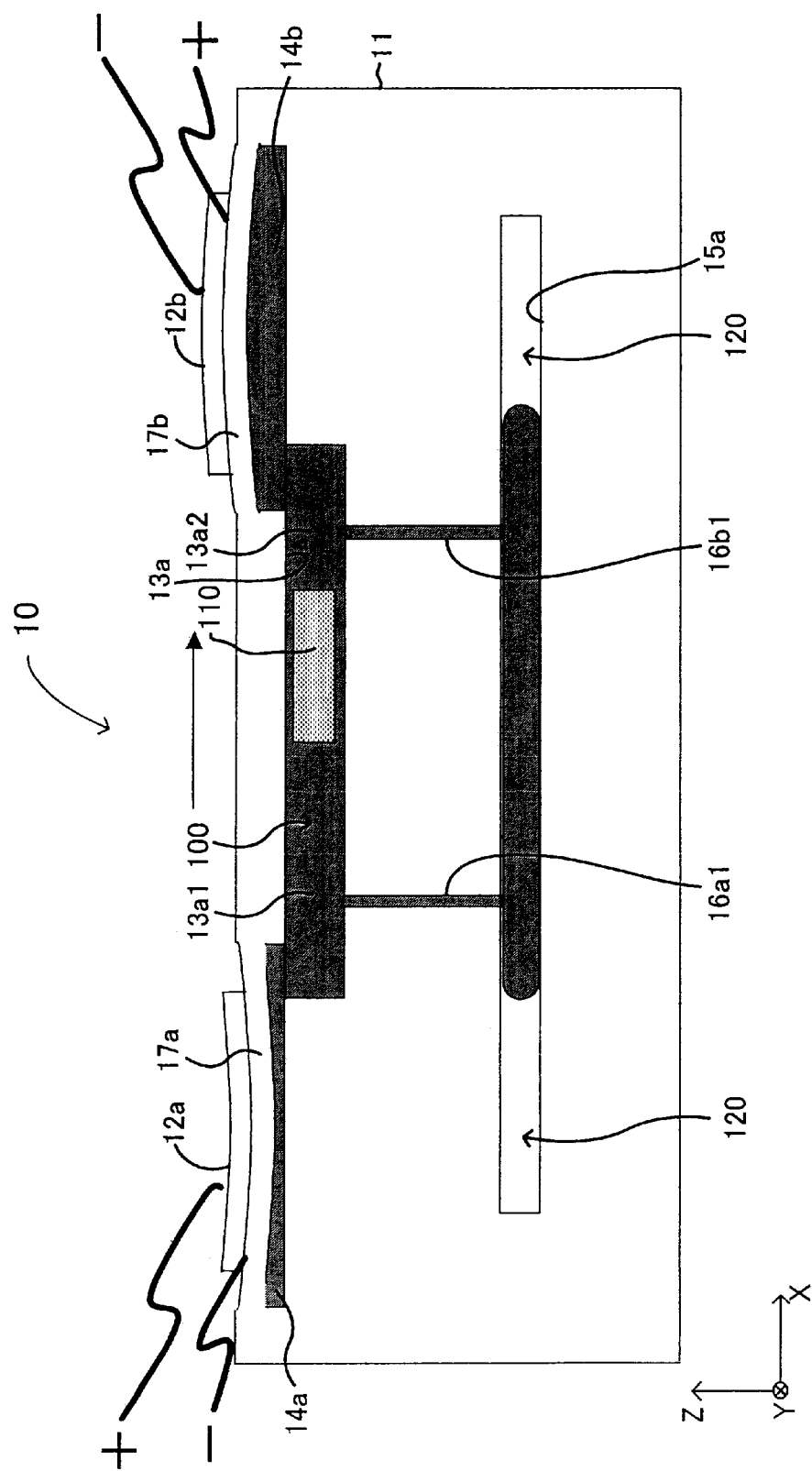
FIG. 5 is a sectional view of the drive device shown in FIG. 1, showing an operated state thereof.

During drive, as shown in FIG. 5, a voltage is applied to the upper and lower electrodes of the piezoelectric film 12a disposed on the diaphragm 17a of the pump chamber 14a in such a manner that the upper electrode assumes a positive polarity and the lower electrode assumes a negative polarity. Simultaneously, a voltage is applied to the upper and lower electrodes of the piezoelectric film 12b disposed on the diaphragm 17b of the pump chamber 14b in such a manner that the upper electrode assumes a negative polarity and the lower electrode assumes a positive polarity.

As a result, the piezoelectric film 12a contracts along the transverse direction (i.e., in a plane substantially parallel to the X-Y plane, or in the direction perpendicular to the direction of the thickness D of the piezoelectric film 12a), so that the diaphragm 17a above the pump chamber 14a bends and deforms downward to thereby reduce the volume of the pump chamber 14a. As a result, the operation fluid 100 within the pump chamber 14a is pressurized, so that the operation fluid 100 flows from the pump chamber 14a to the operation chamber 13a1 of the channel 13a. Simultaneously, the piezoelectric film 12b expands along the transverse direction (i.e., in a plane substantially parallel to the X-Y plane), so that the diaphragm 17b bends and deforms upward to thereby increase the volume of the pump chamber 14b. As a result, the operation fluid 100 within the pump chamber 14b is depressurized, so that the operation fluid 100 flows from the operation chamber 13a2 of the channel 13a to the pump chamber 14b. Accordingly, due to the pressure difference between the pump chambers 14a and 14b, the movable body 110 accommodated within the channel 13a moves from the operation chamber 13a1 (pump chamber 14a) toward the operation chamber 13a2 (pump chamber 14b) (i.e., in the positive direction of the X-axis).

Figure 6:
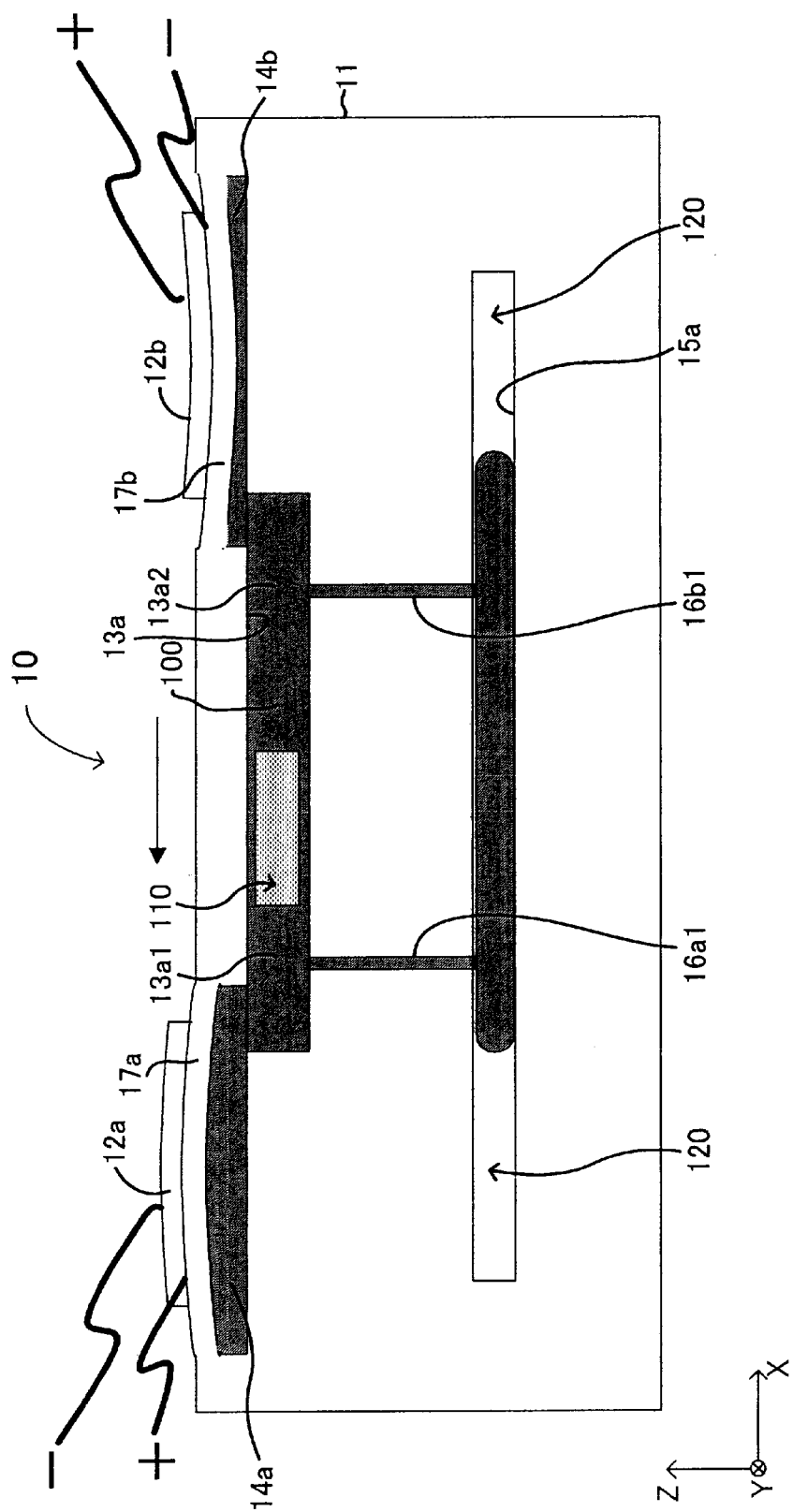
FIG. 6 is a sectional view of the drive device shown in FIG. 1, showing another operated state thereof.
Figure 7:
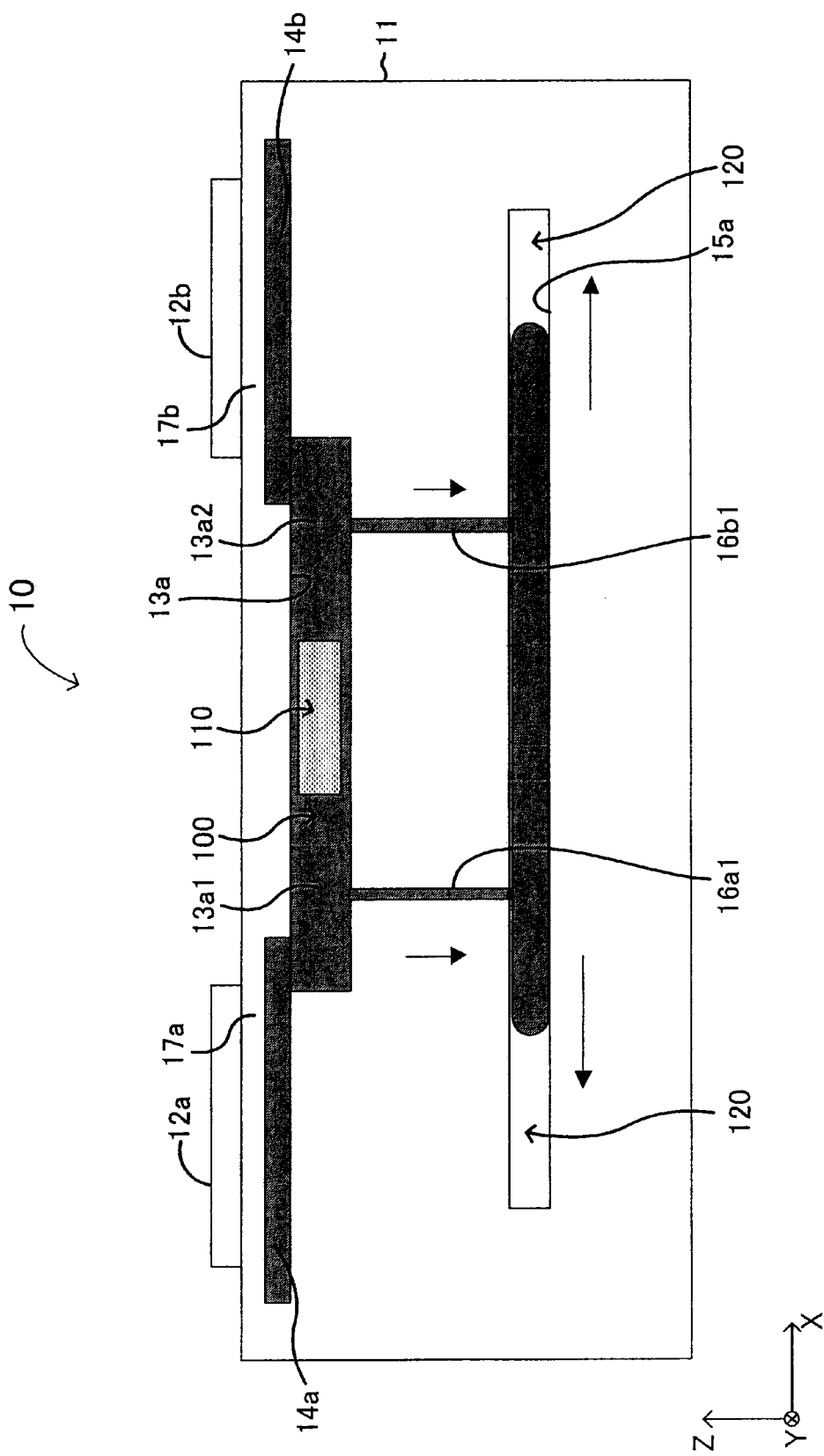
FIG. 7 is a sectional view of the drive device shown in FIG. 1, showing flow of operation fluid when the ambient temperature increases.

Further, when, as shown in FIG. 6, a voltage is applied to the upper and lower electrodes of the piezoelectric film 12a in such a manner that the upper electrode assumes a negative polarity and the lower electrode assumes a positive polarity, and simultaneously, a voltage is applied to the upper and lower electrodes of the piezoelectric film 12b in such a manner that the upper electrode assumes a positive polarity and the lower electrode assumes a negative polarity, the operation fluid 100 within the pump chamber 14b is pressurized, and the operation fluid 100 within the pump chamber 14a is depressurized. Due to the pressure difference, the movable body 110 moves from the operation chamber 13a2 (pump chamber 14b) toward the operation chamber 13a1 (pump chamber 14a) (i.e., in the negative direction of the X-axis).

During such ordinary driving, pressurization and depressurization of the pump chambers 14a and 14b are performed at high speed through operation of changing the voltages applied to the piezoelectric films 12a and 12b at high speed (i.e., by increasing the speed at which the applied voltages are increased and decreased). As a result, the passage resistances of the micro flow passages 16a1 and 16b1 increase sufficiently, and the operation fluid 100 within the channel 13a does not move to, or return from, the micro flow passages 16a1 and 16b1. Therefore, the pressure difference generated between the operation chambers 13a1 and 13a2 of the channel 13a acts on the movable body 110 without decreasing (without generation of so-called pressure escaping). Accordingly, the movable body 110 moves without fail.

Incidentally, in the case of a drive device which does not include the micro flow passages 16a1 and 16b1 and the internal-pressure buffering chamber 15a, when the operation fluid 100 thermally expands due to an increase in the environment temperature of the drive device, the pressure of the operation fluid 100 becomes excessive, possibly raising a problem such that the pump chambers 14a and 14b increase in volume, and the diaphragms 17a and 17b are pushed up and broken. Further, in the case in which the base body 11 is formed of an assembly of bonded ceramic sheets, there arises the problem such that a bonded portion (the seal of the bonded portion) is broken, and the operation fluid 100 leaks.

Figure 8:
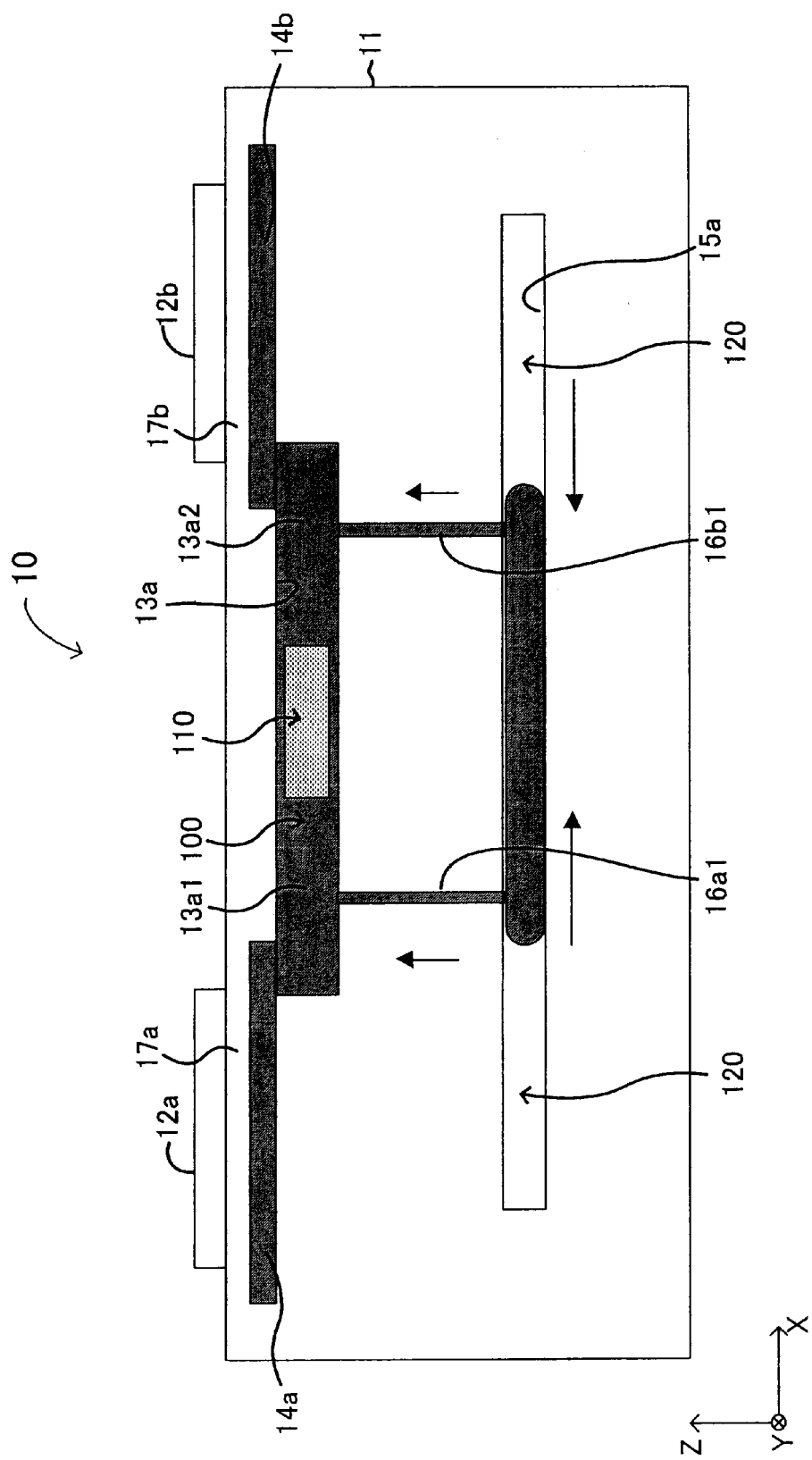
FIG. 8 is a sectional view of the drive device shown in FIG. 1, showing flow of the operation fluid when the ambient temperature decreases.

By contrast, the drive device 10 according to the present invention is provided with the micro flow passages 16a1 and 16b1 and the internal-pressure buffering chamber 15a. In addition, since the temperature increase of the operation fluid 100 occurs slowly, the pressure of the operation fluid 100 increases slowly. Accordingly, as indicated by arrows in FIG. 7, an amount of the operation fluid 100 corresponding to expansion due to temperature elevation flows into the internal-pressure buffering chamber 15a via the micro flow passages 16a1 and 16b1, which produce an extremely low passage resistance against such slow increase in pressure of the operation fluid 100. Within the internal-pressure buffering chamber 15a, the vapor 120 of the operation fluid 100 is compressed, and pressure increase occurs. However, the pressure increase of the operation fluid 100 is slight, because the compressibility of gas is lower than that of liquid. Accordingly, there can be avoided the situation in which the diaphragms 17a and 17b above the pump chambers 14a and 14b are pushed up and broken and the situation in which a seal of the bond-assembled portion is broken, with resultant leakage of the operation fluid 100. Further, when the operation fluid 100 thermally contracts due to a decrease in the environmental temperature of the drive device 10, as indicated by arrows in FIG. 8, the operation fluid 100 returns from the internal-pressure buffering chamber 15a to the channel 13a via the micro flow passages 16a1 and 16b1, because the temperature decrease of the operation fluid 100 occurs slowly.

As described above, by virtue of provision of the micro flow passages 16a1 and 16b1 and the internal-pressure buffering chamber 15a, the drive device 10 can be used within a wide temperature range, and can have enhanced reliability and durability.

Figure 9:
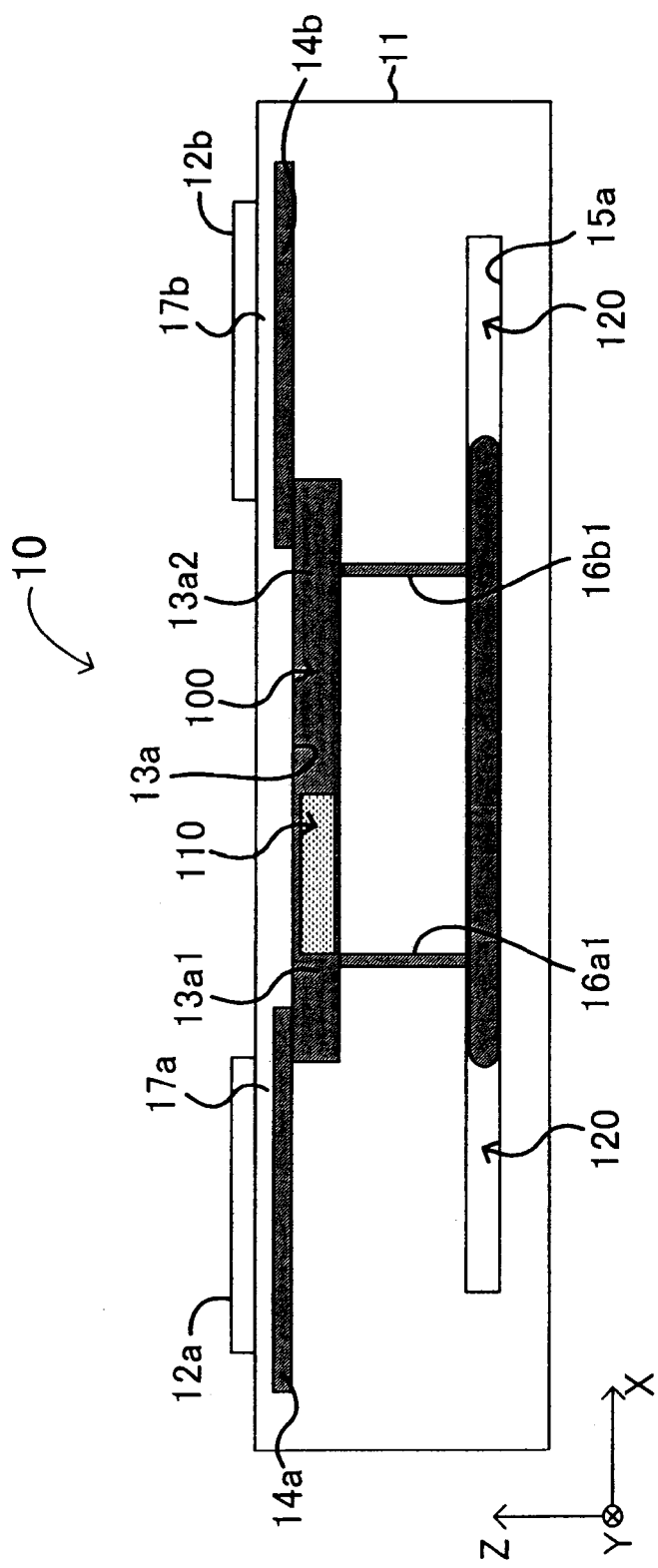
FIG. 9 is a view used for explaining an operation for finely adjusting the position of a movable body of the drive device shown in FIG. 1.

Next, an operation which the drive device 10 performs in the initial state in order to finely adjust the position of the movable body 110 will be described by reference to FIGS. 9 to 12. Here, it is assumed that, as shown in FIG. 9, in the initial state the movable body 110 remains at a position deviated to the side toward the piezoelectric film 12a. Such a state may result from variation, or erroneous work, involved in a fabrication process to be described later; specifically, in a step of placing the movable body 110 in the channel 13a.

Figure 10:
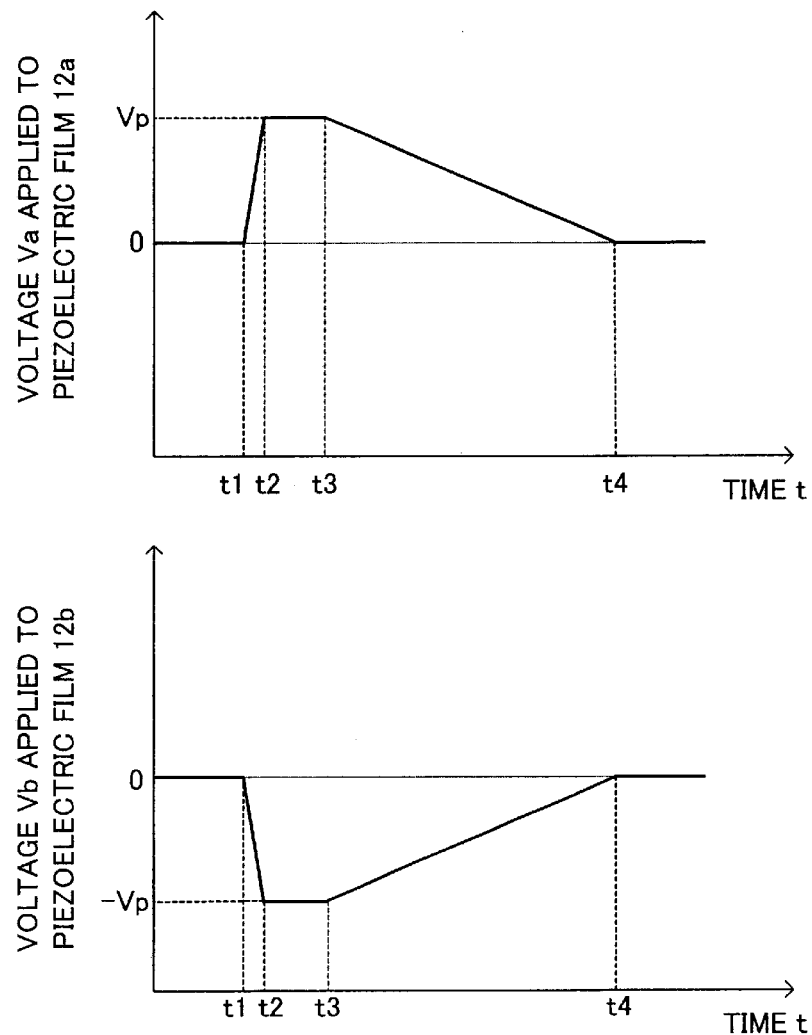
FIG. 10 is a pair of time charts showing waveforms of voltages which are applied to piezoelectric films of the drive device shown in FIG. 1 for the purpose of fine adjustment of the position of the movable body of the drive device.
Figure 11:
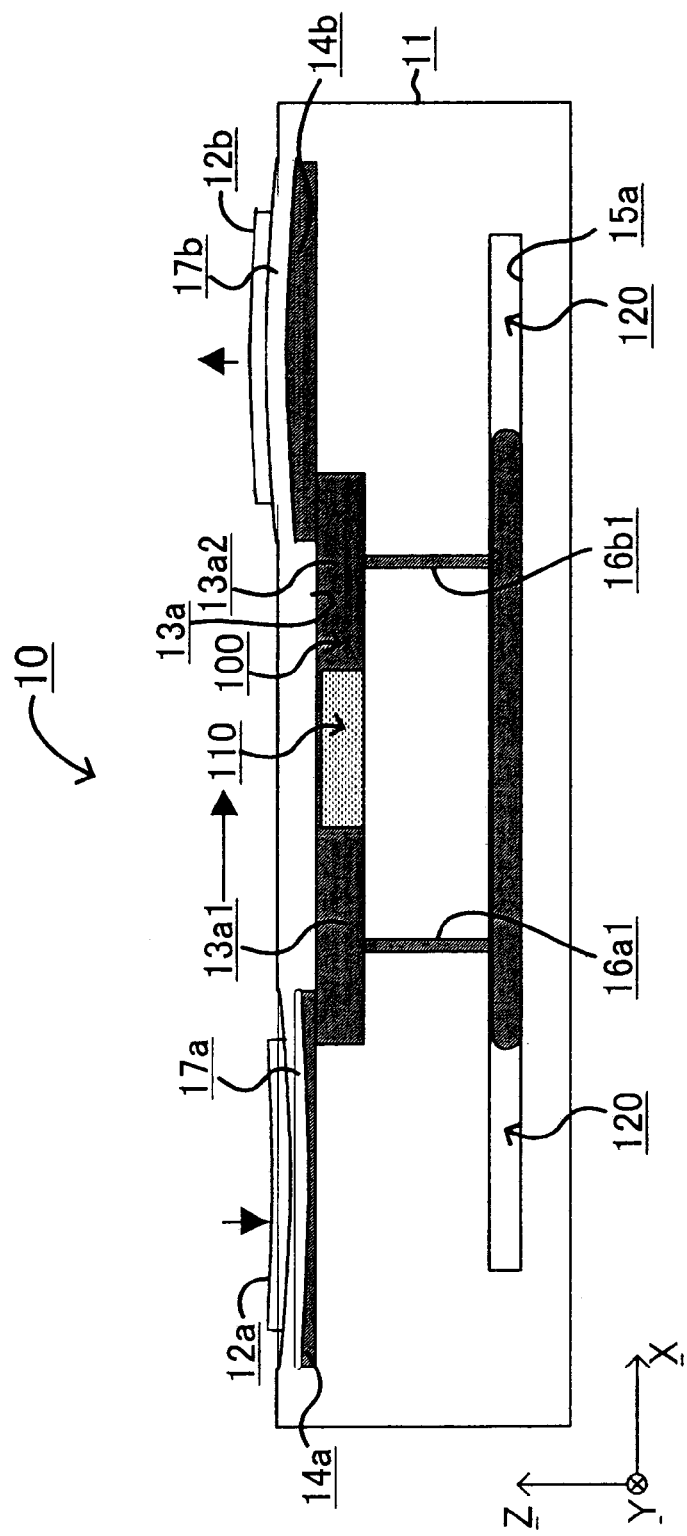
FIG. 11 is a view used for explaining an operation for finely adjusting the position of the movable body of the drive device shown in FIG. 1.

First, during a period of time from t1 to t2 shown in FIG. 10, voltages Va and Vb, which change at high speed, are applied to (the electrodes of) the piezoelectric films 12a and 12b. For example, the applied voltage Va is a drive voltage whose absolute value increases from 0 V to 50 V during a period of 1 to 20 $\mu$sec and which has a polarity such that the upper electrode becomes the positive side and the lower electrode becomes the negative side. Similarly, the applied voltage Vb is a drive voltage whose absolute value increases from 0 V to 50 V during a period of 1 to 20 $\mu$sec and which has a polarity such that the upper electrode becomes the negative side and the lower electrode becomes positive side. As a result, as shown in FIG. 11, the operation fluid 100 is pressurized in the pump chamber 14a and is depressurized in the pump chamber 14b, so that the movable body 110 moves toward the center (toward the pump chamber 14b). In this case, since the applied voltages Va and Vb change at high speed, the passage resistances of the micro flow passages 16a1 and 16b1 become sufficiently large, and thus the operation fluid 100 within the channel 13a does not move to, or return from, the micro flow passages 16a1 and 16b1.

Figure 12:
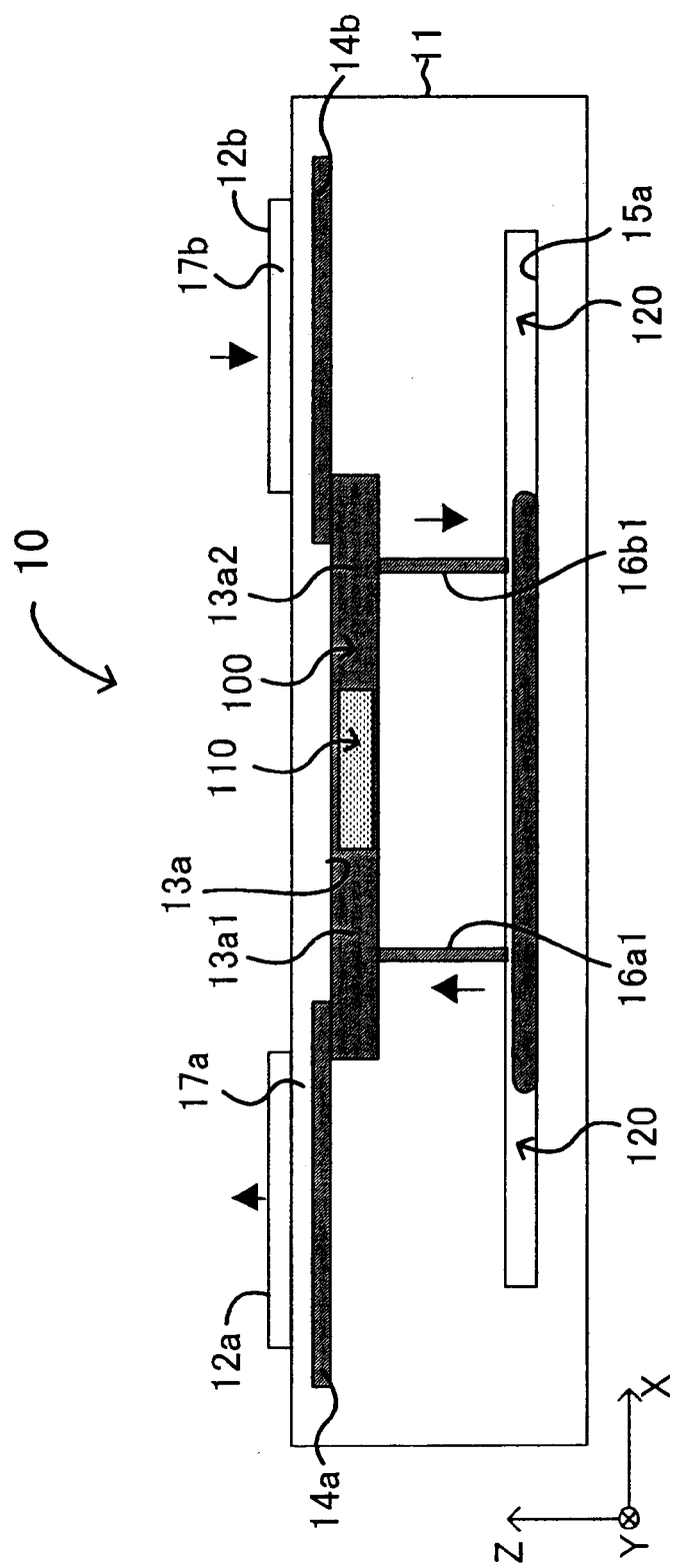
FIG. 12 is a view used for explaining an operation for finely adjusting the position of the movable body of the drive device shown in FIG. 1.

Subsequently, during a short period of time from t2 to t3 shown in FIG. 10, the applied voltages Va and Vb are maintained constant; and during a subsequent period of time from t3 to t4, the absolute values of the applied voltages Va and Vb are decreased slowly to 0 V over a period of, for example, about 0.1 to 1 sec. In this case, since the passage resistances of the micro flow passages 16a1 and 16b1 become small, as shown in FIG. 12, the operation fluid 100 within the right-hand operation chamber 13a2 of the channel 13a flows into the internal-pressure buffering chamber 15a via the micro flow passage 16b1, and the operation fluid 100 within the internal-pressure buffering chamber 15a flows into the left-hand operation chamber 13a1 of the channel 13a via the micro flow passage 16a1. That is, the pressure change of the operation fluid 100 becomes sufficiently slow such that pressure escapes via the micro flow passages 16a1 and 16b1, and the internal pressure of the pump chamber 14a and 14b and the channel 13a hardly changes. Thus, the movable body 110 can be maintained stationary. Alternatively, as compared with the moving distance L0 of the movable body 110 upon application of voltages during the period of t1 to t2, the return distance L1 of the movable body 110 during the period of t3 to t4 can be reduced to about one-tenth (L1=L0/10).

Through performing the above-described operation once or a plurality of times, the movable body 110 can be positioned at a desired initial position. Further, the movable body 110 can be stopped at a desired position through appropriate selection of the peak values Vp and −Vp of the applied voltages Va and Vb shown in FIG. 10, the voltage change speed at which the applied voltages Va and Vb are changed to the peak values Vp and −Vp, and the voltage change speed at which the applied voltages Va and Vb are changed from the peak values Vp and −Vp to 0 V.

In the above-described embodiment, through application of voltages to the piezoelectric films 12a and 12b, electric fields are applied to the piezoelectric films 12a and 12b in the positive direction (in the present embodiment, Z-axis positive direction) and the negative direction (Z-axis negative direction), respectively. However, in some cases, application of such electric fields is not desirable, because an electric field of a direction opposite the polarization direction of the piezoelectric films 12a and 12b cancels the polarization if the intensity of the electric field exceeds that of a coercive field. In view of this, a bias voltage may be applied so as to establish the initial state of the drive device 10. In this case, the drive device 10 can be driven through use of electric fields of the same direction as that of the polarization. Specifically, for example, when the potential of the lower electrode is maintained at 0 V, which is a reference potential, and a bias voltage of 25 V is applied to the upper electrode, an initial state is established. When the potential of the upper electrode of one piezoelectric film 12a or 12b is increased to 50 V, an electric field is applied to that piezoelectric film in the same direction as the polarization direction, so that the piezoelectric film contracts. As a result, the diaphragm 17a or 17b located under the piezoelectric film bends and deforms downward, and the corresponding pump chamber 14a or 14b pressurizes the operation fluid 100. Simultaneously, when the potential of the upper electrode of the other of the piezoelectric films 12a and 12b is decreased to 0 V, the contraction of that piezoelectric film is cancelled. Accordingly, the diaphragm 17a or 17b located under the piezoelectric film bends and deforms upward with respect to the initial state, and the corresponding pump chamber 14a or 14b depressurizes the operation fluid 100.

Figure 13:
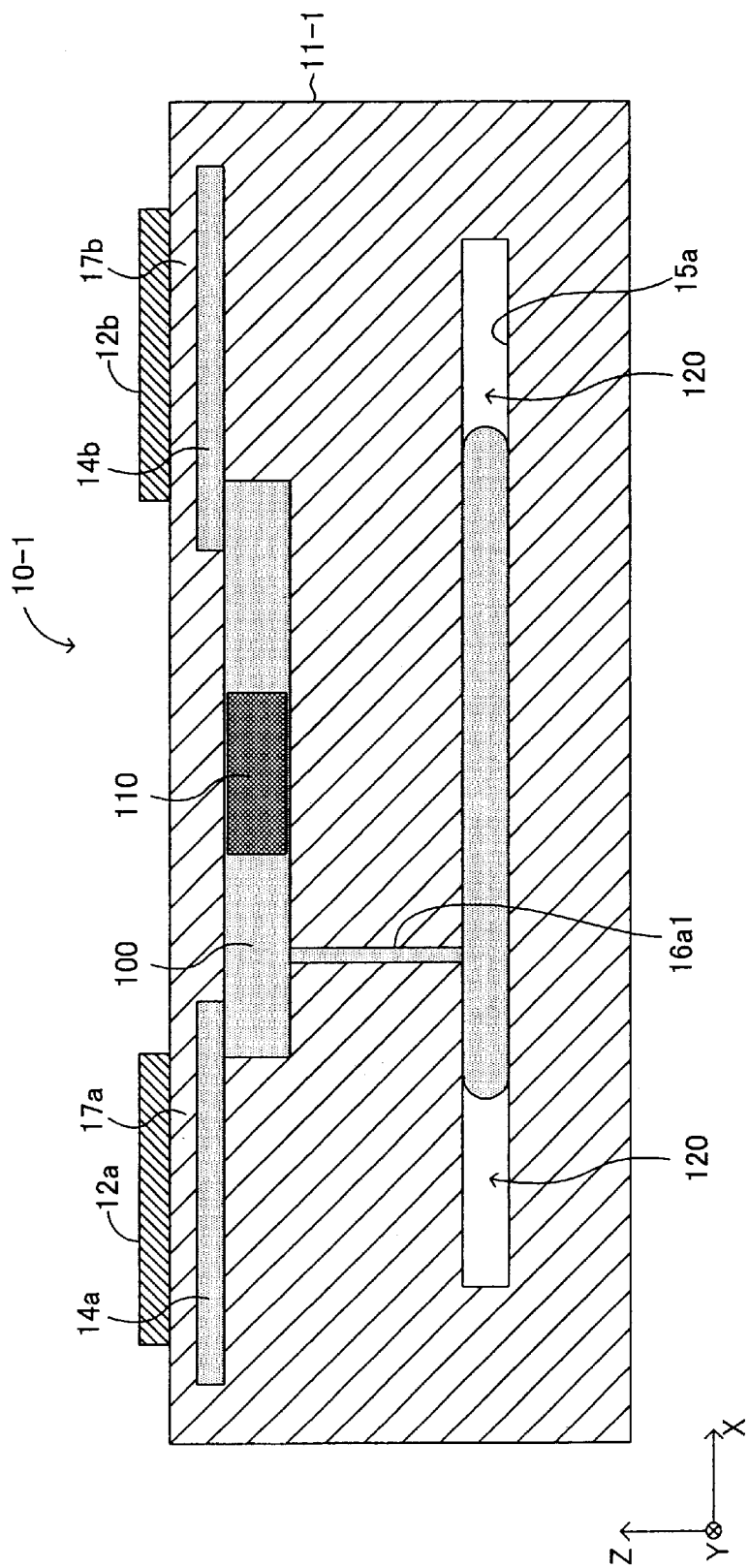
FIG. 13 is a sectional view of a modification of the drive device shown in FIG. 1.

Next, a modification of the drive device according to the first embodiment will be described with reference to FIG. 13. The drive device 10-1 according to this modification differs from the drive device 10 shown in FIG. 1 only in that a base body 11-1 of the drive device 10-1 includes a single micro flow passage 16a1, whereas the base body 11 of the drive device 10 has the pair of micro flow passages 16a1 and 16b1. This configuration can be employed only in the case in which the gap (clearance S shown in FIG. 3) between the movable body 110 and the channel 13a can have a cross section equal to or greater than a predetermined value. Since this configuration can halve labor and time required to machine the micro flow passages, the drive device 10-1 can be fabricated at lower cost. However, in this modification, the stationary position of the movable body 110 in the initial state in which no voltage is applied to the drive device 10-1 is difficult to control. In relation to this point, the drive device 10 of the first embodiment is considered superior.

Figure 14:
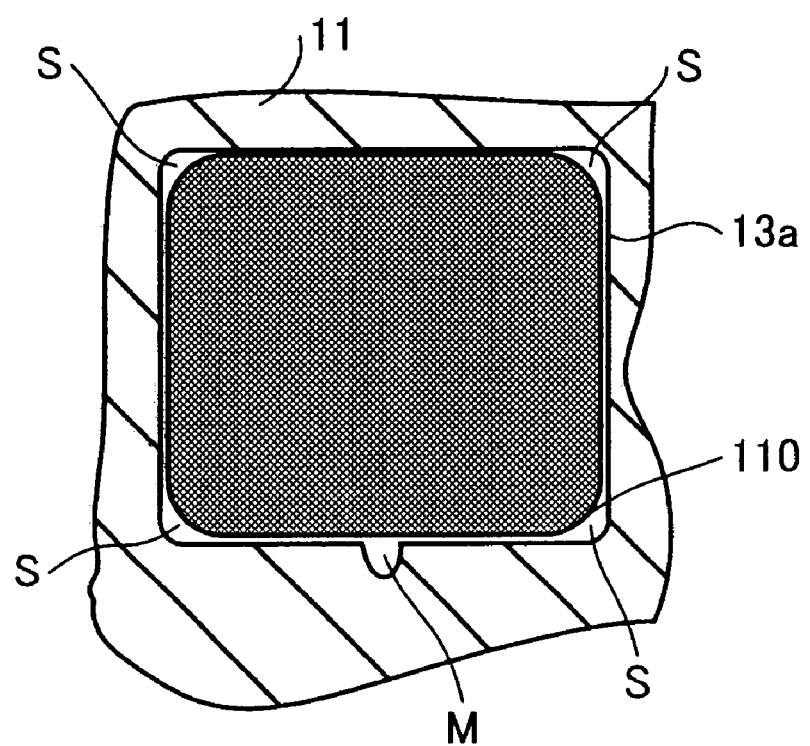
FIG. 14 is a sectional view showing a modification of a channel of the drive device shown in FIG. 1.

Note that in addition to the above-described gap (clearance S), as shown in, for example, FIG. 14, which shows across section of the channel 13a, a micro groove M may be formed in the wall surface of the channel 13a. The micro groove M is configured in such a manner that the operation fluid 100 can enter the groove M insofar as the pressure change of the operation fluid 100 is slow and the surface of the movable body 110 cannot enter the micro groove M. Notably, the micro groove M can be applied to other embodiments of the present invention, and the number and shape of the micro grooves may be selected appropriately.

Further, the piezoelectric/electrostictive film type actuator for a display device disclosed in Japanese Patent Application Laid-Open (kokai) No. 10-78549 can be applied to the piezoelectric films 12a and 12b, the diaphragms 17a and 17b, and the pump chambers 14a and 14b of the above-described drive devices 10 and 10-1 (and drive devices of other embodiments described later). Since this actuator is small and can produce a large pressurizing force, it is suitable for the drive device of the present invention.

Further, when the drive which has been described with reference to FIGS. 4 to 6 is employed, an important consideration is that the piezoelectric films 12a and 12b be formed of a piezoelectric material which has a large coercive electric field, because of occurrence of a state in which voltage is applied to the piezoelectric films 12a and 12b in the direction opposite the polarization direction of the piezoelectric films 12a and 12b. When the intensity of a coercive electric field is low, the polarization may be disturbed through application of voltage in the direction opposite the polarization direction.

In order to reduce the amount of thermal expansion and contraction of the operation fluid 100 stemming from variation in the environmental temperature, the volumes of the pump chambers 14a and 14b are desirably reduced to a minimum required value. In order to achieve this, the method disclosed in Japanese Patent Application Laid-Open (kokai) No. 9-229013 is preferably used to fabricate a diaphragm substrate used in the process of fabricating the above-described piezoelectric/electrostictive film type actuator, because the disclosed method can reduce the depths of the pump chambers 14a and 14b to about 5 (minimum) to 10 $\mu$M.

Figure 15:
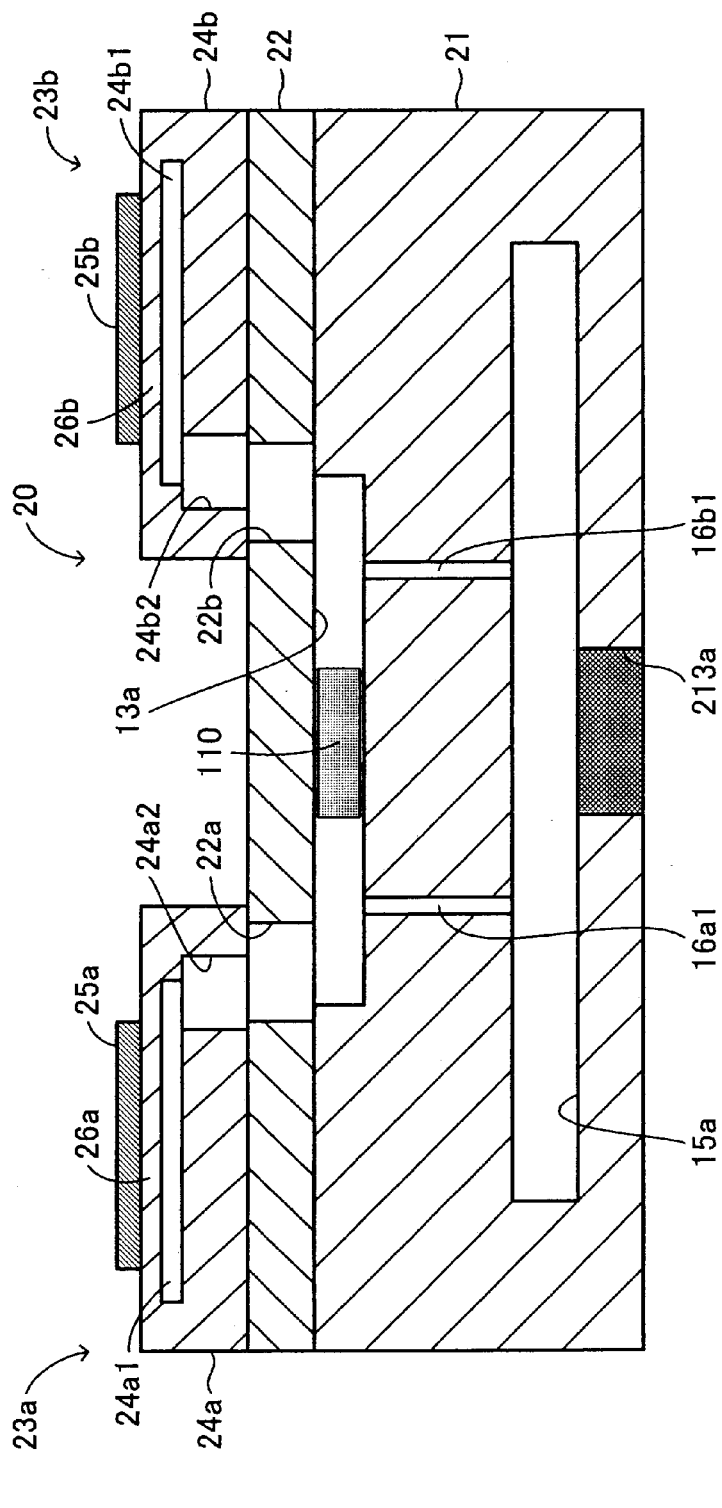
FIG. 15 is a sectional view of a drive device according to a second embodiment of the present invention.
Figure 16:
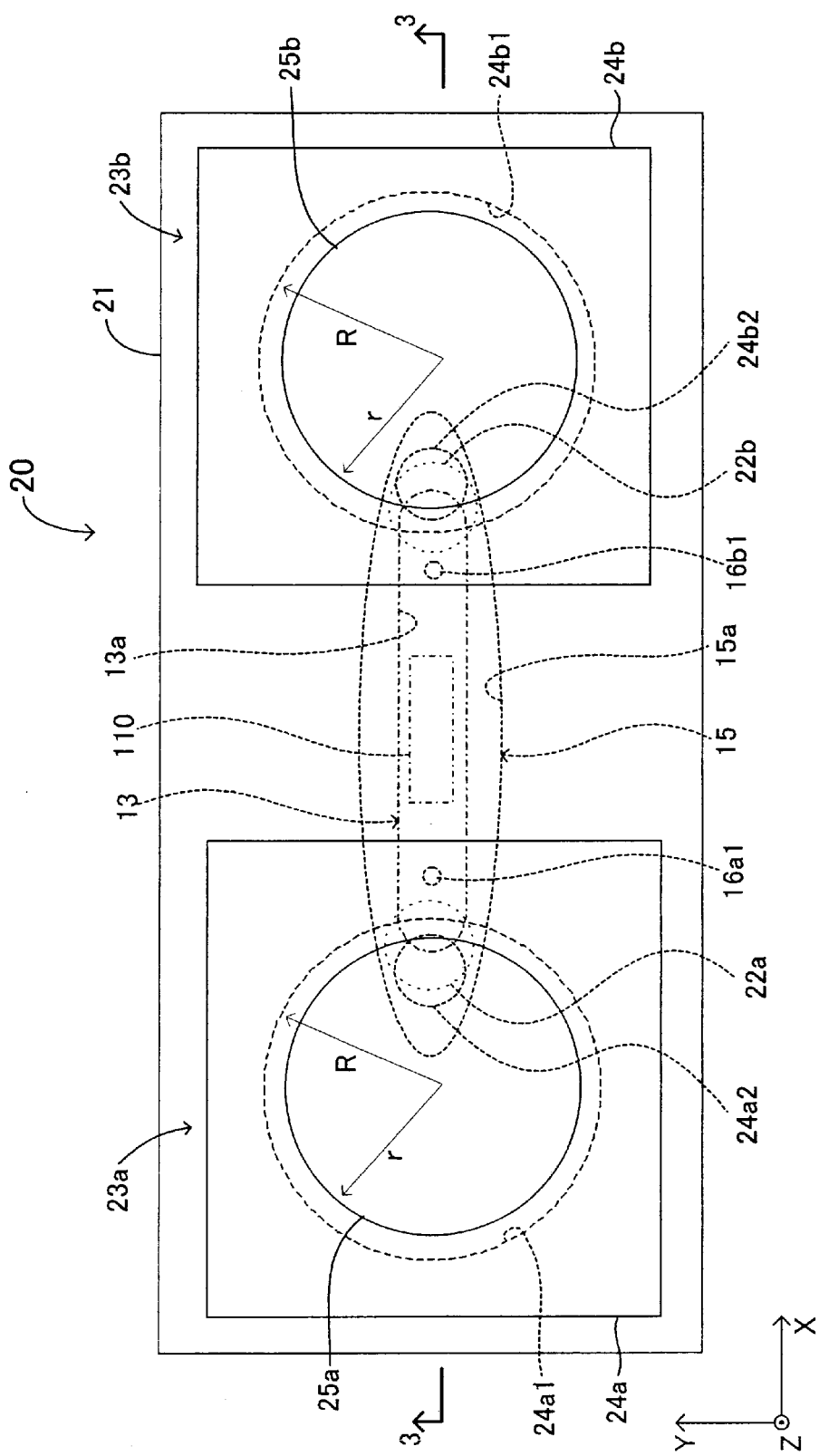
FIG. 16 is a plan view of the drive device shown in FIG. 15.

Next, a drive device 20 according to a second embodiment of the present invention will be specifically described, together with a method of fabricating the device. FIG. 15 is a vertical sectional view of the drive device 20, and FIG. 16 is a plan view of the drive device 20. Notably, FIG. 15 is a sectional view of the drive device 20 taken along line 3—3 in FIG. 16. In the following description, the same structural portions in respective embodiments are denoted by the same reference numerals, and their detailed descriptions are not repeated.

The drive device 20 includes a base body 21 having a channel 13a which is formed to be exposed at the upper surface thereof; a connection plate (connection substrate) 22 disposed on the base body 21 and formed of a ceramic thin plate; and a pair of ceramic pumps 23a and 23b disposed on the connection plate 22.

The connection plate 22 includes left-hand and right-hand channel connection holes 22a and 22b, which are formed at positions separated from each other along the X-axis direction and each assume the shape of a hollow cylinder. The bottom ends of the channel connection holes 22a and 22b are connected to the opposite end portions of the channel 13a with respect to the X-axis direction.

Each of the ceramic pumps 23a and 23b is a thin plate formed of ceramics. The ceramic pumps 23a and 23b include pump-chamber forming portions 24a and 24b having a substantially square shape as viewed from above; and piezoelectric films 25a and 25b fixed to the upper surfaces of the pump-chamber forming portions 24a and 24b, respectively. The pump-chamber forming portions 24a and 24b include pump chambers 24a1 and 24b1 having a shape similar to that of the pump chambers 14a and 14b of the drive device 10 according to the first embodiment; thin-plate-shaped diaphragms 26a and 26b formed on the pump chambers 24a1 and 24b1, respectively; and pump-chamber connection holes 24a2 and 24b2 which each assume the shape of a hollow cylinder and which connect bottom portions of the pump chambers 24a1 and 24b1 with the upper portions of the channel connection holes 22a and 22b. The pump chambers 24a1 and 24b1 and the pump-chamber connection holes 24a2 and 24b2 are filled with the operation fluid 100 as in the case of the channel connection holes 22a and 22b and the channel 13a.

The ceramic pumps 23a and 23b are piezoelectric/electrostictive film type actuators which are fabricated by utilization of the method and structure disclosed in the above-mentioned Japanese Patent Application Laid-Open No. 7-214779, as well as Japanese Patent Application Laid-Open No. 10-78549. The ceramic pumps 23a and 23b are formed on the base body 21 which serves as a channel substrate, in a stacked configuration.

The operation of the drive device 20 for driving (moving) the movable body 110 is the same as that of the drive device 10. Further, the operation of the drive device 20 for absorbing changes in the internal pressure due to thermal expansion and contraction of the operation fluid 100 charged into the pump chambers 24a1 and 24b1, the pump-chamber connection holes 24a2 and 24b2, the channel connection holes 22a and 22b, and the channel 13a is also the same as that of the drive device 10.

Figure 17:
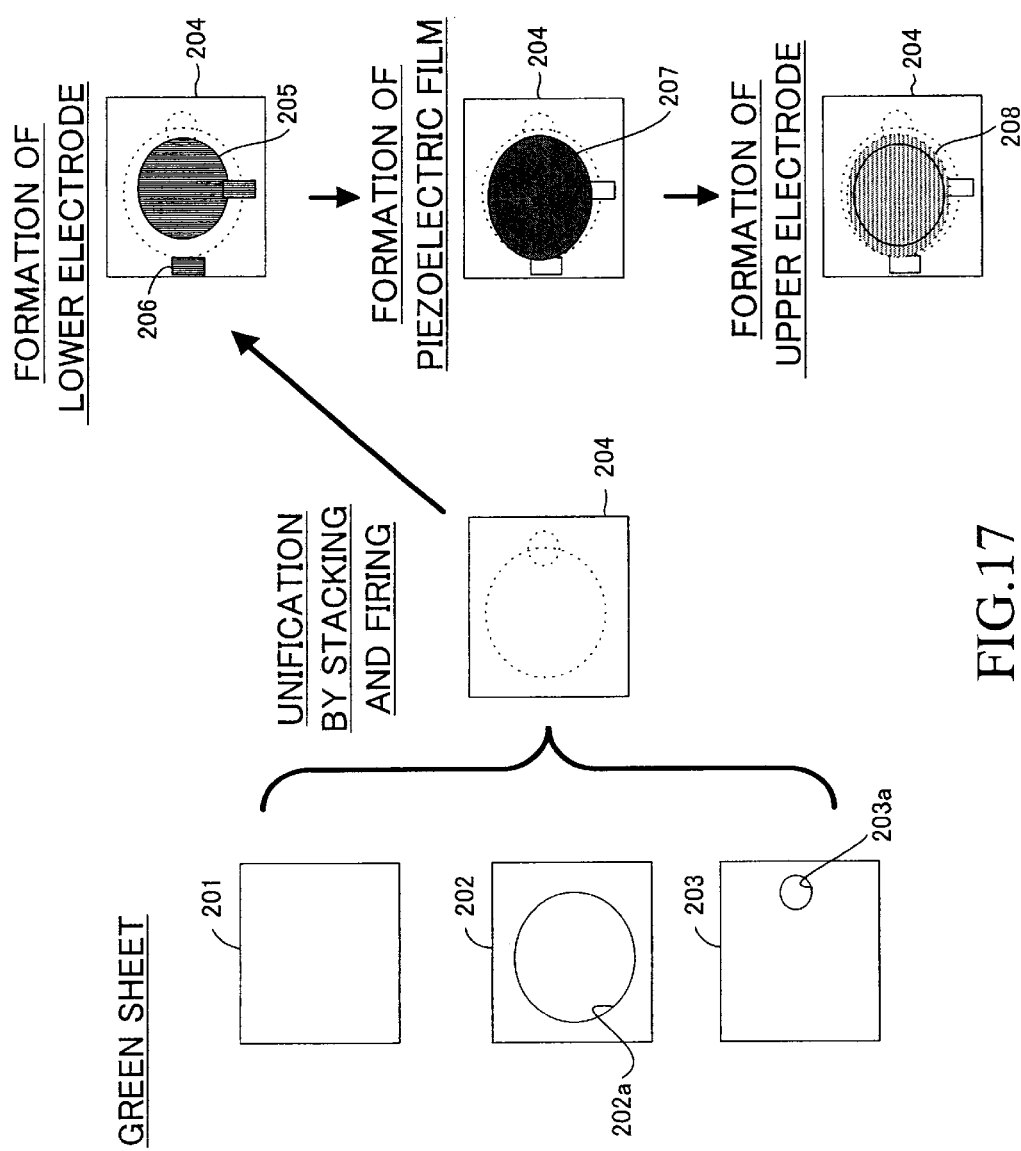
FIG. 17 is a conceptional diagram showing a process of fabricating a piezoelectric/electrostictive actuator of the drive device shown in FIG. 15.

Next, a method of fabricating the drive device 20 will be described. First, a fabrication process of the ceramic pumps 23a and 23b, which are piezoelectric/electrostictive film type actuators, will be described. As shown in FIG. 17, ceramic green sheets 201, 202, and 203 are prepared. Subsequently, by means of mechanical machining such as punching, a window portion 202a for forming the pump chamber 24a1 (24b1) is formed in the green sheet 202, and a hole portion 203a is formed in the green sheet 203. The hole portion 203a is to serve as the pump-chamber connection hole 24a2 (24b2) for connecting the pump chamber 24a1 (24b1) with the channel 13a via the channel connection hole 22a (22b).

Subsequently, the green sheets 201, 202, and 203 are stacked and heated under pressure to thereby be fired. Thus, the green sheets 201, 202, and 203 are integrated together to thereby form a diaphragm substrate 204. Subsequently, a lower electrode 205 and an auxiliary electrode 206 as disclosed in Japanese Patent Application Laid-Open (kokai) No. 5-267742 are formed on the substrate 204 from a high-melting-point metal and in accordance with a thick-film forming process, such as screen printing. If necessary, the substrate is subjected to heat treatment such as firing. A piezoelectric film 207 is formed on the electrodes in accordance with a thick-film forming process and finally an upper electrode 208 is formed. In forming the upper electrode 208, a thin-film forming process such as sputtering may be used instead of the thick-film forming process. In the above-described manner, portions corresponding to the ceramic pumps 23a and 23b are fabricated.

Figure 18:
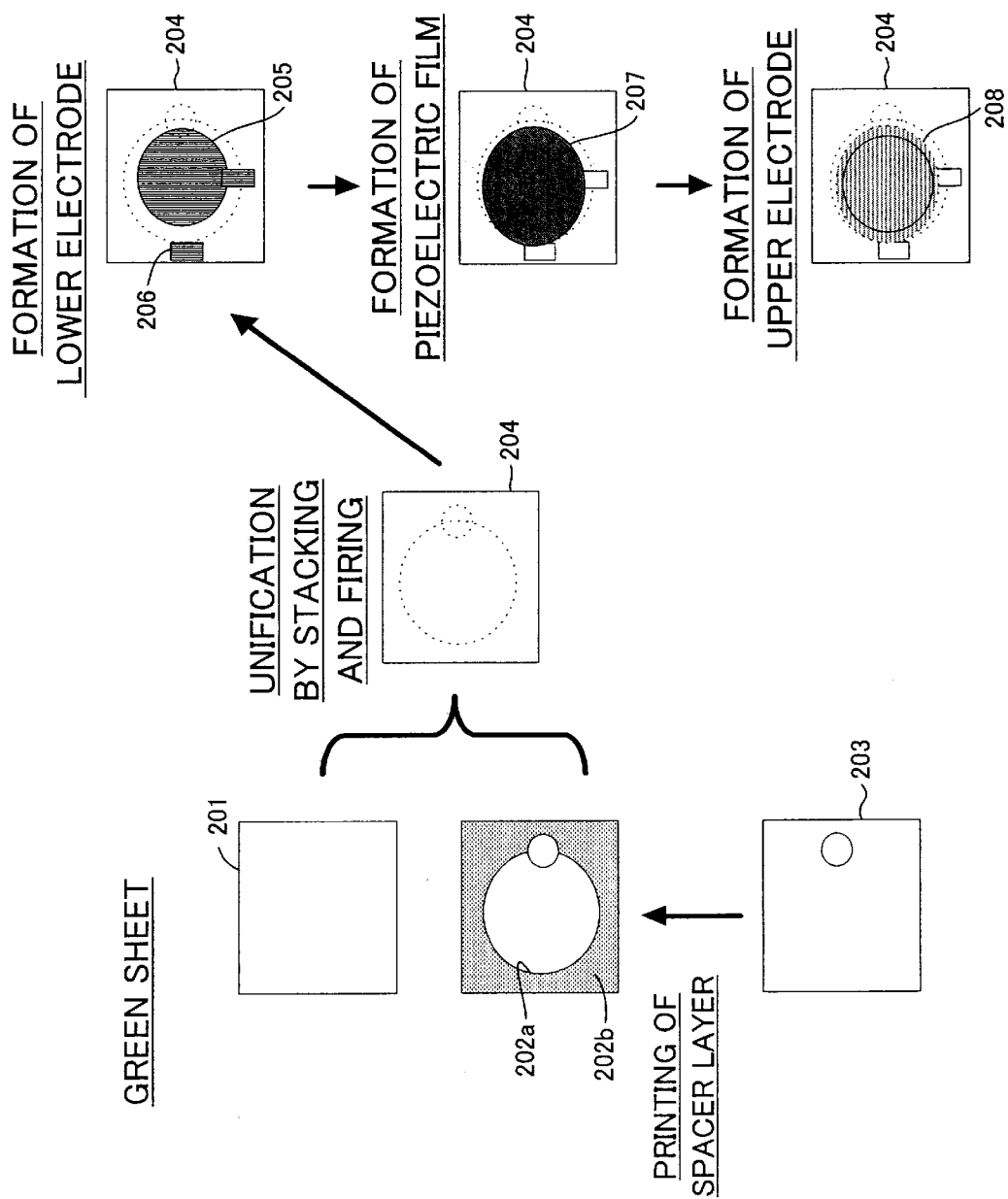
FIG. 18 is a conceptional diagram showing a different process of fabricating a piezoelectric/electrostictive actuator of the drive device shown in FIG. 15.

FIG. 18 shows a different method for fabricating the portions corresponding to the above-described ceramic pumps 23a and 23b. In this method, during the process of fabricating the diaphragm substrate, in place of using the above-described green sheet 202, a spacer layer 202b is formed on the green sheet 203 by means of screen printing in such a manner that the spacer layer 202b has a window portion 202a for forming the pump chamber 24a1 (24b1). The remaining portion is the same as that of the fabrication method having been described with reference to FIG. 17. The details of this fabrication method are disclosed in Japanese Patent Application Laid-Open No. 9-229013. The technique disclosed in the patent publication enables the depth of the pump chamber 24a1 (24b1) (the height of the hollow cylinder along the Z-axis direction in the assembled state) to be reduced to about 10 μm. Therefore, the diaphragm substrate (i.e., the ceramic pumps 23a and 23b) can have a pump chamber 24a1 (24b1) of small volume.

Figure 19:
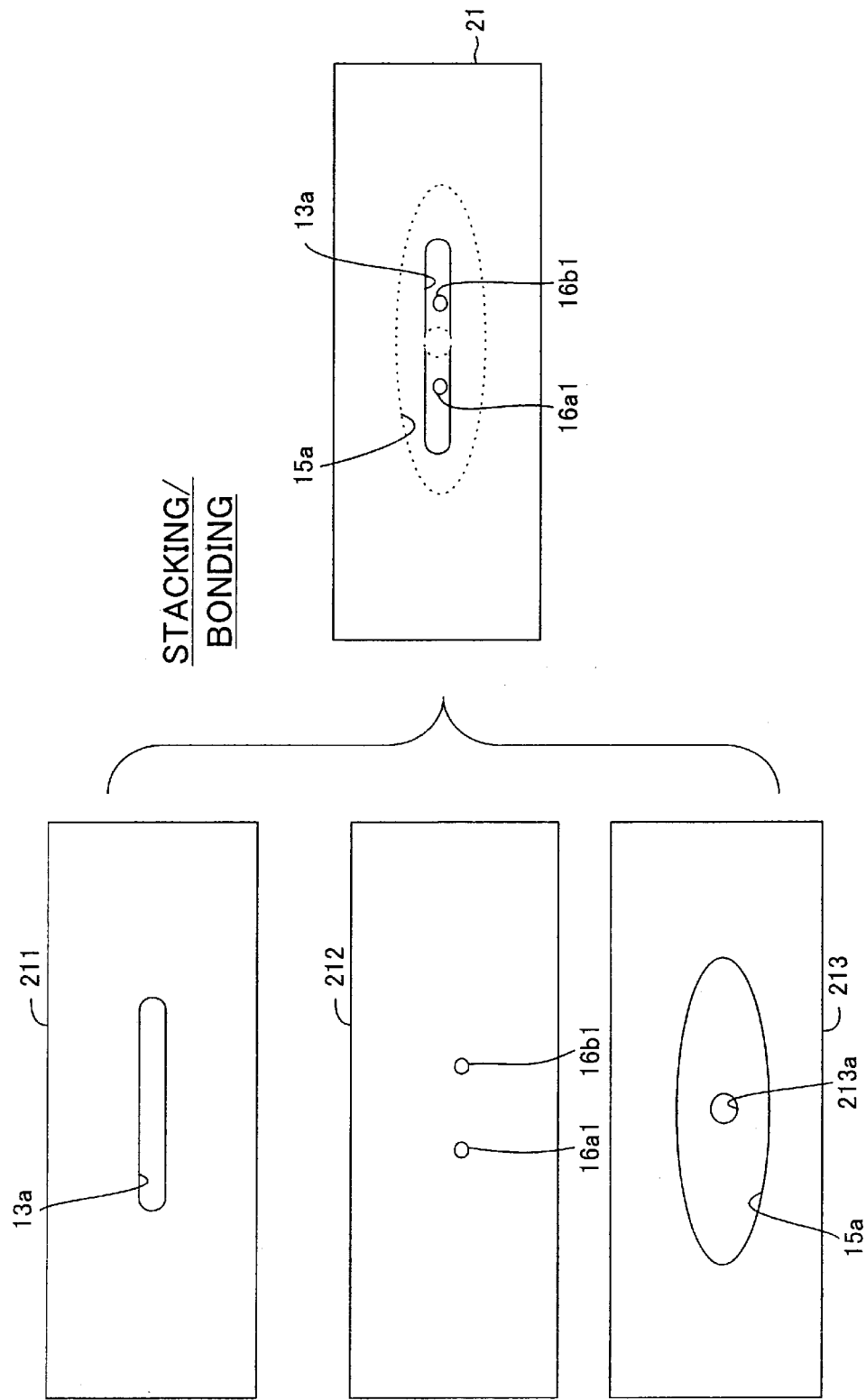
FIG. 19 is a conceptional diagram showing a process of fabricating the drive device shown in FIG. 15.

Next, a method of fabricating the base body (channel substrate) 21 will be described with reference to FIG. 19.

First, an appropriate material is selected from plastic, glass, metal, and ceramics, and then substrates 211, 212, and 213 are fabricated from the selected material. Subsequently, the channel 13a, the micro flow passages 16a1 and 16b1, and the internal-pressure buffering chamber 15a are formed in the substrates 211, 212, and 213, respectively. Further, an operation fluid injection hole 213a is formed in the substrate 213 in such a manner that the operation fluid injection hole 213a penetrates from the bottom wall surface of the internal-pressure buffering chamber 15a to the lower surface of the substrate 213. A machining method suitable for forming channels, etc. in the substrates 211, 212, and 213 is selected from among punching, etching, laser machining, coining, sandblasting, etc. Subsequently, the substrates 211, 212, and 213 are stacked and bonded by use of epoxy resin or the like to thereby complete the base body 21.

Notably, in order to make the thermal expansion coefficient of the base body 21 equal, to the extent possible, to that of the ceramic pumps 23a and 23b, which are piezoelectric/electrostictive film type actuators, the substrates 211, 212, and 213 are preferably formed of ceramic or glass whose expansion coefficient is close to that of the ceramic pumps. Further, etching or coining is preferably used for depression machining; i.e., forming the channel 13a and the internal-pressure buffering chamber 15a having a depth of 200 μm. Alternatively, the substrate 211 having the channel 13a may be obtained through bonding a plate having a punched window portion corresponding to the channel 13a, and a closure plate. Similarly, the substrate 213 having the internal-pressure buffering chamber 15a may be obtained through bonding a plate having a punched window portion corresponding to the internal-pressure buffering chamber 15a, and a closure plate. Meanwhile, the micro flow passages 16a1 and 16b1, which must have a high aspect ratio, are preferably formed by means of laser machining or a process of punching a ceramic green sheet in order to form holes having a high aspect ratio therein, and then firing the green sheet.

Figure 20:
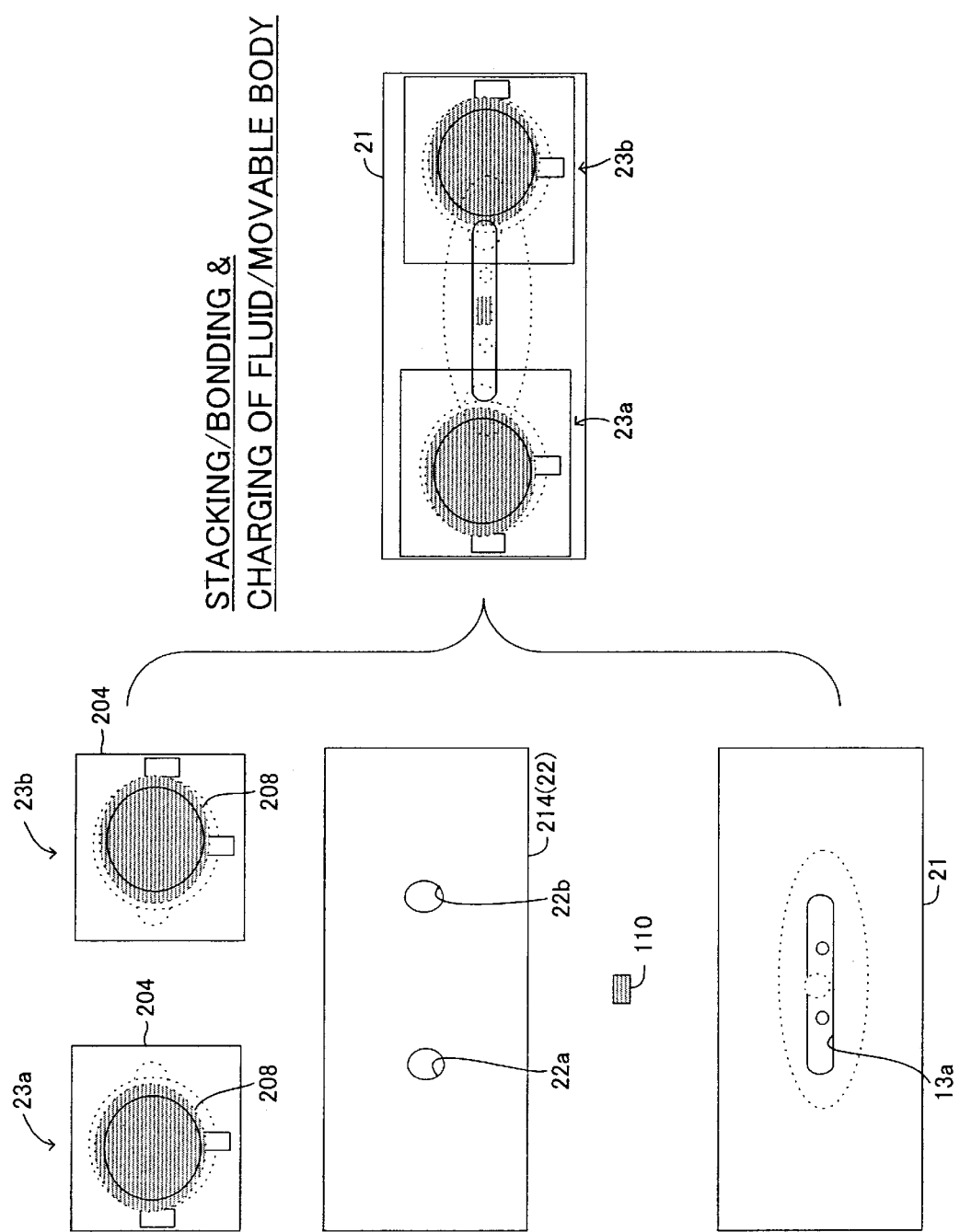
FIG. 20 is a conceptional diagram showing a process of fabricating the drive device shown in FIG. 15.

Meanwhile, as shown in FIG. 20, as in the case of the substrate 211, the pair of channel connection holes 22a and 22b are formed in a connection substrate 214, which is to serve as the connection plate 22; and finally, the ceramic pumps 23a and 23b (piezoelectric/electrostictive film type actuators), the connection substrate 214, and the base body 21 are stacked and united by use of joining means such as adhesion-bonding, press-bonding, or diffusion joining.

During this process, the movable body 110 is placed at a predetermined position within the channel 13a. When the movable body 110 is a vacuole (liquid mass), a material that is insoluble against the vacuole is selected for the operation fluid 100, and the movable body 110 is placed at the predetermined position within the channel 13a by use of a dispenser or the like. When the movable body is a bubble, an injection hole for injecting a gas is branched from the channel 13a, and the gas and the operation fluid 100 are injected into the channel 13a via the injection hole. Thereafter, the injection hole is sealed.

Subsequently, the thus-obtained stacked product is placed under vacuum by use of, for example, a vacuum chamber, and a predetermined amount of the operation fluid 100 is injected form the injection hole 213a into the internal-pressure buffering chamber 15a by use of metering means such as a dispenser. Notably, before injection, the operation fluid 100 is preferably subjected to vacuum degassing in order to remove dissolved gases. In order to charge the injected operation fluid 100 into the channel 13a, the pump chambers 24a1 and 24b1, etc., via the micro flow passages 16a1 and 16b1, the pressure within the channel is increased to a predetermined level by means of a seal gas 120, which is a compressible fluid such as an inert gas, vapor of the operation fluid 100, or a mixture thereof. Finally, the injection hole 213a is sealed by use of adhesive or the like to thereby obtain the drive device 20 of the present invention.

Notably, the depth (height along the Z-axis direction) of the internal-pressure buffering chamber 15a is desirably rendered greater than the depth of the pump chambers 24a1 and 24b1, as well as greater than the depth of the channel 13a, so as to enable smooth charging. Specifically, when the operation fluid 100 is liquid, the radius of curvature of the gas-liquid interface within the internal-pressure buffering chamber 15a becomes greater than those of the gas-liquid interfaces formed within the pump chambers 24a1 and 24b1 and the channel 13a under charging, whereby charging can be performed more smoothly.

Figure 21:
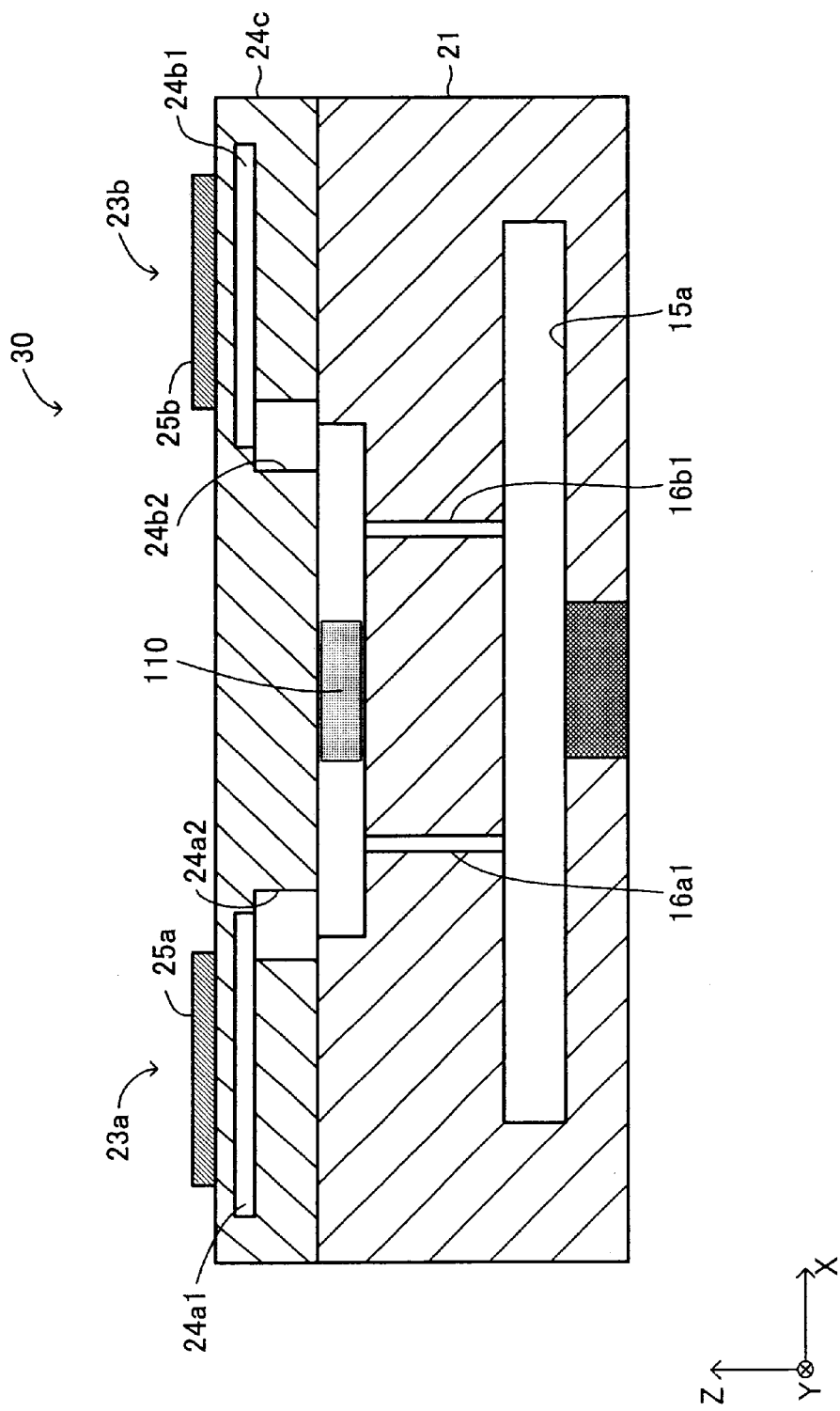
FIG. 21 is a sectional view of a drive device according to a third embodiment of the present invention.

Next, a drive device 30 according to a third embodiment of the present invention will be described. As shown in FIG. 21, which shows a vertical cross section of the drive device 30, the drive device 30 differs from the drive 20 of the second embodiment shown in FIG. 15 only in that the two pump-chamber forming portions 24a and 24b of the two ceramic pumps 23a and 23b (piezoelectric/electrostictive film type actuators) are replaced with a single pump-chamber forming portion 24c and in that the connection plate 22 provided in the drive device 20 is omitted. The drive device 30 can achieve the effect of lowering fabrication cost, by virtue of employing fewer bonded portions and components. In the drive device 20 shown in FIG. 15, the connection plate 22 can be formed of a transparent glass or a metal plate which also serves as an electrode. However, in the drive device 30 shown in FIG. 21, since the connection plate 22 does not exist, the material of the pump-chamber forming portion 24c is restricted to the material of the ceramic substrate of the piezoelectric/electrostictive film type actuators.

Figure 22:
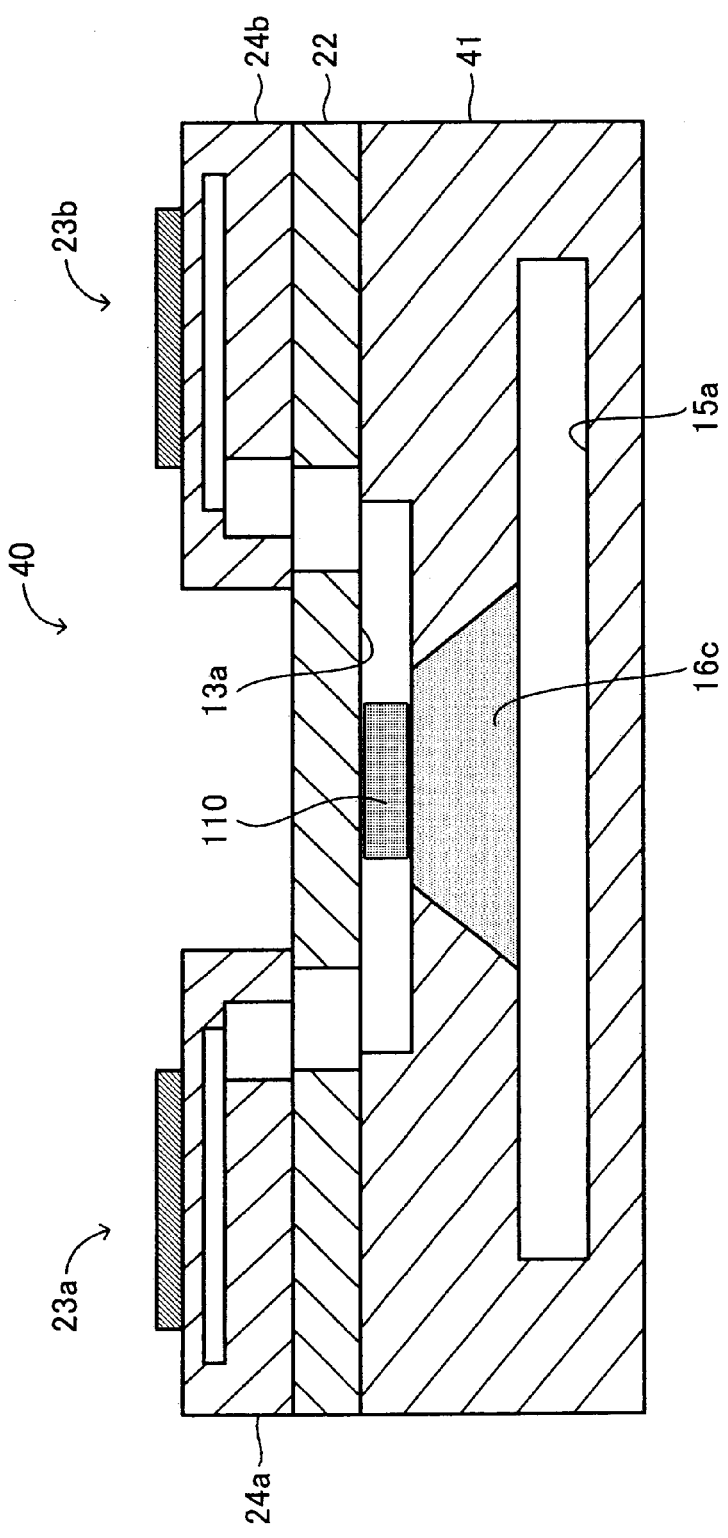
FIG. 22 is a sectional view of a drive device according to a fourth embodiment of the present invention.

Next, a drive device 40 according to a fourth embodiment of the present invention will be described. In the drive device 40, whose vertical cross section is shown in FIG. 22, a base body 41 includes a porous member 16c in place of the micro flow passages 16a1 and 16b1 of the drive 20 of the second embodiment shown in FIG. 15; and the channel 13a and the internal-pressure buffering chamber 15a are connected together via the porous member 16c. Provision of the porous member 16c achieves the same effect as that obtained through formation of a large number of extremely thin micro flow passages 16a1 and 16b1. In order to facilitate assembly and improve seal performance, the porous member 16c preferably has a tapered or stepped side surface.

Figure 23:
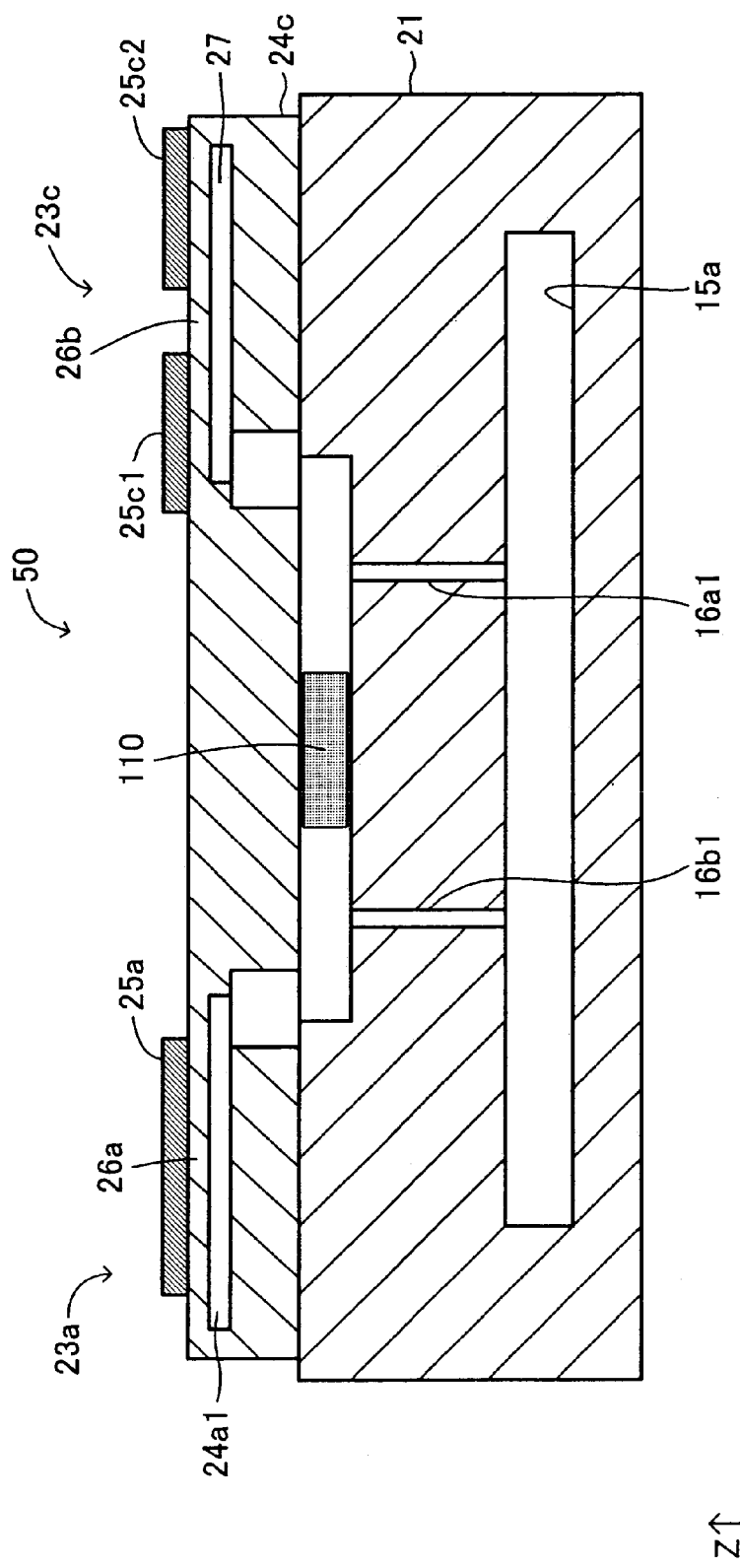
FIG. 23 is a sectional view of a drive device according to a fifth embodiment of the present invention.
Figure 24:
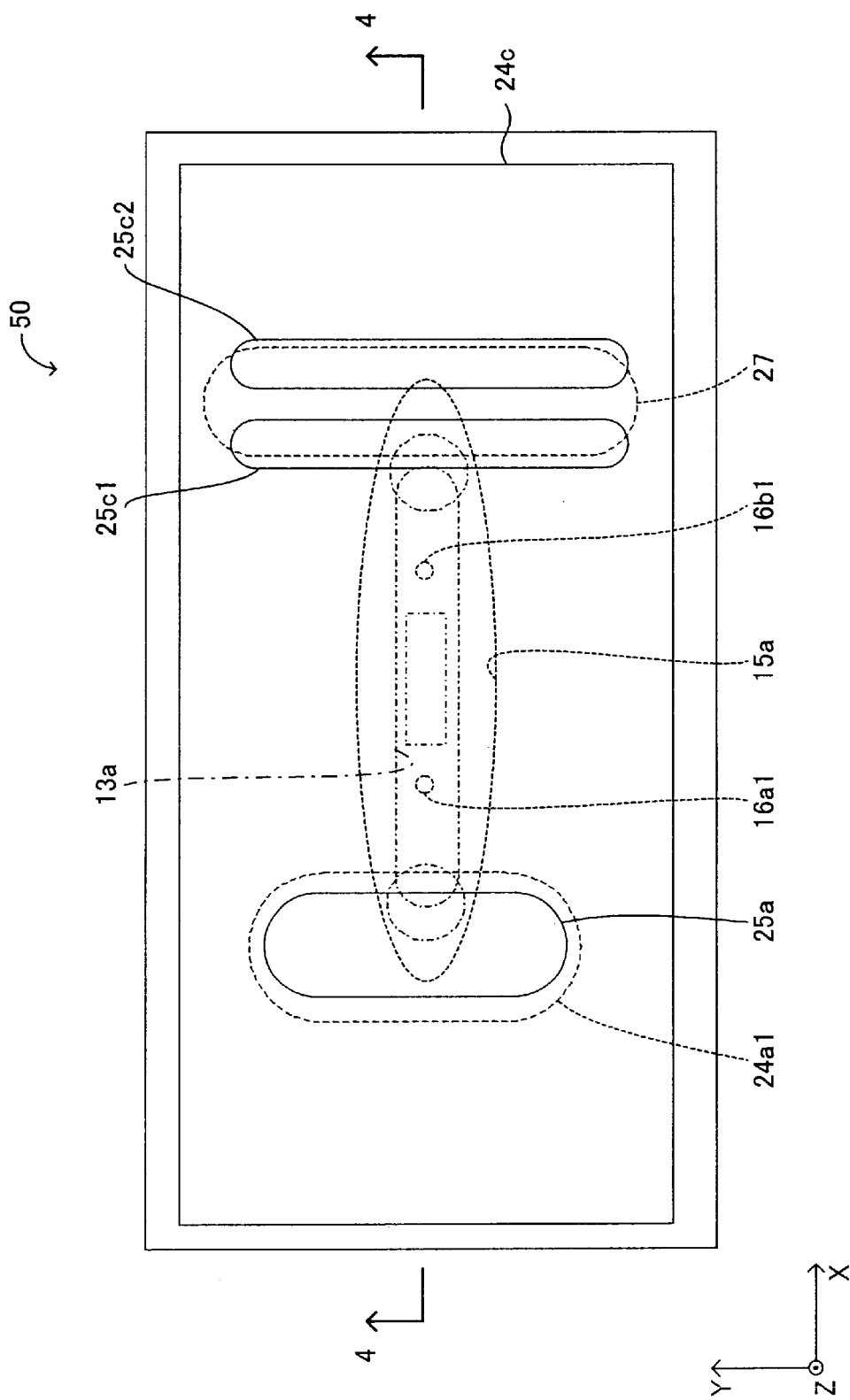
FIG. 24 is a plan view of the drive device shown in FIG. 23.

Next, a drive device 50 according to a fifth embodiment of the present invention will be described. FIG. 23 is a vertical sectional view of the drive device 50, and FIG. 24 is a plan view of the drive device 50. Notably, FIG. 23 is a sectional view of the drive device 50 taken along line 4—4 in FIG. 24. In the drive device 50, in place of the piezoelectric film 25b of the ceramic pump 23b provided in the drive device 30 shown in FIG. 21, a ceramic pump 23c having a pair of piezoelectric films 25c1 and 25c2 is provided. Like the piezoelectric film 25a, the piezoelectric films 25c1 and 25c2 are polarized in the positive direction of the Z-axis.

The piezoelectric films 25c1 and 25c2 each assume an elliptical shape having a long axis along the Y-axis direction as viewed from above. The piezoelectric films 25c1 and 25c2 are fixed onto the diaphragm 26b, which is a ceramic thin plate, in such a manner that their long axes become parallel to each other while being separated by a predetermined distance along the direction of the X-axis. A pump chamber 27, which is formed under the diaphragm 26b, assumes an elliptical shape having its long axis along the Y-axis direction as viewed from above, as in the case of the piezoelectric films 25c1 and 25c2. The piezoelectric films 25c1 and 25c2 are disposed in such a manner that they sandwich the pump chamber 27 as viewed from above, and that about one-half of the piezoelectric film 25c1 and one-half of the piezoelectric film 25c2 overlap the pump chamber 27 as viewed from above.

Figure 25:
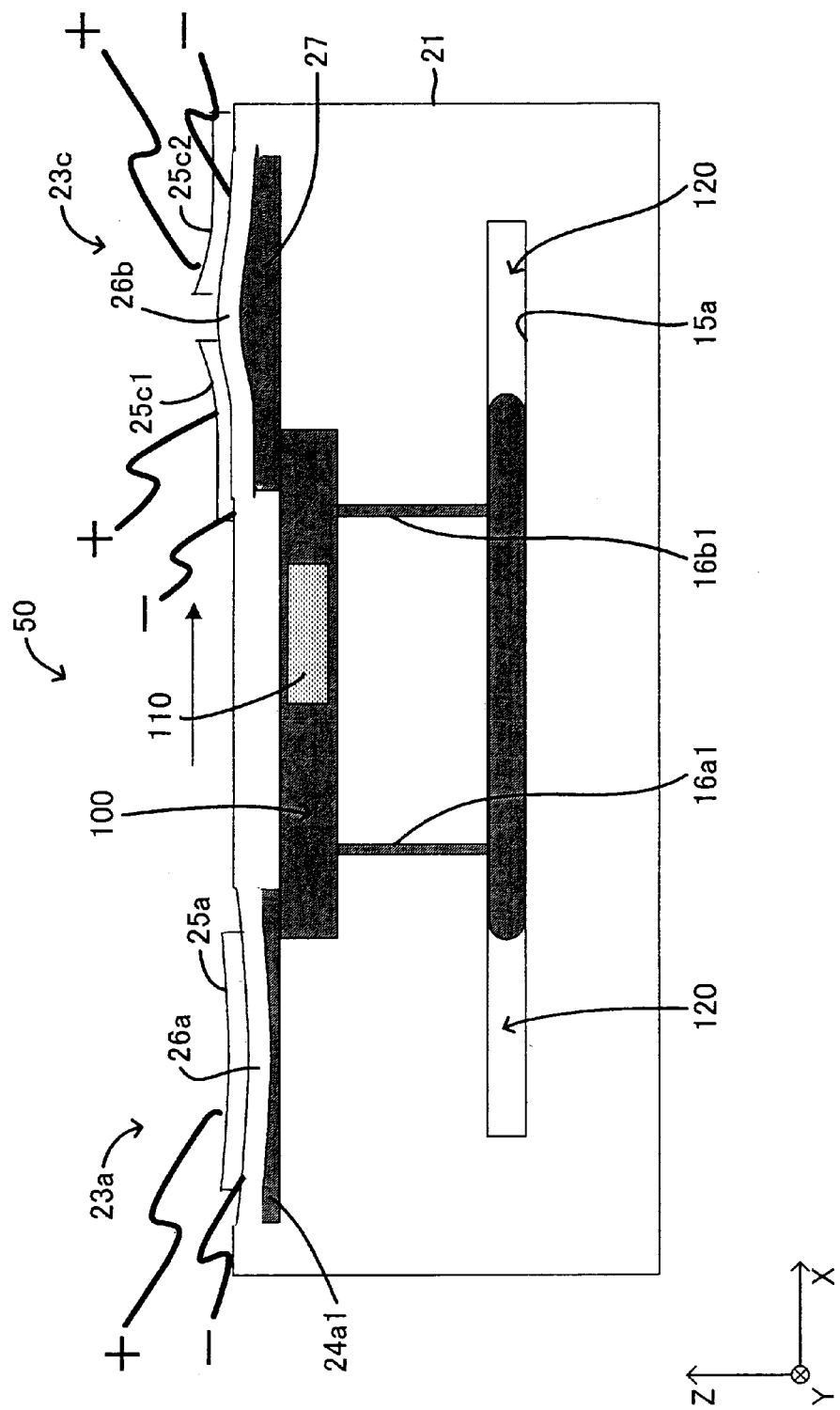
FIG. 25 is a sectional view of the drive device shown in FIG. 23, showing an operated state thereof.

Next, operation of the drive device 50 configured as described above will be described. As shown in FIG. 25, voltages of the same polarity are applied to the piezoelectric films 25c1 and 25c2 and the piezoelectric film 25a. That is, a drive voltage which changes at high speed is applied to each of the piezoelectric films 25a, 25c1, and 25c2 in such a manner that a positive voltage is applied to the upper electrode and a negative voltage is applied to the lower electrode. Thus, the diaphragm 26a bends and deforms downward due to contraction of the piezoelectric film 25a. In contrast, the diaphragm 26b displaces upward at the central portion due to contraction of the piezoelectric films 25c1 and 25c2. As a result, the operation fluid 100 is pressurized in the pump chamber 24a1 and is depressurized in the pump chamber 27, so that the movable body 110 moves from the pump chamber 24a1 toward the pump chamber 27 (in the positive direction of the X-axis).

Piezoelectric/electrostrictive film type actuators (ceramic pumps) which operate in the above-described manner are disclosed in Japanese Patent Application Laid-Open (kokai) No. 7-202284. Unlike the case of first through fourth embodiments, in the fifth embodiment (drive device 50), voltages of constant polarity are applied to the piezoelectric films 25c1, 25c2, and 25a, and the piezoelectric films 25c1, 25c2, and 25a can be driven at all-times in the same polarity as that of the polarization electric field thereof. Therefore, the piezoelectric films 25c1, 25c2, and 25a can be formed of a material of weak coercive field. Further, even in the case in which the drive device is configured in such a manner that one of the pair of pumps can provide only pressurization or both pressurization and depressurization and the other pump can provide depressurization only, and the pumps are operated in such a manner, the drive device may sufficiently provide required functions and performance. By contrast, when the pump structure of the drive devices 10, 20, 30, and 40 of the first through fourth embodiments is employed, film of an electrostrictive material cannot be used as a piezoelectric film of a pump which provides depressurization only, unless a special drive scheme, such as application of bias voltage, is employed. This is because an electrostrictive material does not expand, irrespective of the direction of an applied electric field, although it contracts along a direction perpendicular to the applied electric field, and therefore, the electrostrictive material cannot bend or deform a diaphragm upward. By contrast, in the case of the piezoelectric films 25c1 and 25c2 of the pump 23c of the drive device 50 according to the fifth embodiment, since the piezoelectric films 25c1 and 25c2 can bend and deform the diaphragm 26b upward through their contracting actions to thereby reduce the internal pressure of the pump chamber 27, film of an electrostrictive material can be used as the piezoelectric films 25c1 and 25c2 as is.

Figure 26:
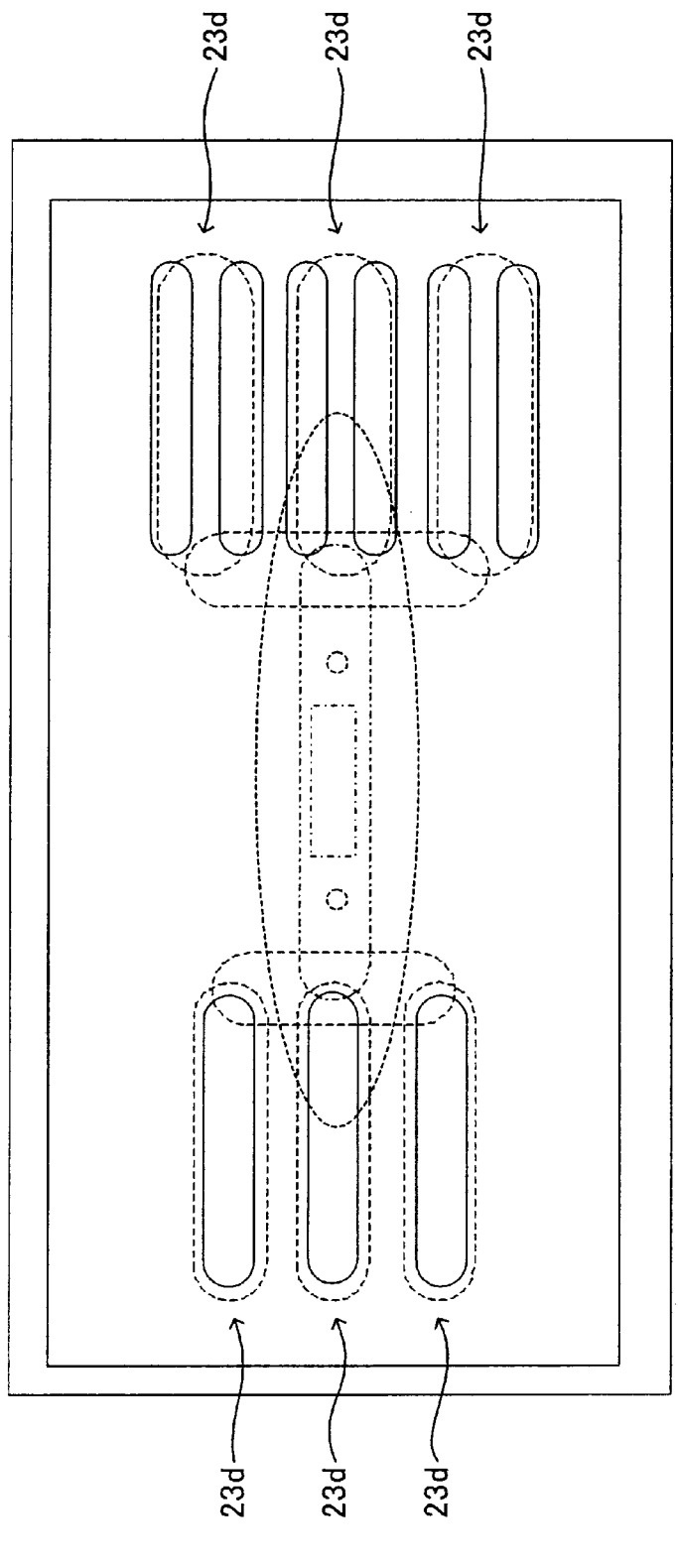
FIG. 26 is a plan view of a modification of the drive device according to the fifth embodiment of the present invention.

Notably, as shown in FIG. 26, there may be provided a necessary number of pumps 23d which are similar to the pump 23c and which have pump chambers of a proper shape, depending on the performance of each device. In such a case, when a configuration for driving the pumps individually is employed, the differential pressure acting on the movable body 110 can be adjusted by, for example, properly changing the number of driven pumps, to thereby control the amount of movement and/or moving speed of the movable body 110.

Figure 27:
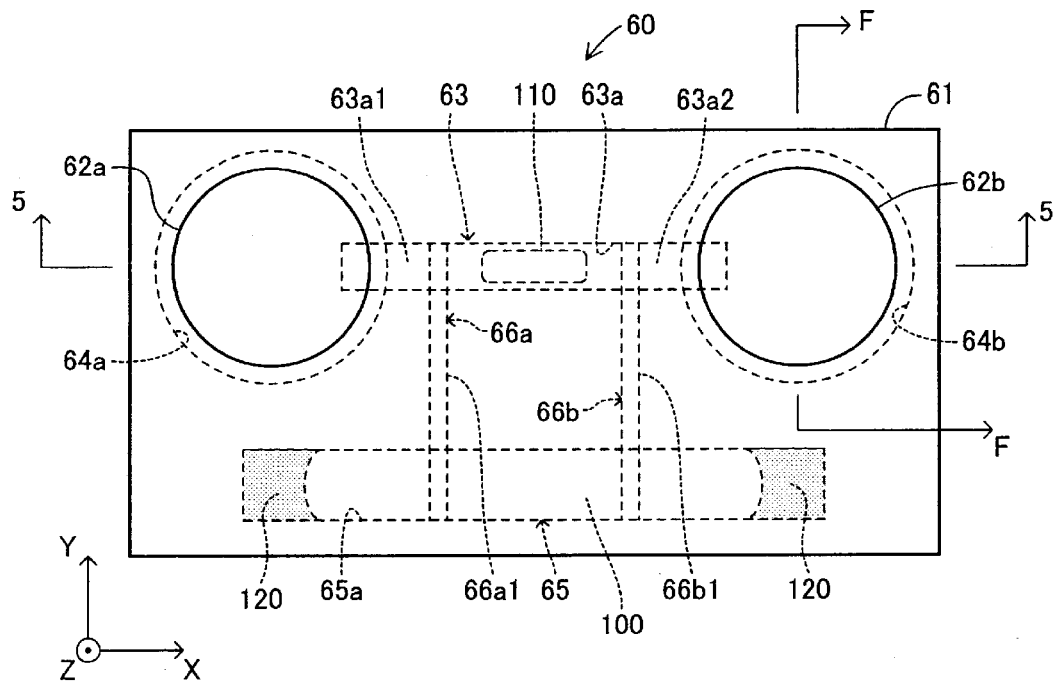
FIG. 27 is a plan view of a drive device according to a sixth embodiment of this invention.
Figure 28:
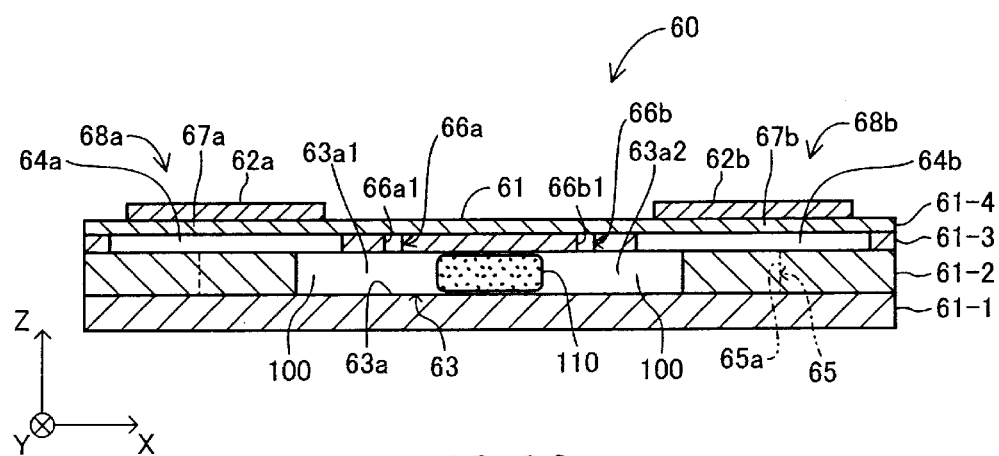
FIG. 28 is a sectional view of a drive device taken on the plane along line 5—5 in FIG. 27.

Next, a drive device 60 according to a sixth embodiment of the present invention is described. FIG. 27 is a plan view of the drive device 60. FIG. 28 is a sectional view of the drive device 60 taken along line 5—5 in FIG. 27. This drive device 60 differs primarily from the drive device 10 of the first embodiment in that the internal pressure buffering chamber is provided such that the height of the chamber is the same as that of the channel and in that the micro flow passage and the internal pressure buffering chamber communicate with each other via the micro flow passage which extends along the Y axis (while maintaining the height constant).

That is, this drive device 60 comprises a base body 61, made of ceramic in the form of an approximately rectangular parallelepiped having sides extending along the X-, Y- and Z-axes which intersect with one another at right angles, and a pair of piezoelectric membranes (piezoelectric/electrostrictive elements) 62a and 62b. The base body 61 is, as shown in FIG. 28, formed by sequentially placing thin ceramic plates (hereafter referred to as ceramic sheets) 61-1 through 61-4 one upon another and firing them into one piece. The base body 61 includes a channel forming portion 63, a pair of pump chambers 64a and 64b, an internal-pressure-buffering-chamber-forming portion 65 and a pair of micro flow passage portions 66a and 66b.

The channel forming portion 63 is a portion which forms a channel 63a similar to the channel 13a of the drive device 10 in accordance with the first embodiment. This channel 63a is in the form of an approximately rectangular parallelepiped having sides extending respectively along the X-, Y- and Z-axes. The channel 63a is a hollow space defined by the side wall surface of the through-hole in the form of an approximately rectangular parallelepiped provided in the ceramic sheet 61-2, the top surface of the ceramic sheet 61-1 and the bottom surface of the ceramic sheet 61-3. The hollow space having its major axis running along the X-axis (prismatic space having its longitudinal direction within the plane parallel to the X-Y plane). The channel 63a contains the operation fluid 100 and the movable body 110 similarly to the channel 13a, and the channel 63a is substantially divided (partitioned) into a pair of operation chambers 63a1 and 63a2 by the movable body 110. The movable body 110 exists in a lump state within the channel 63a and forms extremely small gaps S, through which the operation fluid 100 can flow, at the four corners of the rectangle which is the cross-section of the channel 63a (Refer to FIG. 3). Note that it is possible to form in the channel 63a a groove similar to the groove M shown in FIG. 14.

The pump chambers 64a and 64b are similar to the pump chambers 14a and 14b of the drive device 10, respectively, and are cylindrical spaces defined by the side wall surface of the through-hole provided in the ceramic sheet 61-3, the top surface of the ceramic sheet 61-2 and the bottom surface of the ceramic sheet 61-4. Ceramic diaphragms 67a and 67b, made of the ceramic sheet 61-4 in the form of a thin plate, are provided on the top surfaces of the pump chambers 64a and 64b, respectively. In other words, the diaphragms 67a and 67b form the walls (upper walls) of the pump chambers 64a and 64b, respectively (i.e., respectively form part of the walls forming the pump chambers 64a and 64b). The diaphragms 67a and 67b are disposed such that they have the membrane surfaces within the same X-Y plane and have the configurations similar to those of the diaphragms 17a and 17b of the drive device 10.

The piezoelectric membrane 62a is provided on the top surface of the diaphragm 67a and forms a ceramic pump 68a together with the pump chamber 64a and the diaphragm 67a. Moreover, the piezoelectric membrane 62b is provided on the top surface of the diaphragm 67b and forms a ceramic pump 68b together with the pump chamber 64b and the diaphragm 67b. The ceramic pumps 68a and 68b have the configurations similar to the ceramic pumps 18a and 18b of the drive device 10, respectively. The diaphragms 67a and 67b are deformed, respectively, when a voltage is applied to each of the two pairs of electrodes (not shown) of the piezoelectric membranes 62a and 62b, thus change the volume of each of the pump chambers 64a and 64b, respectively, to pressurize or depressurize the operation fluid 100 within the pump chambers 64a and 64b, respectively. Note that the polarization direction of both of the piezoelectric membranes 62a and 62b is positive along the Z-axis.

The internal-pressure-buffering-chamber-forming portion 65 is a portion which forms an internal pressure buffering chamber 65a. Similarly to the channel 63a, the internal pressure buffering chamber 65a assumes a substantially rectangular parallelepiped shape, having sides respectively along the X-, Y- and Z-axes. The internal pressure buffering chamber 65a, defined by the side wall surface of the through-hole in the form of a substantially rectangular parallelepiped provided in the ceramic sheet 61-2, the top surface of the ceramic sheet 61-1 and the bottom surface of the ceramic sheet 61-3, is a hollow space having its major axis running along the X-axis (a space having its longitudinal direction within the plane parallel to the X-Y plane in which the membrane surfaces of the diaphragms 67a and 67b exist, that is, a space having its major axis parallel to and at the same height as that of the channel 63a). The internal pressure buffering chamber 65a is provided at a position away in the negative direction along the Y-axis from the channel 63a. The length of the internal pressure buffering chamber 65a along the X-axis is longer than that of the channel 63a along the X-axis. The length (width) of the internal pressure buffering chamber 65a along the Y-axis is longer than that of the channel 63a along the Y-axis. The length (height) of the internal pressure buffering chamber 65a along the Z-axis is the same as that of the channel 63a along the Z-axis. The approximately central portion along the X-axis within the internal pressure buffering chamber 65a is filled with the operation fluid 100, while the surrounding (remaining) portion is filled with the pressure buffering fluid 120.

The micro flow passage portion 66a is a portion which forms a micro flow passage 66a1. Similarly to the pump chambers 64a and 64b, the micro flow passage 66a1, assumes a substantially rectangular parallelepiped shape having its major axis running along the Y-axis, defined by the side wall surface of the through-hole in the form of a slit provided on the ceramic sheet 61-3, the top surface of the ceramic sheet 61-2 and the bottom surface of the ceramic sheet 61-4. The micro flow passage 66a1 is a hollow space which allows the operation chamber 63a1 on the left of the channel 63a (upper portion of the operation chamber 63a1) to communicate with the internal pressure buffering chamber 65a (upper portion of the internal pressure buffering chamber 65a). In other words, the micro flow passage 66a1 is extended only in the direction parallel to the X-Y plane (along the Y-axis), in which the membrane surfaces of the diaphragms 67a and 67b exist, to allow the channel 63a and the internal pressure buffering chamber 65a to communicate with each other. This micro flow passage 66a1 is also filled with the operation fluid 100.

As a specific example of the dimensions of the micro flow passage 66a1, the height (length along the Z-axis) and the width (length along the X-axis) of the rectangular cross-section of the micro flow passage 66a1 taken on the plane (that is, X-Z plane) orthogonal to the major axis are 10 μm each, while the length along the Y-axis (length of the portion excluding the upper portions of the channel 63a and the internal pressure buffering chamber 65a) is 500 μm. Similarly to the channel 13a, the shape and dimensions of the micro flow passage 66a1 are determined such that the micro flow passage 66a1 produces a large flow passage resistance which makes it practically impossible for the operation fluid 100 to pass to (move to) the internal pressure buffering chamber 65a when the operation fluid 100 pressure within the channel 63a varies abruptly, and such that the micro flow passage 66a1 produces a small flow passage resistance which practically allows the operation fluid 100 to pass to (move to) the internal pressure buffering chamber 65a when the operation fluid 100 pressure within the channel 63a varies gradually (that is, such that a throttling function is provided).

The micro flow passage portion 66b is a portion which provides a micro flow passage 66b1, having the same shape as that of the micro flow passage 66a1, at a position a predetermined distance away from the micro flow passage 66a1 along the X-axis. The micro flow passage 66b1 is extended only in the direction parallel to the X-Y plane (along the Y-axis) in which the membrane surfaces of the diaphragms 67a and 67b exist to allow the operation chamber 63a2 on the right of the channel 63a (the upper portion of the operation chamber 63a2) to communicate with the internal pressure buffering chamber 65a (the upper portion of the internal pressure buffering chamber 65a). The micro flow passage 66b1 is filled with the operation fluid 100. Thus, the micro flow passage 66b1 is also extended only in the direction parallel to the X-Y plane (along the Y-axis) in which the membrane surfaces of the diaphragms 67a and 67b exist to allow the channel 63a to communicate with the internal pressure buffering chamber 65a. Accordingly, the micro flow passage 66b1 also has the same throttling function as that of the micro flow passage 66a1.

As described above, the operation fluid 100 continuously fills the channel 63a, the pair of pump chambers 64a and 64b, the pair of the micro flow passages 66a1 and 66b1, and portions of the internal pressure buffering chamber 65a which communicate with the channel 63a via the pair of micro flow passages 66a1 and 66b1. Further, the pressure buffering fluid 120 fills the spaces of the internal pressure buffering chamber 65a that are not filled with the operation fluid 100.

The operation of the drive device 60 for driving (moving) the movable body 110 is the same as that of the drive device 10, and the operation for absorbing internal pressure variations in the channel 63a caused by thermal expansion or contraction of the operation fluid 100 is also the same as that of the drive device 10.

This drive device 60 according to the sixth embodiment comprises the micro flow passages 66a1 and 66b1 having their major axes running along the Y-axis. The device 60 also comprises the channel 63a and the internal pressure buffering chamber 65a provided at the same height (within the same plane, i.e., within the same ceramic sheet 61-2) and is configured to allow communication of their upper portions via the micro flow passages 66a1 and 66b1. Thus, the device 60 can be made thinner (the length along the Z-axis (height) can be made smaller). Moreover, since the volume of the space (sum of volume of all spaces constituted by the channel 63a, the pump chambers 64a and 64b, the internal pressure buffering chamber 65a and the micro flow passages 66a1 and 66b1) relative to the volume of the base body 61 is large, the drive device 60 can be made compact. Further, since the drive device 60 is thin and/or since its surface area can be made larger relative to the device volume, heat generated by operation can be readily radiated externally. Therefore, since the drive device 60 is readily heated uniformly (in other words, there is only a small difference in temperature among various areas of the device), the device can operate stably and have high durability against the heat.

Figure 29:
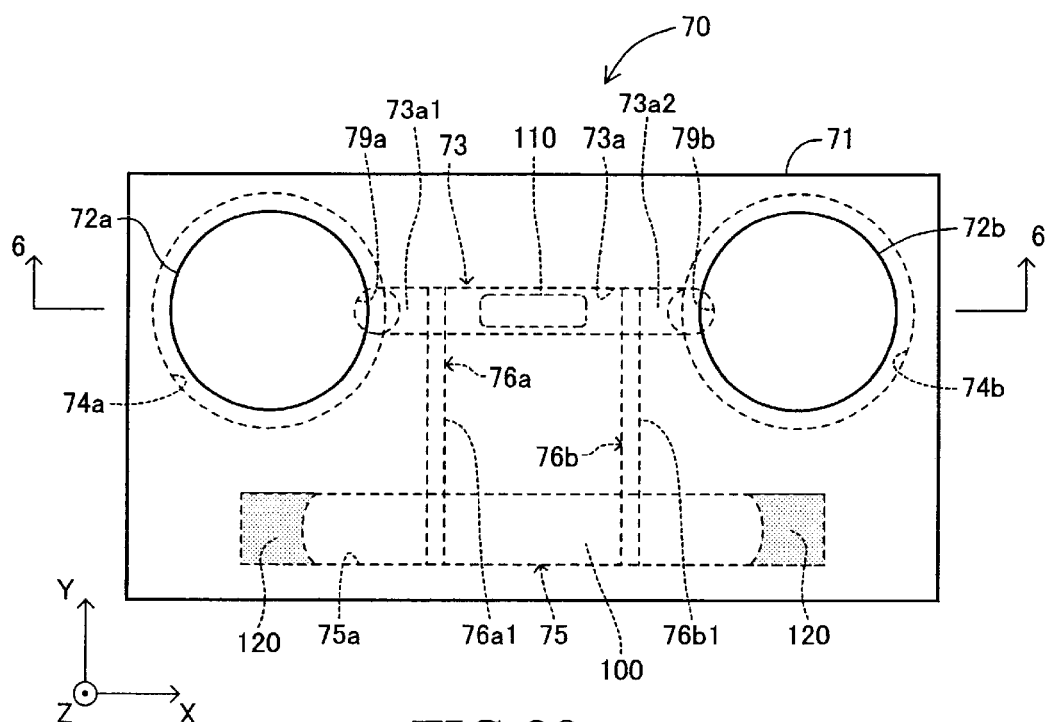
FIG. 29 is a plan view of a drive device according to a seventh embodiment of this invention.
Figure 30:
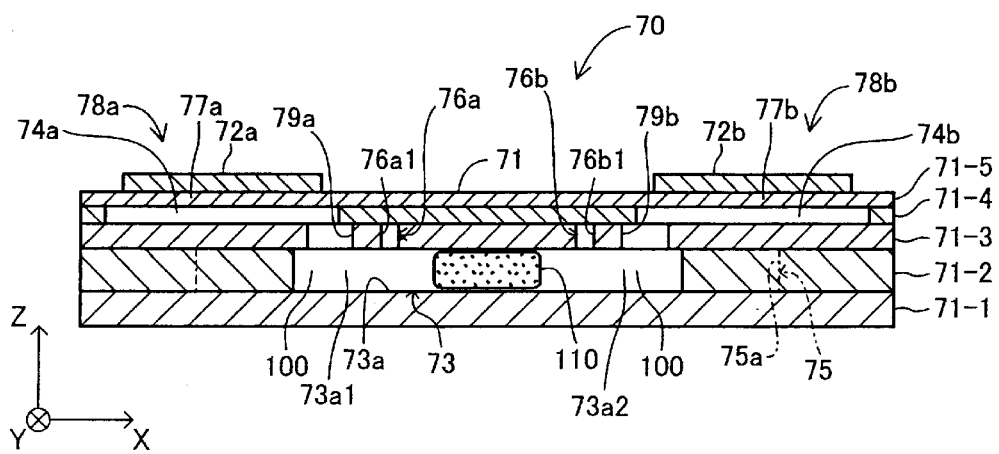
FIG. 30 is a sectional view of a drive device taken on the plane along line 6—6 in FIG. 29.

Next, a drive device 70 according to a seventh embodiment of the present invention is described. FIG. 29 is a plan view of the drive device 70. FIG. 30 is a sectional view of the drive device 70 taken along line 6—6 in FIG. 29. This drive device 70 differs primarily from the drive device 60 in that a pair of micro flow passages 76a1 and 76b1 and a pair of pump chamber communication holes 79a and 79b are provided in a ceramic sheet 71-3 sandwiched between a ceramic sheet 71-2 having a channel 73a and a ceramic sheet 71-4 having pump chambers 74a and 74b.

That is, this drive device 70 comprises a base body 71 made of ceramic in the form of an substantially rectangular parallelepiped having sides extending along the X-, Y- and Z-axes which intersect with one another at right angles, and a pair of piezoelectric membranes (piezoelectric/electrostrictive elements) 72a and 72b. The base body 71 is formed by sequentially placing ceramic sheets 71-1 through 71-5 one upon another and firing them into one piece. The base body 71 includes a channel forming portion 73, an internal-pressure-buffering-chamber-forming portion 75, a pair of pump chambers 74a and 74b and a pair of micro flow passage portions 76a and 76b.

The channel forming portion 73 is a portion which forms a channel 73a similar to the channel 63a of the drive device 60. The channel 73a is a space, defined by the side wall surface of the through-hole provided in the ceramic sheet 71-2, the top surface of the ceramic sheet 71-1 and the bottom surface of the ceramic sheet 71-3, having its longitudinal direction along the X-axis (having its major axis extending along the X-axis). Similarly to the channel 63a, the channel 73a contains the operation fluid 100 and the movable body 110. The channel 73a is substantially divided into a pair of operation chambers 73a1 and 73a2 by the movable body 110.

The pump chambers 74a and 74b, similar to the pump chambers 64a and 64b, respectively, are cylindrical hollow spaces defined by the side wall surface of the through-hole provided in the ceramic sheet 71-4, the top surface of the ceramic sheet 71-3 and the bottom surface of the ceramic sheet 71-5. Ceramic diaphragms 77a and 77b, made of the ceramic sheet 71-5, are provided on the top surfaces of the pump chambers 74a and 74b. The diaphragms 77a and 77b have the same configurations as the diaphragms 67a and 67b, respectively, and form part (upper wall) of the wall surfaces of the pump chambers 74a and 74b. The membrane surfaces of the diaphragms 77a and 77b are disposed within a same (a single) X-Y plane. The piezoelectric membranes 72a and 72b are provided on the top surfaces of the diaphragms 77a and 77b, respectively. These piezoelectric membranes 72a and 72b have the same configurations as the piezoelectric membranes 62a and 62b, respectively. As a result, a ceramic pump 78a is formed by the pump chamber 74a, the diaphragm 77a and the piezoelectric membrane 72a, while a ceramic pump 78b is formed by the pump chamber 74b, the diaphragm 77b and the piezoelectric membrane 72b. These ceramic pumps 78a and 78b have the same configurations as the ceramic pumps 68a and 68b, respectively.

The internal-pressure-buffering-chamber-forming portion 75 is a portion which forms an internal pressure buffering chamber 75a. The internal pressure buffering chamber 75a is a hollow space, defined by the side wall surface of the through-hole provided on the ceramic sheet 71-2, the top surface of the ceramic sheet 71-1 and the bottom surface of the ceramic sheet 71-3. The internal pressure buffering chamber 75a has the same configuration as the internal pressure buffering chamber 65a, and is a space having its longitudinal direction along the X-axis (having its major axis extending along the X-axis). This internal pressure buffering chamber 75a is provided at a position away in the negative direction along the Y-axis from the channel 73a. Further, the internal pressure buffering chamber 75a is larger than the channel 73a, just as the internal pressure buffering chamber 65a is larger than the channel 63a. The approximately central portion along the X-axis within the internal pressure buffering chamber 75a is filled with the operation fluid 100 while the surrounding (remaining) portion is filled with the pressure buffering fluid 120.

The micro flow passage portions 76a and 76b are portions which form the micro flow passages 76a1 and 76b1, respectively, which are identical in shape and parallel to each other. Each of the micro flow passages 76a1 and 76b1 is defined by the side wall surface of the through-hole in the form of a slit provided on the ceramic sheet 71-3, the top surface of the ceramic sheet 71-2 and the bottom surface of the ceramic sheet 71-4 and is a space in the form of an approximately rectangular parallelepiped having its major axis running along the Y-axis. These micro flow passages 76a1 and 76b1 extend from the upper portions of the operation chambers 73a1 and 73a2 on the left and right of the channel 73a, respectively, to the upper portion of the internal pressure buffering chamber 75a to make each of the operation chambers 73a1 and 73a2 communicate with the internal pressure buffering chamber 75a. These micro flow passages 76a1 and 76b1 are also filled with the operation fluid 100.

As a specific example of the dimensions of the micro flow passage 76a1 (micro flow passage 76b1), the height (length along the Z-axis) and width (length along the X-axis) of the rectangular cross-section of the micro flow passage 76a1 taken on the plane orthogonal to the major axis (that is, X-Z plane) are 15 µm while the length along the Y-axis (length of the portion excluding the upper portions of the channel 73a and the internal pressure buffering chamber 75a) is 500 µm. Similarly to the micro flow passage 66a1, the shape and dimensions of the micro flow passage 76a1 are determined to provide a throttling function such that the micro flow passage 76a1 produces a large flow passage resistance which makes it practically impossible for the operation fluid 100 to pass to (move to) the internal pressure buffering chamber 75a when the operation fluid 100 pressure within the channel 73a varies abruptly and such that the micro flow passage 76a1 produces a small flow passage resistance which practically allows the operation fluid 100 to pass to (move to) the internal pressure buffering chamber 75a when the operation fluid 100 pressure within the channel 73a varies gradually.

Similarly to the micro flow passage 76a1 and 76b1, the pump chamber communication holes 79a and 79b are cylindrical spaces formed by the through-holes provided on the ceramic sheet 71-3. The pump chamber communication hole 79a allows the upper portion of the operation chamber 73a1 on the left of the channel 73a to communicate with the pump chamber 74a. The pump chamber communication hole 79b allows the upper portion of the operation chamber 73a2 on the right of the channel 73a to communicate with the pump chamber 74b. These pump chamber communication holes 79a and 79b are also filled with the operation fluid 100.

As described above, the operation fluid 100 continuously fills the channel 73a, a pair of pump chambers 74a and 74b, a pair of the micro flow passages 76a1 and 76b1, the pump chamber communication holes 79a and 79b, and a part of the internal pressure buffering chamber 75a which communicates with the channel 73a via the pair of micro flow passages 76a1 and 76b1. Further, the pressure buffering fluid 120 fills the space in the internal pressure buffering chamber 75a, which is not filled with the operation fluid 100.

The operation of the drive device 70 for driving (moving) the movable body 110 is the same as that of the drive device 10, and the operation for absorbing internal pressure variations in the channel 73a associated with thermal expansion or contraction of the operation fluid 100 is also the same as that of the drive device 10.

This drive device 70 according to the seventh embodiment comprises the micro flow passages 76a1 and 76b1 having their major axes running along the Y-axis. The drive device 70 also comprises the channel 73a and the internal pressure buffering chamber 75a provided at the same height (within the same plane, i.e., within the same ceramic sheet 71-2) and is configured to allow communication of their upper portions via the micro flow passages 76a1 and 76b1. Thus, the device 70 can be made thinner (the length along the Z-axis (height) can be made smaller). Moreover, since the volume of the space (sum of volume of all spaces constituted by the channel 73a, the pump chambers 74a and 74b, the internal pressure buffering chamber 75a, the micro flow passages 76a1 and 76b1 and the pump chamber communication holes 79a and 79b) relative to the volume of the base body 71 is large, the drive device 70 can be made compact. Further, since the drive device 70 is thin and/or since its surface area can be made larger relative to the device volume, heat generated by operation can be readily radiated externally. Therefore, since the drive device 70 is readily heated uniformly (in other words, there is only a small difference in temperature among various areas of the device), the device can operate stably and have high durability against the heat.

Figure 31:
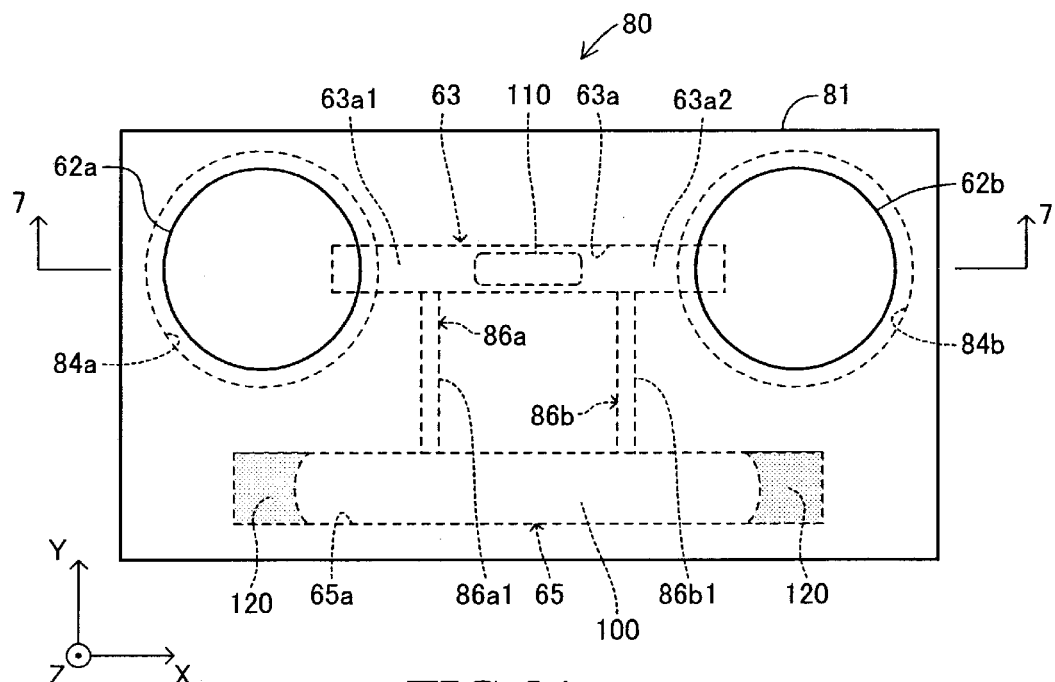
FIG. 31 is a plan view of a drive device according to an eighth embodiment of this invention.
Figure 32:
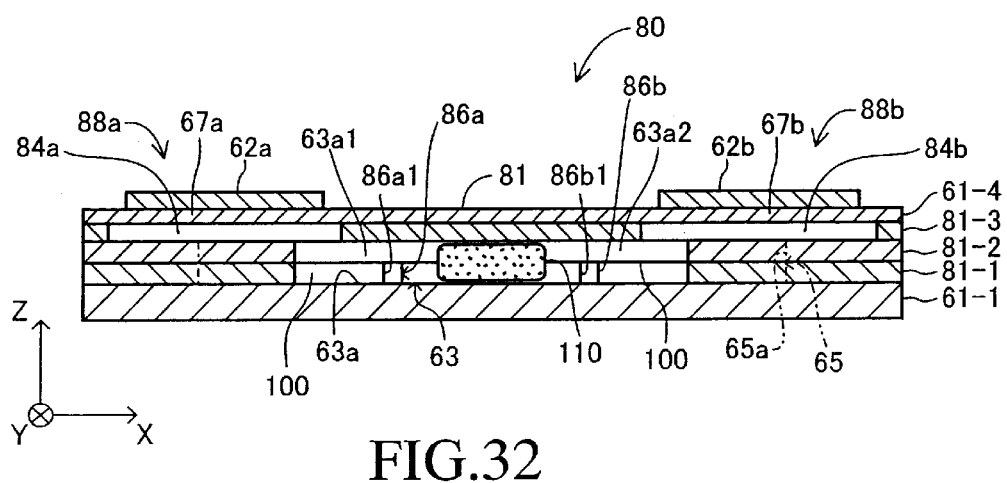
FIG. 32 is a sectional view of a drive device taken on the plane along line 7—7 in FIG. 31.

Next, a drive device 80 according to an eighth embodiment of the present invention is described. FIG. 31 is a plan view of the drive device 80. FIG. 32 is a sectional view of the drive device 80 taken along line 7—7 in FIG. 31. This drive device 80 differs primarily from the drive device 60 in that a pair of micro flow passages is provided in a ceramic sheet 81-1, which form a channel and an internal pressure buffering chamber together with a ceramic sheet 81-2. Therefore, an explanation for the device is given below with primarily focusing on the difference while a detailed description of those portions having the same configurations as those of the drive device 60 is omitted by assigning the same symbols(numerals) to such portions.

This drive device 80 is configured by replacing the ceramic sheets 61-2 and 61-3 of the drive device 60 with ceramic sheets 81-1 through 81-3 placed one upon another on top of the ceramic sheet 61-1 and fired to be one piece. The drive device 80 comprises a base body 81 and a pair of piezoelectric membranes (piezoelectric/electrostrictive elements) 62a and 62b. The base body 81 includes the channel forming portion 63, the internal-pressure-buffering-chamber-forming portion 65, a pair of pump chambers 84a and 84b and a pair of micro flow passage portions 86a and 86b.

The channel forming portion 63 is a portion which forms the channel 63 defined by the side wall surfaces of the through-holes in the form of an approximately rectangular parallelepiped provided on the ceramic sheets 81-1 and 81-2, the top surface of the ceramic sheet 61-1 and the bottom surface of the ceramic sheet 81-3.

The pump chambers 84a and 84b, similar to the pump chambers 64a and 64b, respectively, are cylindrical spaces defined by the side wall surface of the through-hole provided on the ceramic sheet 81-3, the top surface of the ceramic sheet 81-2 and the bottom surface of the ceramic sheet 61-4. The ceramic diaphragms 67a and 67b are provided on the top surfaces of the pump chambers 84a and 84b, respectively. The ceramic diaphragms 67a and 67b are made of the ceramic sheet 61-4 to form part (upper wall) of the wall surfaces of the pump chambers 84a and 84b, respectively. The piezoelectric membranes 62a and 62b are provided on the top surfaces of the diaphragms 67a and 67b. As a result, a ceramic pump 88a is formed by the pump chamber 84a, the diaphragm 67a and the piezoelectric membrane 62a, while a ceramic pump 88b is formed by the pump chamber 84b, the diaphragm 67b and the piezoelectric membrane 62b. These ceramic pumps 88a and 88b have the same configurations as the ceramic pumps 68a and 68b, respectively.

Similarly to the channel 63a, the internal-pressure-buffering-chamber-forming portion 65 is a portion which forms the internal pressure buffering chamber 65a, defined by the side wall surfaces of the through-holes in the form of an approximately rectangular parallelepiped provided in the ceramic sheets 81-1 and 81-2, the top surface of the ceramic sheet 61-1 and the bottom surface of the ceramic sheet 81-3.

The micro flow passage portion 86a is a portion which forms a micro flow passage 86a1. The micro flow passage 86a1 is defined by the side wall surface of the through-hole in the form of a slit provided in the ceramic sheet 81-1, the top surface of the ceramic sheet 61-1 and the bottom surface of the ceramic sheet 81-2. The micro flow passage 86a1 is a space in the form of an approximately rectangular parallelepiped having its major axis running along the Y-axis. The micro flow passage 86a1 makes the operation chamber 63a1 located on the left of the channel 63a (a portion of the side wall of the operation chamber 63a1, the portion being formed on the ceramic sheet 81-1) communicate with the internal pressure buffering chamber 65a (a portion of the side wall of the internal pressure buffering chamber 65a, the portion being formed on the ceramic sheet 81-1). Note that the dimensions of the micro flow passage 86a1 are the same as those of the micro flow passage 66a1.

The micro flow passage portion 86b is a portion which forms a micro flow passage 86b1. The micro flow passage 86b1 has the same shape as the micro flow passage 86a1. The micro flow passage 86b1, defined by the side wall surface of the through-hole in the form of a slit provided in the ceramic sheet 81-1, the top surface of the ceramic sheet 61-1 and the bottom surface of the ceramic sheet 81-2, is a space in the form of an approximately rectangular parallelepiped having its major axis running along the Y-axis at a position a predetermined distance away in the positive direction along the X-axis from the micro flow passage 86a1. The micro flow passage 86b1 makes the operation chamber 63a2 located on the right of the channel 63a (a portion of the side wall of the operation chamber 63a2, the portion being formed by the ceramic sheet 81-1) communicate with the internal pressure buffering chamber 65a (a portion of the internal pressure buffering chamber 65a, the portion being formed by the ceramic sheet 81-1).

Similarly to the micro flow passages 66a1, 66b1 and so on, the shapes and dimensions of the micro flow passages 86a1 and 86b1 are determined so as to provide a throttling function which produces a large flow passage resistance which makes it practically impossible for the operation fluid 100 to pass to (move to) the internal pressure buffering chamber 65a when the operation fluid 100 pressure within the channel 63a varies abruptly and which produces a small flow passage resistance which practically allows the operation fluid 100 to pass to (move to) the internal pressure buffering chamber 65a when the operation fluid 100 pressure within the channel 63a varies gradually.

In the drive device 80, the operation fluid 100 continuously fills the channel 63a, the pair of the pump chambers 84a and 84b, the pair of the micro flow passages 86a1 and 86b1, and portions of the internal pressure buffering chamber 65a which communicate with the channel 63a via the pair of micro flow passages 86a1 and 86b1. Further, the pressure buffering fluid 120 fills spaces of the internal pressure buffering chamber 65a that are not filled with the operation fluid 100.

The operation of the drive device 80 for driving (moving) the movable body 110 is the same as that of the drive device 10, and the operation for absorbing internal pressure variations in the channel 63a associated with thermal expansion or contraction of the operation fluid 100 is also the same as that of the drive device 10. Consequently, this drive device 80 has advantages similar to those of the drive device 60. Moreover, since the drive device 80 is compact (slim) as drive device 60, it has the same effects (advantages) as the drive device 60.

Figure 33:
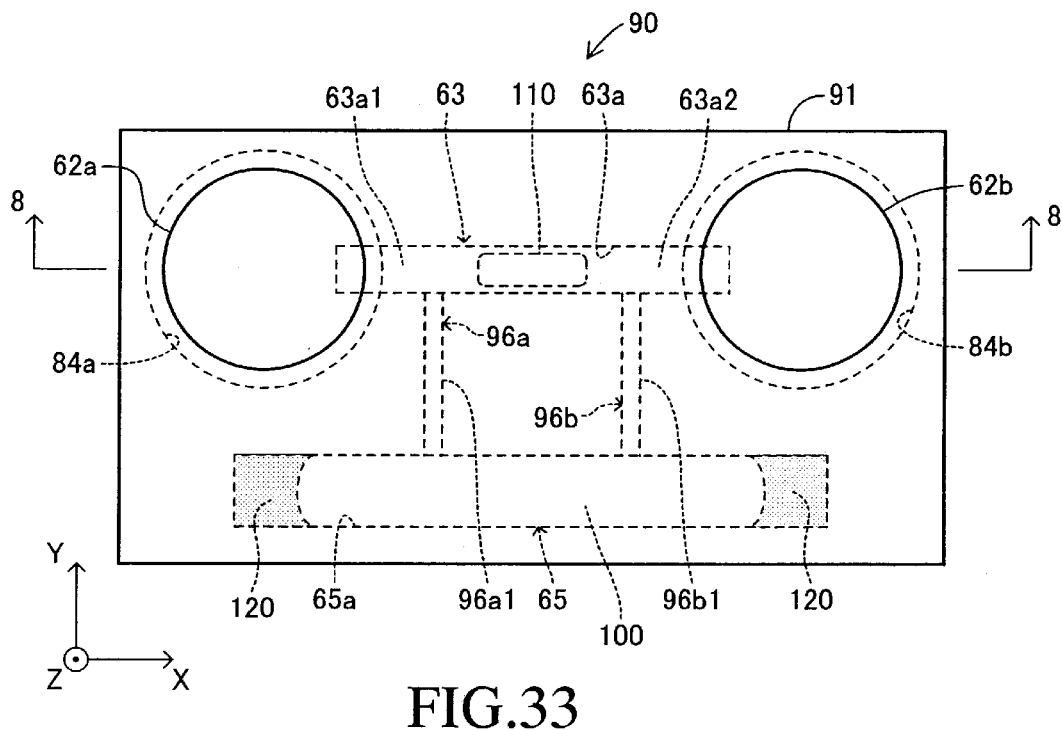
FIG. 33 is a plan view of a drive device according to a ninth embodiment of this invention.
Figure 34:
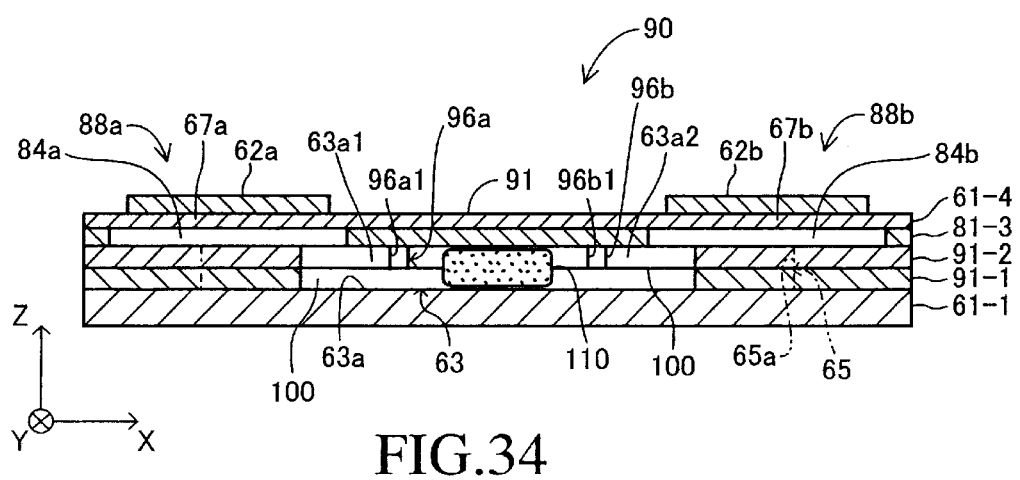
FIG. 34 is a sectional view of a drive device taken on the plane along line 8—8 in FIG. 33.

Next, a drive device 90 according to a ninth embodiment of the present invention is described. FIG. 33 is a plan view of the drive device 90. FIG. 34 is a sectional view of the drive device 90 taken along line 8—8 in FIG. 33. This drive device 90 differs from the drive device 80 merely in that the ceramic sheets 81-1 and 81-2 of the drive device 80 are replaced with ceramic sheets 91-1 and 91-2 that are sequentially placed one upon another on top of the ceramic sheet 61-1 and fired to be one piece. Therefore, an explanation for the device is given below with primarily focusing on the difference while a detailed description of those portions having the same configurations as those of the drive device 80 is omitted by assigning the same symbols (numerals) to such portions.

In this drive device 90, the channel 63a and the internal pressure buffering chamber 65a are formed by the sidewall surfaces of the through-holes provided in the ceramic sheets 91-1 and 91-2, the top surface of the ceramic sheet 61-1 and the bottom surface of the ceramic sheet 81-3.

On the other hand, a micro flow passage 96a1 is defined by the side wall surface of the through-hole in the form of a slit provided in the ceramic sheet 91-2, the top surface of the ceramic sheet 91-1 and the bottom surface of the ceramic sheet 81-3. The micro flow passage 96a1 is a space in the form of an approximately rectangular parallelepiped having its major axis running along the Y-axis to make the operation chamber 63a1 located on the left of the channel 63a (a portion of the side wall of the operation chamber 63a1, the portion being formed on the ceramic sheet 91-2) communicate with the internal pressure buffering chamber 65*a* (a portion of the side wall of the internal pressure, buffering chamber 65*a*, the portion being formed on the ceramic sheet 91-2). Note that the dimensions of the micro flow passage 96*a*1 are the same as those of the micro flow passage 66*a*1.

The micro flow passage 96*b*1 has the same shape as the micro flow passage 96*a*1, and is defined by the side wall surface of the through-hole in the form of a slit provided in the ceramic sheet 91-2, the top surface of the ceramic sheet 91-1 and the bottom surface of the ceramic sheet 81-3. The micro flow passage 96*b*1 is a space in the form of an approximately rectangular parallelepiped having its major axis running along the Y-axis at a position a predetermined distance away in the positive direction along the X-axis from the micro flow passage 96*a*1. The micro flow passage 96*b*1 makes the operation chamber 63*a*2 located on the right of the channel 63*a* (a portion of the side wall of the operation chamber 63*a*2, the portion being formed on the ceramic sheet 91-2) communicate with the internal pressure buffering chamber 65*a* (a portion fo the side wall of the internal pressure buffering chamber 65*a*, the portion being formed on the ceramic sheet 91-2). The functions of the micro flow passages 96*a*1 and 96*b*1 are the same as those of the micro flow passages 86*a*1 and 86*b*1.

The drive device 90 contains the movable body 110, the operation fluid 100 and the pressure buffering fluid 120, similarly to the drive device 80. The operation and advantages of the drive device 90 are the same as those of the drive device 80. Accordingly, the drive device 90 is a compact and highly reliable device.

Figure 35:
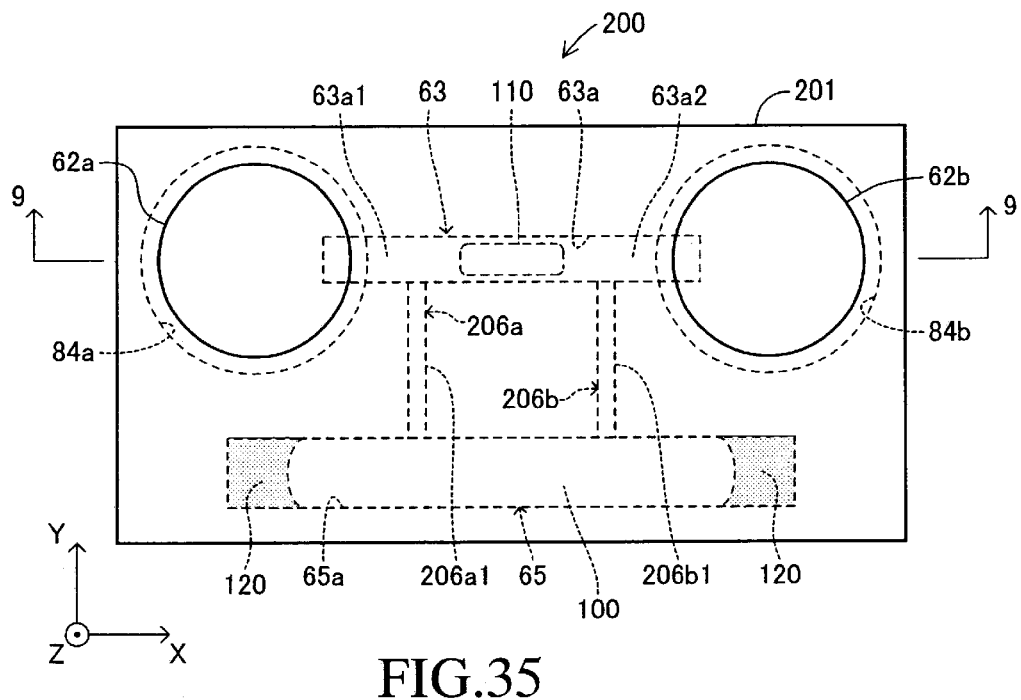
FIG. 35 is a plan view of a drive device according to a tenth embodiment of this invention.
Figure 36:
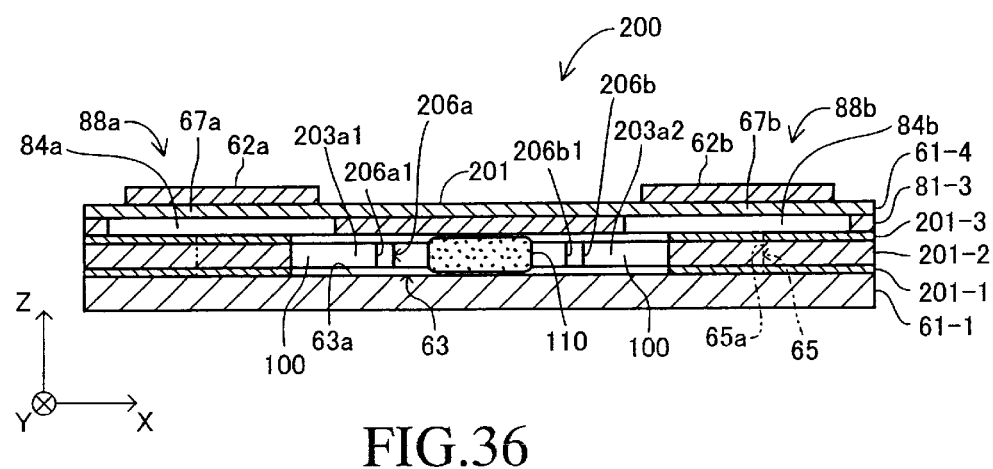
FIG. 36 is a sectional view of a drive device taken on the plane along line 9—9 in FIG. 35.

Next, a drive device 200 according to a tenth embodiment of the present invention is described. FIG. 35 is a plan view of the drive device 200. FIG. 36 is a sectional view of the drive device 200 taken along line 9—9 in FIG. 35. This drive device 200 differs from the drive device 80 merely in that the ceramic sheets 81-1 and 81-2 of the drive device 80 are replaced with ceramic sheets 201-1, 201-2 and 201-3 that are sequentially placed one upon another on top of the ceramic sheet 61-1 and fired to be one piece. Therefore, an explanation for the device is given below with primarily focusing on the difference while a detailed description of those portions having the same configurations as those of the drive device 80 is omitted by assigning the same symbols (numerals) to such portions.

In this drive device 200, the channel 63*a* and the internal pressure buffering chamber 65*a* are formed by the sidewall surfaces of the through-holes provided in the ceramic sheets 201-1, 201-2 and 201-3, the top surface of the ceramic sheet 61-1 and the bottom surface of the ceramic sheet 81-3.

On the other hand, a micro flow passage 206*a*1 is defined by the side wall surface of the through-hole in the form of a slit provided in the ceramic sheet 201-2, the top surface of the ceramic sheet 201-1 and the bottom surface of the ceramic sheet 201-3. The micro flow passage 206*a*1 is a space in the form of an approximately rectangular parallelepiped having its major axis running along the Y-axis to make the operation chamber 63*a*1 located on the left of the channel 63*a* (a portion of the side wall of the operation chamber 63*a*1, the portion being formed on the ceramic sheet 201-2) communicate with the internal pressure buffering chamber 65*a* (a portion of the side wall of the internal pressure buffering chamber 65*a*, the portion being formed on the ceramic sheet 201-2).

As a specific example of the dimensions of the micro flow passage 206*a*1, the height (length along the Z-axis) and width (length along the X-axis) of the rectangular cross-section of the micro flow passage 206*a*1 taken on the plane orthogonal to the major axis (that is, X-Z plane) are 30 $\mu$m and 15 $\mu$m, respectively, while the length along the Y-axis (length of the portion excluding the channel 63*a* and the internal pressure buffering chamber 65*a*) is 500 $\mu$m.

The micro flow passage 206*b*1 has the same shape as the micro flow passage 206*a*1, and is defined by the side wall surface of the through-hole in the form of a slit provided in the ceramic sheet 201-2, the top surface of the ceramic sheet 201-1 and the bottom surface of the ceramic sheet 201-3. The micro flow passage 206*b*1 is a space in the form of an approximately rectangular parallelepiped having its major axis running along the Y-axis at a position a predetermined distance away in the positive direction along the X-axis from the micro flow passage 206*a*1. The micro flow passage 206*b*1 makes the operation chamber 63*a*2 located on the right of the channel 63*a* (a portion of the side wall of the operation chamber 63*a*2, the portion being formed on the ceramic sheet 201-2) communicate with the internal pressure buffering chamber 65*a* (a portion of the side wall of the internal pressure buffering chamber 65*a*, the portion being formed on the ceramic sheet 201-2). The functions of the micro flow passages 206*a*1 and 206*b*1 are the same as those of the micro flow passages 86*a*1 and 86*b*1.

The drive device 200 contains the movable body 110, the operation fluid 100 and the pressure buffering fluid 120, similarly to the drive device 80. The operation and advantages of the drive device 200 are the same as those of the drive device 80. Accordingly, the drive device 200 is a compact and highly reliable device.

Figure 37:
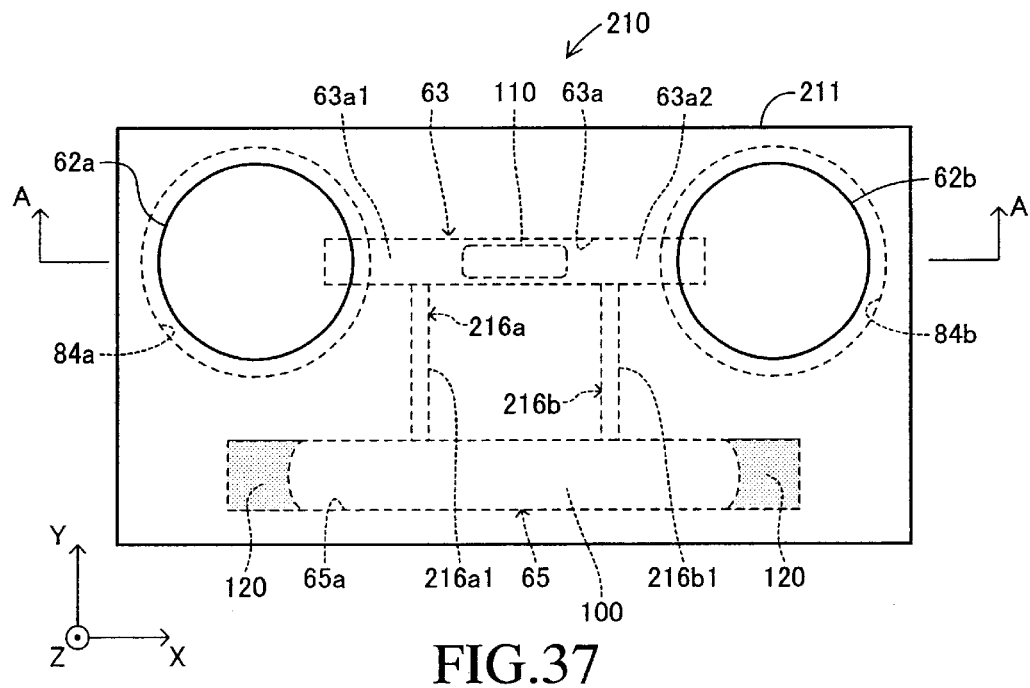
FIG. 37 is a plan view of a drive device according to an eleventh embodiment of this invention.
Figure 38:
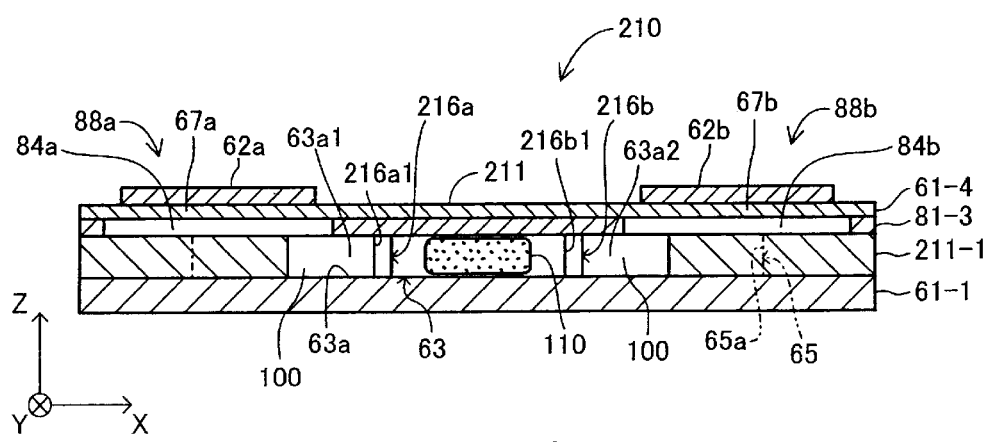
FIG. 38 is a sectional view of a drive device 210 taken on the plane along line A—A in FIG. 37.

Next, a drive device 210 according to an eleventh embodiment of the present invention is described. FIG. 37 is a plan view of the drive device 210. FIG. 38 is a sectional view of the drive device 210 taken along line A—A in FIG. 37. This drive device 210 differs from the drive device 80 merely in that the ceramic sheets 81-1 and 81-2 of the drive device 80 are replaced with a ceramic sheet 211-1 that are placed on top of the ceramic sheet 61-1. Therefore, an explanation for the device is given below with primarily focusing on the difference while a detailed description of those portions having the same configurations as those of the drive device 80 is omitted by assigning the same symbols (numerals) to such portions.

In this drive device 210, the channel 63*a* and the internal pressure buffering chamber 65*a* are formed by the side wall surface of the through-hole provided in the ceramic sheet 211-1, the top surface of the ceramic sheet 61-1 and the bottom surface of the ceramic sheet 81-3.

On the other hand, a micro flow passage 216*a*1 is defined by the side wall surface of the through-hole in the form of a slit provided in the ceramic sheet 211-1, the top surface of the ceramic sheet 61-1 and the bottom surface of the ceramic sheet 81-3. The micro flow passage 216*a*1 is a space in the form of an approximately rectangular parallelepiped having its major axis running along the Y-axis to make the operation chamber 63*a*1 located on the left of the channel 63*a* (a portion of the side wall of the operation chamber 63*a*1, the portion being formed on the ceramic sheet 211-1) communicate with the internal pressure buffering chamber 65*a* (a portion of the side wall of the internal pressure buffering chamber 65*a*, the portion being formed on the ceramic sheet 211-1).

As a specific example of the dimensions of the micro flow passage 216*a*1, the height (length along the Z-axis) and width (length along the X-axis) of the rectangular cross-section of the micro flow passage 216a1 taken on the plane orthogonal to the major axis (that is, X-Z plane) are 50 μm and 15 μm, respectively, while the length along the Y-axis (length of the portion excluding the channel 63a and the internal pressure buffering chamber 65a) is 500 μm.

The micro flow passage 216b1 has the same shape as the micro flow passage 216a1, and is defined by the side wall surface of the through-hole in the form of a slit provided on the ceramic sheet 211-1, the top surface of the ceramic sheet 61-1 and the bottom surface of the ceramic sheet 81-3. The micro flow passage 216b1 is a space in the form of an approximately rectangular parallelepiped having its major axis running along the Y-axis at a position a predetermined distance away in the positive direction along the X-axis from the micro flow passage 216a1. The micro flow passage 216b1 makes the operation chamber 63a2 located on the right of the channel 63a (a portion of the side wall of the operation chamber 63a2, the portion being formed on the ceramic sheet 211-1) communicate with the internal pressure buffering chamber 65a (a portion of the side wall of the internal pressure buffering chamber 65a, the portion being formed on the ceramic sheet 211-1). The functions of the micro flow passages 216a1 and 216b1 are the same as those of the micro flow passages 86a1 and 86b1.

The drive device 210 contains the movable body 110, the operation fluid 100 and the pressure buffering fluid 120, similarly to the drive device 80. The operation and advantages of the drive device 210 are the same as those of the drive device 80. Accordingly, the drive device 210 is a compact and highly reliable device. Further, the side wall surfaces of the channel 63a and the internal pressure buffering chamber 65a can be formed with using a single ceramic sheet or the ceramic sheet 211-1, unlike the drive devices 80, 90, 200 and so on, thus making it possible to manufacture the drive device 210 with ease and at low cost.

Figure 39:
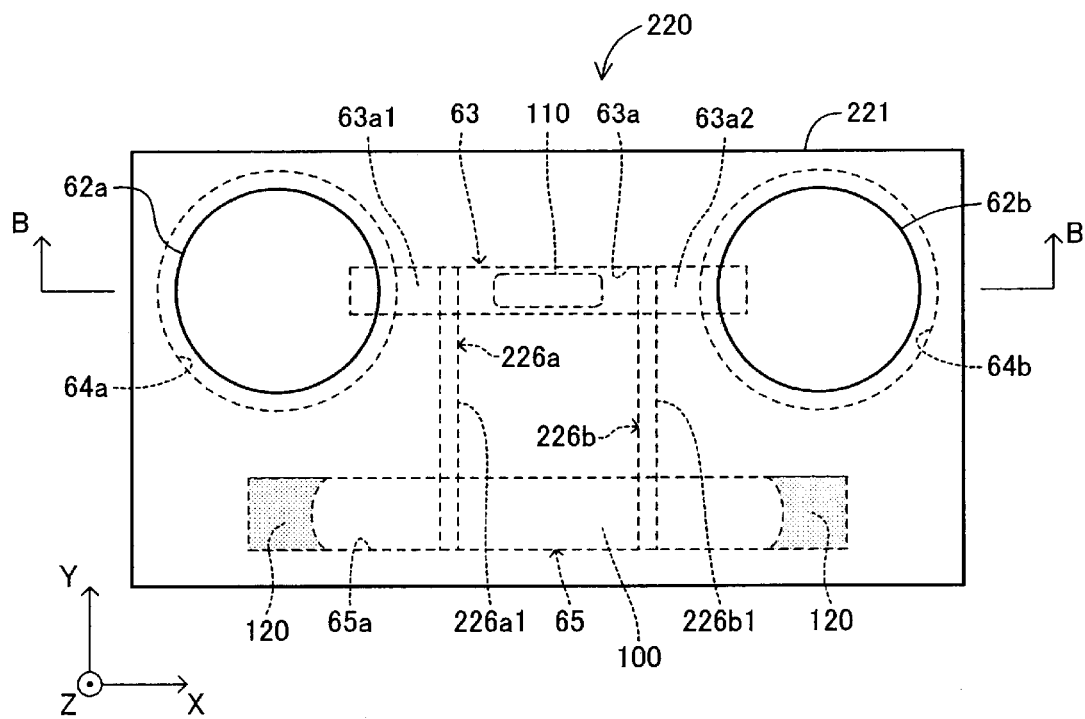
FIG. 39 is a plan view of a drive device according to a twelfth embodiment of this invention.
Figure 40:
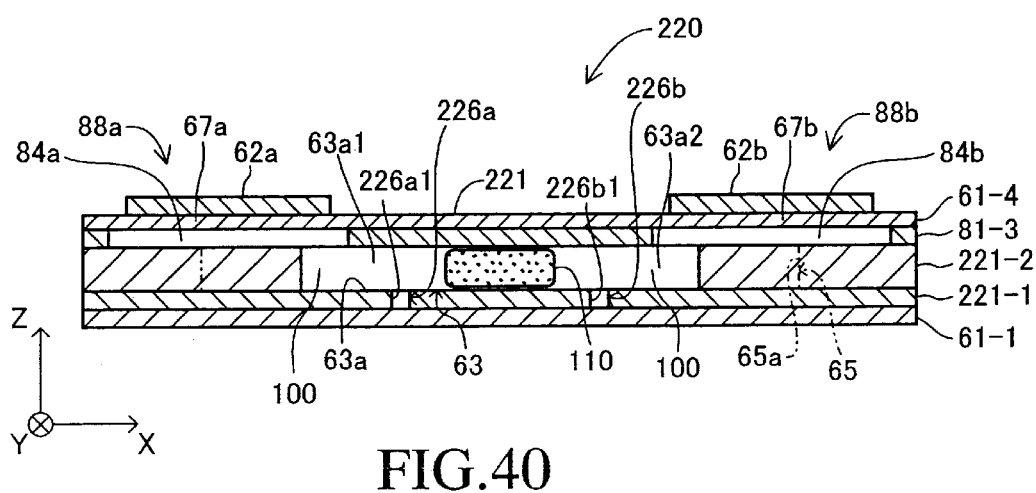
FIG. 40 is a sectional view of a drive device 220 taken on the plane along line B—B in FIG. 39.

Next, a drive device 220 according to a twelfth embodiment of the present invention is described. FIG. 39 is a plan view of the drive device 220. FIG. 40 is a sectional view of the drive device 220 taken along line B—B in FIG. 39. This drive device 220 differs from the drive device 80 merely in that the ceramic sheets 81-1 and 81-2 of the drive device 80 are replaced with ceramic sheets 221-1 and 221-2 that are placed one upon another on top of the ceramic sheet 61-1 and fired to be one piece. Therefore, an explanation for the device is given below with primarily focusing on the difference while a detailed description of those portions having the same configurations as those of the drive device 80 is omitted by assigning the same symbols (numerals) to such portions.

In this drive device 220, the channel 63a and the internal pressure buffering chamber 65a are formed by the side wall surface of the through-hole provided in the ceramic sheet 221-2, the top surface of the ceramic sheet 221-1 and the bottom surface of the ceramic sheet 81-3.

On the other hand, a micro flow passage 226a1 is defined by the side wall surface of the through-hole in the form of a slit provided on the ceramic sheet 221-1, the top surface of the ceramic sheet 61-1 and the bottom surface of the ceramic sheet 221-2. The micro flow passage 226a1 is a space in the form of an approximately rectangular parallelepiped having its major axis running along the Y-axis to make the operation chamber 63a1 located on the left of the channel 63a (lower portion of the operation chamber 63a1) communicate with the internal pressure buffering chamber 65a (lower portion of the internal pressure buffering chamber 65a). The dimensions of the micro flow passage 216a1 are the same as those of the micro flow passage 66a1.

The micro flow passage 226b1 has the same shape as the micro flow passage 226a1, and is defined by the side wall surface of the through-hole in the form of a slit provided in the ceramic sheet 221-1, the top surface of the ceramic sheet 61-1 and the bottom surface of the ceramic sheet 221-2. The micro flow passage 226b1 is a space in the form of an approximately rectangular parallelepiped having its major axis running along the Y-axis at a position a predetermined distance away in the positive direction along the X-axis from the micro flow passage 226a1. The micro flow passage 226b1 makes the operation chamber 63a2 located on the right of the channel 63a (lower portion of the operation chamber 63a2) communicate with the internal pressure buffering chamber 65a (lower portion of the internal pressure buffering chamber 65a). The functions of the micro flow passages 226a1 and 226b1 are the same as those of the micro flow passages 86a1 and 86b1.

The drive device 220 contains the movable body 110, the operation fluid 100 and the pressure buffering fluid 120, similarly to the drive device 80. The operation and advantages of the drive device 220 are the same as those of the drive device 80. Accordingly, the drive device 220 is a compact and highly reliable device.

Figure 41:
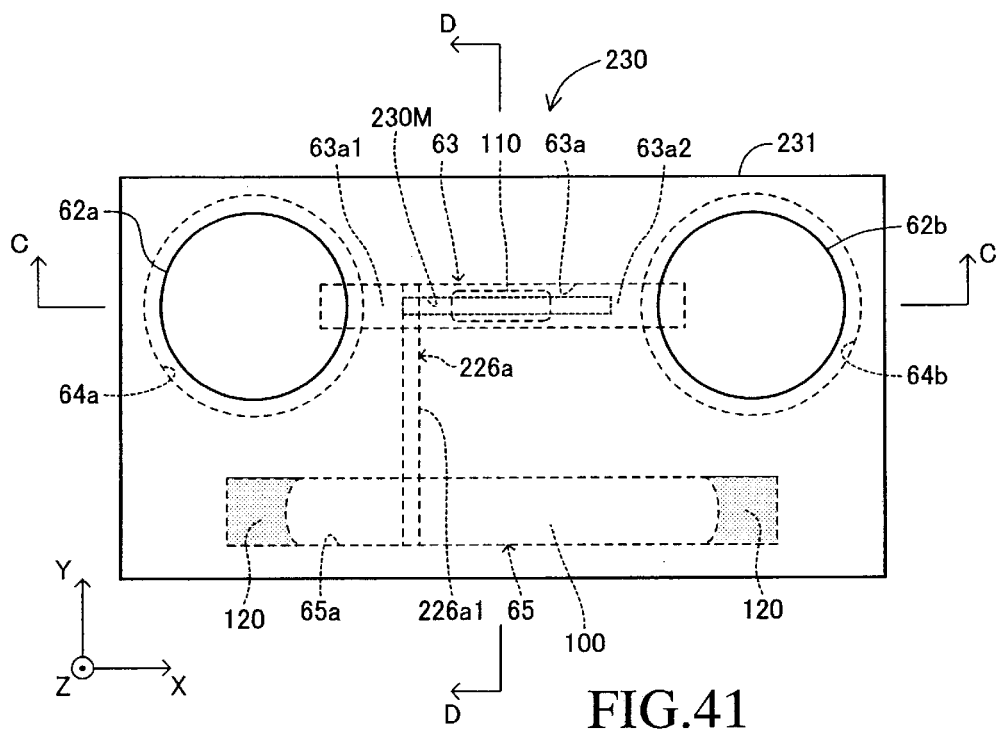
FIG. 41 is a plan view of a drive device according to a thirteenth embodiment of this invention.
Figure 42:
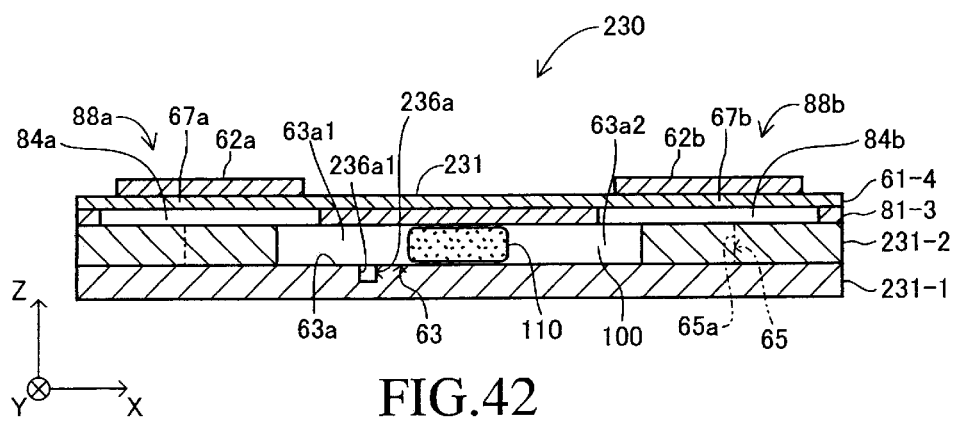
FIG. 42 is a sectional view of a drive device taken on the plane along line C—C in FIG. 41.
Figure 43:
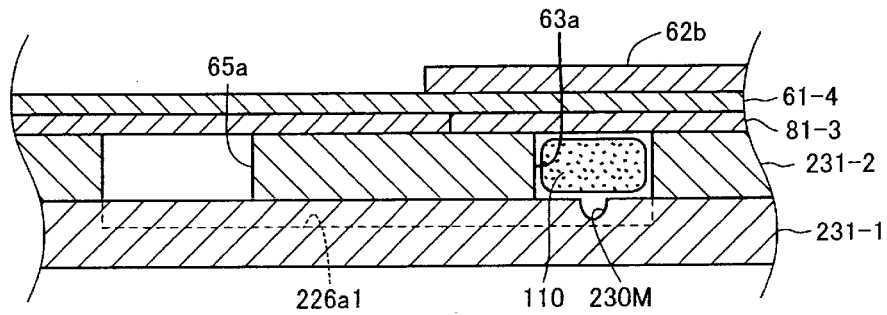
FIG. 43 is a sectional view of a drive device taken on the plane along line D—D in FIG. 41.

Next, a drive device 230 according to a thirteenth embodiment of the present invention is described. FIG. 41 is a plan view of the drive device 230. FIGS. 42 and 43 are sectional views of the drive device 230 taken along lines C—C and D—D in FIG. 41, respectively.

This drive device 230 differs from the drive device 220 in that the ceramic sheets 61-1 and 221-1 of the drive device 220 are replaced with a ceramic sheet 231-1, in that the ceramic sheet 221-2 of the drive device 220 is replaced with a ceramic sheet 231-2 and in that only a single micro flow passage is provided. Therefore, an explanation for the device is given below with primarily focusing on the differences while a detailed description of those portions having the same configurations as those of the drive device 220 is omitted by assigning the same symbols (numerals) to such portions.

In this drive device 230, the channel 63a and the internal pressure buffering chamber 65a are formed by the side wall surface of the through-hole provided in the ceramic sheet 231-2, the top surface of the ceramic sheet 231-1 and the bottom surface of the ceramic sheet 81-3. Moreover, a groove 230M is provided on the top surface of the ceramic sheet 231-1 as shown in FIGS. 41 and 43. This groove 230M has its major axis extending along the X-axis and is disposed on the bottom surface of the channel 63a and at the approximately central portion of this channel along the X-axis to serve the function similar to the groove M shown in FIG. 14.

On the other hand, the micro flow passage 226a1 is defined by the wall surface of the concave groove provided on the top surface of the ceramic sheet 231-1 through laser machining and the bottom surface of the ceramic sheet 231-2. The micro flow passage 226a1 is a space in the form of an approximately rectangular parallelepiped having its major axis running along the Y-axis to allow the lower portion of the operation chamber 63a1 located on the left of the channel 63a and the groove 230M to communicate with the internal pressure buffering chamber 65a (lower portion of the internal pressure buffering chamber 65a). The dimensions and functions of the micro flow passage 216a1 are the same as those of the micro flow passage 66a1 shown in FIG. 28.

The drive device 230 contains the movable body 110, the operation fluid 100 and the pressure buffering fluid 120, similarly to the drive device 80. The drive device 230 operates similarly to the drive device 10-1 shown in FIG. 13 which is a modified example of the first embodiment. Accordingly, the drive device 230 is a compact and highly reliable device, similarly to the drive device 80. Further, the device 230 comprises only one micro flow passage 236a1, and therefore, steps and time required for machining the micro flow passage is reduced to half. Thus, the device 230 can be made as an inexpensive device.

Figure 44:
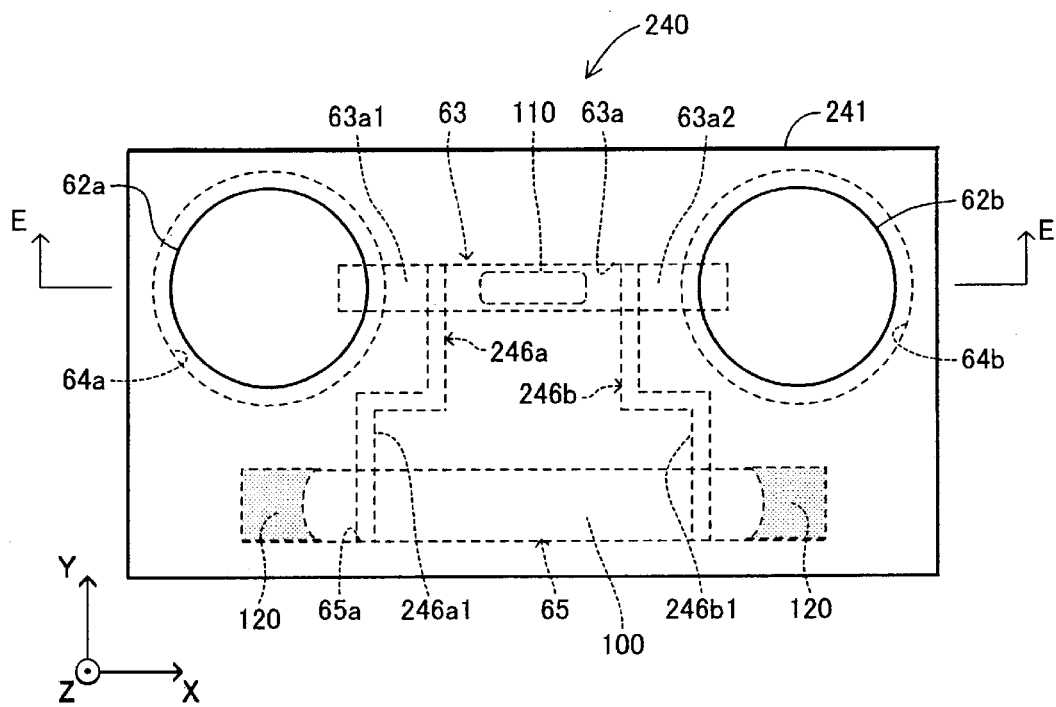
FIG. 44 is a plan view of a drive device according to a fourteenth embodiment of this invention.
Figure 45:
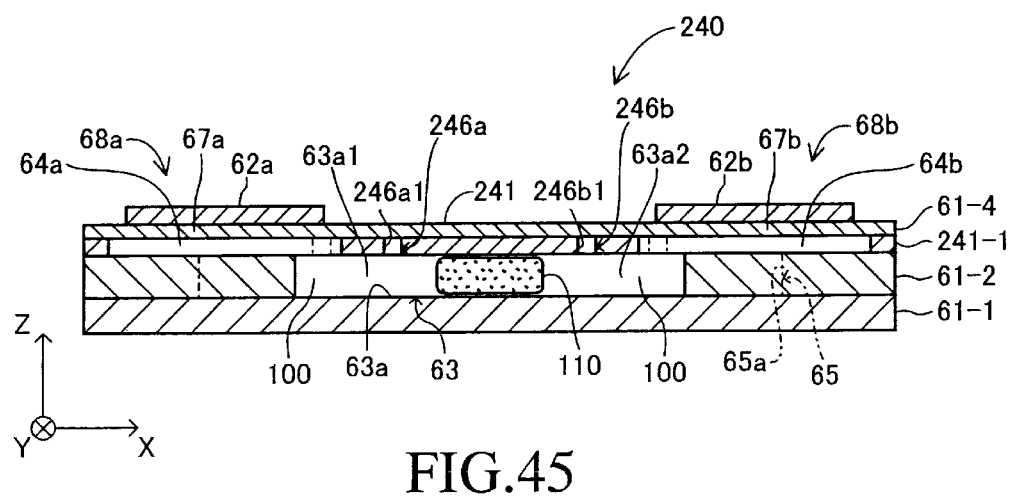
FIG. 45 is a sectional view of a drive device 240 taken on the plane along line E—E in FIG. 44.

Next, a drive device 240 according to the fourteenth embodiment of the present invention is described. FIG. 44 is a plan view of the drive device 240. FIG. 45 is a sectional view of the drive device 240 taken along line E—E in FIG. 44.

This drive device 240 differs from the drive device 60 in that the ceramic sheet 61-3 of the drive device 60 is replaced with a ceramic sheet 241-1 which provides bended micro flow passages. Therefore, an explanation for the device is given below with primarily focusing on the difference while a detailed description of those portions having the same configurations as those of the drive device 60 is omitted by assigning the same symbols (numerals) to such portions.

In this drive device 240, micro flow passages 246a1 and 246b1 are defined by the side wall surface of the through-hole in the form of a slit provided in the ceramic sheet 241-1, the top surface of the ceramic sheet 61-2 and the bottom surface of the ceramic sheet 61-4.

The micro flow passage 246a1 communicates with the upper portion of the operation chamber 63a1 located on the left of the channel 63a, extends from the upper portion of the operation chamber 63a1 toward the negative direction along the Y-axis and bends toward the negative direction along the X-axis at the approximately central portion of a base body 241 along the Y-axis, and then extends again toward the negative direction along the Y-axis to communicate with the upper portion of the internal pressure buffering chamber 65a. Similarly, the micro flow passage 246b1 communicates with the upper portion of the operation chamber 63a2 located on the right of the channel 63a, extends from the upper portion of the operation chamber 63a2 toward the negative direction along the Y-axis and bends toward the positive direction along the X-axis at the approximately central portion of the base body 241 along the Y-axis, and then extends again toward the negative direction along the Y-axis to communicate with the upper portion of the internal pressure buffering chamber 65a.

The cross-section of this pair of micro flow passages 246a1 and 246b1 taken on the plane orthogonal to the axial direction is approximately rectangular in shape. As an example of the dimensions of the portion extending in the negative direction along the Y axis, the height (length along the Z-axis) and width (length along the X-axis) of the rectangular cross-section of that portion taken on the plane orthogonal to that axis (that is, X-Z plane) are respectively 10 $\mu$m and 10 $\mu$m. Note that the total axial length (total length excluding the upper portions of the channel 63a and the internal pressure buffering chamber 65a) is 700 $\mu$m.

The drive device 240 contains the movable body 110, the operation fluid 100 and the pressure buffering fluid 120, similarly to the drive device 60. The operation and advantages of the drive device 240 are the same as those of the drive device 60. Accordingly, the drive device 240 is a compact and highly reliable device.

Moreover, the drive device 240 has a larger flow passage resistance by increasing axial length of the channel (channel length) and/or bending the channel instead of by reducing the cross-section of the channel. Consequently, even if a large flow passage resistance against the operation fluid 100 whose pressure varies abruptly is required, the cross-section of the pair of micro flow passages 246a1 and 246b1 of the drive device 240 does not need to be reduced to an extremely small size. Thus, extremely high machining accuracy associated with forming a fine slit on the ceramic sheet 241-1 is not necessary. As a result, it is possible to manufacture the drive device 240 at lower cost.

Next, an example of modification of a piezoelectric/electrostrictive film type actuator employed in the embodiments is described. The description is made with using an example in which the drive device 60 shown in FIG. 27 and FIG. 28 adopts a modified piezoelectric/electrostrictive film type actuator instead of the ceramic pump 68b (68a). The piezoelectric/electrostrictive film type actuator is an actuator multi-layered piezoelectric films and can be used not only as the replacement of the ceramic pumps 68a and 68b but also as actuators (pumps) for other embodiments.

Figure 46:
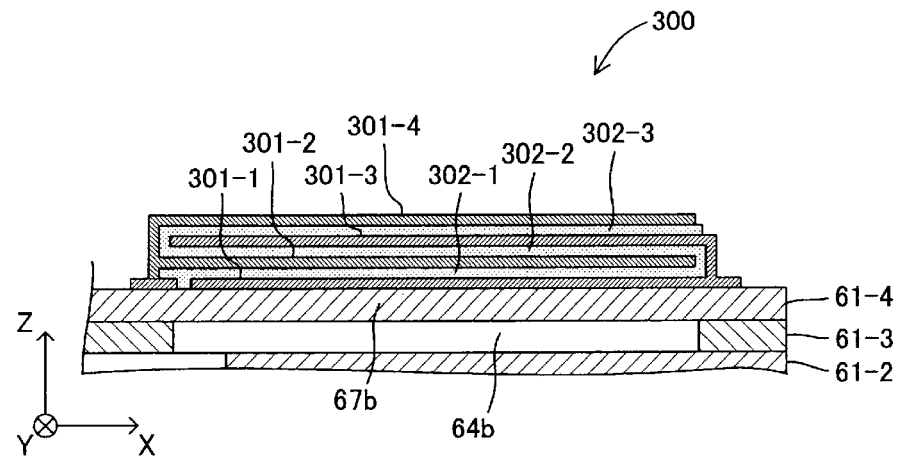
FIG. 46 is an enlarged sectional view of a piezoelectric/electrostrictive film type actuator obtained by applying a variant of the piezoelectric/electrostrictive film type actuator to the drive device shown in FIG. 27, the enlarged sectional view being taken through the drive device by a plane along line 5—5 of FIG. 27.
Figure 47:
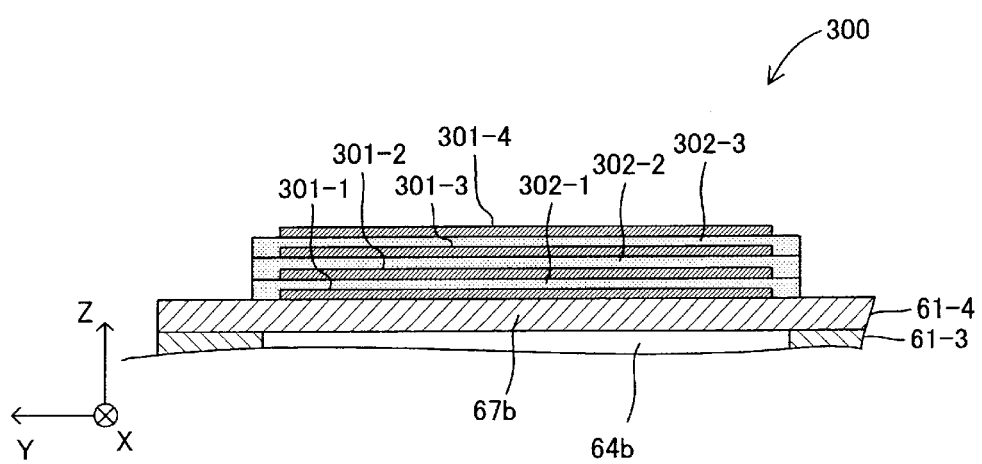
FIG. 47 is an enlarged sectional view of the piezoelectric/electrostrictive film type actuator obtained by applying the variant of the piezoelectric/electrostrictive film type actuator to the drive device shown in FIG. 27, the enlarged sectional view being taken through the drive device by a plane along line F—F of FIG. 27.

FIGS. 46 and 47 are enlarged views of a piezoelectric/electrostrictive film type actuator 300 obtained by applying the piezoelectric/electrostrictive film type actuator 300 which is the modification example to the drive device 60 shown in FIGS. 27 and 28 and by cutting through the drive device 60 on the planes along lines 5—5 and F—F in FIG. 27, respectively.

As shown in these figures, the piezoelectric/electrostrictive film type actuator 300 comprises a first electrode film 301-1, a first piezoelectric/electrostrictive film 302-1, a second electrode film 301-2, a second piezoelectric/electrostrictive film 302-2, a third electrode film 301-3, a third piezoelectric/electrostrictive film 302-3 and a fourth electrode film 301-4 placed sequentially one upon another on the top surface of the ceramic diaphragm 67b which is made of the ceramic sheet 61-4.

The first electrode film 301-1 and the third electrode film 301-3 are connected to each other to form a first electrode portion such that these films are maintained at the same potential while the second electrode film 301-2 and the fourth electrode film 301-4 are connected to each other to form a second electrode portion such that these films are maintained at the same potential. The first and second electrode portions are insulated from each other by piezoelectric/electrostrictive films, and potentials of different polarity are applied (drive voltage is applied) to these portions, similarly to the upper and lower electrodes described above.

It is desirable that the first electrode film 301-1 through the fourth electrode film 301-4 be made of a metal which is a solid at room temperature, can withstand an oxidizing atmosphere at high temperatures about the same level as the firing temperature in the manufacturing process of the piezoelectric/electrostrictive film type actuator 300, and is highly conductive. For example, metals such as aluminum, titanium, chromium, iron, cobalt, nickel, copper, zinc, niobium, molybdenum, ruthenium, palladium, rhodium, silver, tin, tantalum, tungsten, iridium, platinum, gold and lead can be used singly for material of electrode films. An alloy of these metals can also be used for material of electrode films. Further, a cermet material, in which the same material as the base body 61 is dispersed into these metal materials, may be used. In addition, materials such as gold-, platinum- and silver-resinated pastes may also be used to provide a very fine and thin electrode film.

Note that, in the case of the multi-layered piezoelectric/electrostrictive actuator discussed above, it is desirable that the electrode at the lowermost layer (the first electrode film 301-1) and the intermediate electrodes formed between individual piezoelectric/electrostrictive layers (the second electrode film 301-2 and the third electrode film 301-3) be made of material which contains both an electrode material including platinum or others as its main ingredient and an additive or additives of, for example, zirconium oxide, cerium oxide or titanium oxide, and so on. It is possible to prevent the electrodes from separating from the piezoelectric/electrostrictive films if the electrode at the lowermost layer and the intermediate electrodes are made of such a material above although the reason remains unknown. Note that it is desirable that 0.01 to 20 mass percent of the additive be contained in the total electrode material in order to provide the desired anti-separation effect.

On the other hand, since the displacement of the piezoelectric/electrostrictive film actuator becomes smaller as thickness of the electrode film becomes larger, it is desirable that the electrode film be thin in order to maintain the displacement large. Therefore, it is desirable that the thickness of the electrode film be 15 μm or less and is more desirable that the thickness be 5 μm or less.

As for the first piezoelectric/electrostrictive film 302-1 through the third piezoelectric/electrostrictive film 302-3, any material may be acceptable as long as the material can produce electric-field-induced distortion through an effect such as piezoelectric effect or electrostrictive effect, regardless of whether the material is crystalline or non-crystalline. It is also possible to use semiconductors, ferroelectric ceramics or antiferroelectric ceramics for these materials.

For example, ceramics containing lead zirconate, lead titanate, magnesium lead niobate, nickel lead niobate, zinc lead niobate, manganese lead niobate, antimony lead stannate, manganese lead tungstate, cobalt lead niobate, barium titanate, sodium titanate bismuth, potassium niobate sodium, strontium tantalate bismuth singly or as a mixture of these are among possible materials of the piezoelectric/electrostrictive films.

It is desirable that each layer of the first piezoelectric/electrostrictive film 302-1 to the third piezoelectric/electrostrictive film 302-3 be thin in order to provide larger displacement with smaller voltage. For example, the thickness is designed such that it is 100 μm or less and more preferably 3 to 30 μm. Further, it is preferable that, if the piezoelectric/electrostrictive films are placed one upon another on the diaphragm, the thickness of each of the films becomes smaller as the film is placed at upper side (as the distance between the film and the diaphragm becomes larger). More specifically, it is preferable that the piezoelectric/electrostrictive films be formed such that the following formula is satisfied when the thickness of the n-th piezoelectric/electrostrictive film from the lowermost piezoelectric/electrostrictive film is assumed to be $t_n$:

$$t_n \leq t_{n-1} \times 0.95$$

The reason why the higher the layers is placed, the thinner the piezoelectric/electrostrictive films should be is, distortion (displacement) of the piezoelectric/electrostrictive films becomes larger as the the electric field applied to the film becomes larger (in other words, as the piezoelectric/electrostrictive film becomes thinner provided that the same drive voltage is applied to each of the piezoelectric/electrostrictive films). Consequently, as described above, if the thickness of each of the piezoelectric/electrostrictive films becomes smaller as the film is placed at upper side, upper films will be distorted more than lower films. Thus, efficiency in bending the diaphragm becomes high, and therefore, displacement associated with bending of the diaphragm becomes large.

This piezoelectric/electrostrictive film type actuator 300 can be manufactured by the method similar to manufacturing method as described with referring to FIGS. 17 and 18.

More specifically, the first electrode film 301-1 is formed on the top surface of the ceramic body 61-4 which will be the diaphragm 67b by the same method as that for forming the lower electrode 205, and then the first piezoelectric/electrostrictive film 302-1 is formed on the top surface of the first electrode film 301-1 by the same method as that for forming a piezoelectric film 207. Next, the second electrode film 301-2 is formed on the top surface of the first piezoelectric/electrostrictive film 302-1 by the same method as that for forming the lower electrode 205 or the upper electrode 208. Then, the second piezoelectric/electrostrictive film 302-2 is formed on the top surface of the second electrode film 301-2 by the same method as that for forming the piezoelectric film 207. Then, the third electrode film 301-3 is formed on the top surface of the second piezoelectric/electrostrictive film 302-2 by the same method as that for forming the lower electrode 205 or the upper electrode 208, and the third piezoelectric/electrostrictive film 302-3 is formed on the top surface of the third electrode film 301-3 by the same method as that for forming the piezoelectric film 207. Finally, the fourth electrode film 301-4 is formed by the same method as that for forming the upper electrode 208.

As described above, the example of modification of the piezoelectric/electrostrictive film type actuator applicable to each of the drive devices according to the present invention is "the piezoelectric/electrostrictive film type actuator 300, provided on top of the diaphragm 67b and comprising an piezoelectric/electrostrictive element comprised of piezoelectric/electrostrictive and electrode films, which causes the diaphragm 67b to deform by the displacement (deformation) of the piezoelectric/electrostrictive element, wherein the piezoelectric/electrostrictive element is formed by placing (laminating) piezoelectric/electrostrictive films and electrode films alternately (one upon another in alternate order) and such that the uppermost and the lowermost layers are electrode films (the first electrode film 301-1 and the fourth electrode film 301-4)".

This actuator 300 comprises a plurality of piezoelectric/electrostrictive layers, and each of these layers generates force. Thus, the actuator 300, when a potential difference is applied between the electrodes (between the first and second electrodes in this case), can produce drive force (force which causes the diaphragm to deform) which is larger than the force the actuator comprising only one piezoelectric/electrostrictive layer produces when the same potential difference is applied between the electrodes (between the upper and lower electrodes in this case).

Moreover, since the piezoelectric/electrostrictive film type actuator 300 has a plurality of piezoelectric/electrostrictive layers placed one upon another, it is possible to readily form a piezoelectric/electrostrictive element with large ratio of width (direction within the X-Y plane) to height (direction of the Z-axis) or so-called high aspect ratio. The piezoelectric/electrostrictive element with high aspect ratio has high rigidity at the portion to bent, and therefore, a response speed of such element becomes high. Accordingly, use of the actuator 300 provides fast-response drive devices.

Although the piezoelectric/electrostrictive film type actuator 300 comprise three layers of piezoelectric/ electrostrictive films (and four layers of electrode films), the number of layers may be any number as long as the actuator comprises a plurality of layers, and are not limited to thereto.

As described above, the drive devices according to the embodiments of the present invention and their modifications can maintain the features of micro machines such as small size and low power consumption; do not include a mechanical amplification mechanism involving intrinsic problems of wear and sticking; and can facilitate mass production. In addition, since the drive devices hardly break even when the atmospheric temperature increases, the drive devices have enhanced reliability and durability.

Notably, the present invention is not limited to the above-described embodiments, and various modifications may be employed within the scope of the present invention. For example, while the basic configurations of the respective drive devices of the present invention are maintained, the films of a piezoelectric/electrostrictive material for deforming diaphragms may be replaced with films of an antiferroelectric material (antiferroelectric film). Further, electrostatic force which is generated between electrodes opposed via a gap and deforming force which is generated in a shape memory alloy heated through application of voltage thereto—which have been actively studied in the field of micro machines—may be used in place of deforming force of piezoelectric film, in order to deform a diaphragm. Even in such a configuration, the combined use of the micro flow passages 16a1, 16b1, 16c and the internal-pressure buffering chamber 15a as in the above-described embodiments prevents breakage of the drive devices due to variation in atmospheric temperature. In addition, the position of the movable body in the initial state can be controlled through control of the drive voltage (applied voltage).

Notably, the drive device of the present invention can be used as a device for constructing a so-called rod-less cylinder in the form of a micro machine. As disclosed in, for example, U.S. Pat. No. 3,779,401, a rod-less cylinder is configured as follows. A cylinder working section is sealed completely; an operation member, which is magnetically coupled with the working member (the movable body of the present invention) moving within the sealed space, reciprocates outside the sealed space; and movement of the operation member is transmitted to the outside of the rod-less cylinder system.

Accordingly, when the movable body 110 of the present invention is formed of a magnetic material, and an operation member magnetically coupled with the movable body 110 is provided outside, there can be obtained a micro rod-less cylinder to which the drive device according to the present invention is applied. Further, the drive device of the present invention may be configured in such a manner that very small electrodes (detection electrodes) are provided within the channel 13a or 63a at numerous locations, and the movable body 110 is formed of an electrically conductive magnetic material. This configuration enables detection of the position of the movable body 110 on the basis of an "ON (close)" or "Off (open)" state of each electrode, to thereby enable control of the stroke position of the micro rod-less cylinder.

The drive device of the present invention can be applied not only to micro machines, such as a micro motor, which are adapted for simple mechanical movement of an object, but also to a wide range of uses of various types of micro machines.

For example, a portion or the entirety of the wall surface of the channel 13a or 16a may be formed of a transparent material, and the movable body 110 may be formed of a bubble, a colored liquid, a vacuole of a fluorescent liquid, or a very small metal piece capable of reflecting light. In this case, the drive device can be used as an optical display element. Moreover, when magnetic, optical, or electrical means for detecting the position of the movable body 110 from the outside is provided, the drive device of the present invention can be used as a memory element. Further, the movable body 110 may be forced to undergo oscillation motion, and the influence of an external force, such as Coriolis force, exerted on the oscillation motion may be sensed by electrical or optical means. Thus, the drive device can be used as a sensor such as a gyroscope.

The above-described drive device of the present invention can be said to have the following features. Ceramic pumps (23a, 23b, and so on) each including a ceramic diaphragm and a film-type piezoelectric element consisting of a piezoelectric/electrostrictive film or an antiferroelectric film and electrodes are provided on a substrate (11, 21, and so on) having a channel (13a). This channel is formed to have a shape for connecting the ceramic pumps, and accommodates a liquid (100) and a movable body (110), such as a bubble, a vacuole, or a micro solid, to be moved. The channel is connected to a buffering space (15a) via micro flow passages (16a1, 16b1, 16c). When pressurization or depressurization is effected at high speed by the ceramic pump, the speed at which the liquid enters and returns from the micro flow passages is low, so that the micro flow passages exhibit an effect for reducing the pressurization or depressurization with a time delay. When pressurization or depressurization is effected at low speed, the liquid freely enters and returns from the micro flow passages, so that the micro flow passages exhibit a buffering effect for suppressing pressure variation within the channel to substantially zero.

What is claimed is:

1. A drive device comprising:
    a channel forming portion for forming a channel, the channel accommodating an incompressible operation fluid and a movable body made of a substance different from that of the operation fluid, and being substantially divided into two operation chambers by means of the movable body;
    a pair of pumps each including a pump chamber communicating with the corresponding operation chamber and being filled with the operation fluid, an actuator provided for the pump chamber, and a diaphragm deformed by the actuator, the operation fluid within the pump chamber being pressurized or depressurized through deformation of the diaphragm;
    an internal-pressure-buffering-chamber-forming portion for forming an internal-pressure buffering chamber which accommodates the operation fluid and a compressible fluid for pressure buffering; and
    a micro flow passage for connecting the channel of the channel forming portion and the internal-pressure buffering chamber of the internal-pressure-buffering-chamber-forming portion, the micro flow passage exhibiting a high passage resistance against abrupt pressure change of the operation fluid within the channel, to thereby substantially prohibit passage of the operation fluid through the micro flow passage and exhibiting a low passage resistance against slow pressure change of the operation fluid within the channel, to thereby substantially permit passage of the operation fluid through the micro flow passage.

2. A drive device according to claim 1, wherein the actuator includes a film-type piezoelectric element consisting of a piezoelectric/electrostrictive film or an antiferroelectric film and electrodes; and the diaphragm is formed of ceramic.

3. A drive device according to claim 2, wherein each of the diaphragms of the pumps forms part of the wall of each of the pump chambers and is disposed such that it has a membrane surface on the same plane;

wherein the channel of the channel forming portion is configured such that it defines a space having its longitudinal direction within a plane parallel to the membrane surface of the diaphragm;

wherein the micro flow passage of the micro flow passage portion is extended in the direction parallel to the membrane surface of the diaphragm; and wherein the internal-pressure buffering chamber of the internal-pressure-buffering-chamber-forming portion is configured such that it defines a space having its longitudinal direction within a plane parallel to the membrane surface of the diaphragm and is disposed such that it communicates with the channel of the channel forming portion via the micro flow passage of the micro flow passage portion.

4. A drive device according to claim 1, wherein each of the diaphragms of the pumps forms part of the wall of each of the pump chambers and is disposed such that it has a membrane surface on the same plane;

wherein the channel of the channel forming portion is configured such that it defines a space having its longitudinal direction within a plane parallel to the membrane surface of the diaphragm;

wherein the micro flow passage of the micro flow passage portion is extended in the direction parallel to the membrane surface of the diaphragm; and wherein the internal-pressure buffering chamber of the internal-pressure-buffering-chamber-forming portion is configured such that it defines a space having its longitudinal direction within a plane parallel to the membrane surface of the diaphragm and is disposed such that it communicates with the channel of the channel forming portion via the micro flow passage of the micro flow passage portion.

* * * * *

UNITED STATES PATENT AND TRADEMARK OFFICE
CERTIFICATE OF CORRECTION

PATENT NO. : 6,761,028 B2
DATED : July 13, 2004
INVENTOR(S) : Yukihisa Takeuchi, Nobuo Takahashi and Yuki Bessho It is certified that error appears in the above-identified patent and that said Letters Patent is hereby corrected as shown below:

Column 35,
Line 1, change "2" to -- 1 --
Line 20, change "1" to -- 2 --

Signed and Sealed this

Nineteenth Day of October, 2004

JON W. DUDAS
*Director of the United States Patent and Trademark Office*